United States Patent
Yoshida et al.

(10) Patent No.: US 10,253,201 B2
(45) Date of Patent: Apr. 9, 2019

(54) COMPOSITION FOR POLARIZING PLATE, POLARIZING PLATE PROTECTIVE FILM, CELLULOSE ACYLATE FILM, POLARIZER, POLARIZING PLATE, AND DISPLAY

(71) Applicant: FUJIFILM Corporation, Tokyo (JP)

(72) Inventors: Aiko Yoshida, Kanagawa (JP); Naoya Shimoju, Kanagawa (JP); Mayumi Nojiri, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 521 days.

(21) Appl. No.: 14/980,253

(22) Filed: Dec. 28, 2015

(65) Prior Publication Data
US 2016/0185993 A1   Jun. 30, 2016

(30) Foreign Application Priority Data

Dec. 26, 2014 (JP) ................. 2014-264164

(51) Int. Cl.
*C09D 101/12* (2006.01)
*G02B 1/14* (2015.01)
(Continued)

(52) U.S. Cl.
CPC .......... *C09D 101/12* (2013.01); *C08F 220/34* (2013.01); *G02B 1/04* (2013.01);
(Continued)

(58) Field of Classification Search
CPC .......... G02B 1/04; G02B 5/30; G02B 5/3033; C09D 101/08; C09D 101/12;
(Continued)

(56) References Cited

U.S. PATENT DOCUMENTS

2008/0038678 A1* 2/2008 Kishioka ............. C08G 61/122
                                                                     430/327
2013/0189449 A1* 7/2013 Fukagawa ............ C09K 19/52
                                                                     428/1.33

FOREIGN PATENT DOCUMENTS

JP          2011-118135 A     6/2011

* cited by examiner

*Primary Examiner* — Ruiyun Zhang
(74) *Attorney, Agent, or Firm* — Edward Neils, LLC; Jean C. Edwards, Esq.

(57) ABSTRACT

A composition for a polarizing plate containing a polymer having a partial structure represented by the following ring structure α or β in the molecule, a polarizing plate protective film, a cellulose acylate film, a polarizer, a polarizing plate, and a display;

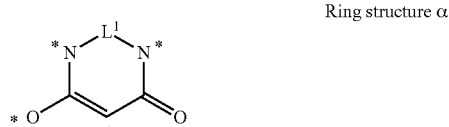

Ring structure α

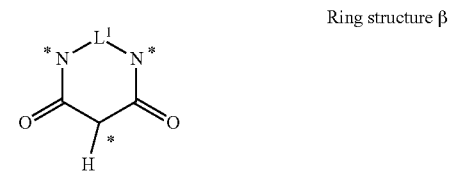

Ring structure β wherein $L^1$ represents a single bond, —C(=O)—, —C(=S)—, an alkylene group, or an arylene group; and the symbol * designates a boning hand, or a site to which a hydrogen atom, a substituent, or a linking group binds.

19 Claims, 2 Drawing Sheets

(51) Int. Cl.
*G02B 1/04* (2006.01)
*G02B 5/30* (2006.01)
*C08F 220/34* (2006.01)

(52) U.S. Cl.
CPC .............. *G02B 1/14* (2015.01); *G02B 5/3033* (2013.01); *C08F 2220/346* (2013.01); *Y10T 428/10* (2015.01); *Y10T 428/1036* (2015.01)

(58) Field of Classification Search
CPC ............. C09D 101/14; G02F 1/133528; G02F 1/133606; G02F 1/13363; Y10T 428/10; Y10T 428/1036; Y10T 428/1041
USPC ............ 428/1.1, 1.3, 1.31; 349/96; 252/582; 359/483.01
See application file for complete search history.

COMPOSITION FOR POLARIZING PLATE, POLARIZING PLATE PROTECTIVE FILM, CELLULOSE ACYLATE FILM, POLARIZER, POLARIZING PLATE, AND DISPLAY

CROSS-REFERENCE TO RELATED APPLICATION

The present application claims priority under 35 U.S.C. § 119 (a) to Japanese Patent Application No. 2014-264164 filed in Japan on Dec. 26, 2014. The above application is hereby expressly incorporated by reference, in its entirety, into the present application.

TECHNICAL FIELD

The present invention relates to a composition for a polarizing, plate, a polarizing plate protective film, a cellulose ac late film, a polarizer, a polarizing plate, and a display.

BACKGROUND ART

A polarizing plate having at least a polarizer and a polarizing plate protective film is used for various liquid crystal displays, as optical elements thereof.

In addition to an indoor use of the liquid crystal display, such as a TV use, a chance of the outdoor use thereof is increased, for example, use as a mobile device. As a result, development of a liquid crystal display is required, which is impervious to the use under hygrothermal condition than ever before.

Further, a demand for the liquid crystal display to be impervious to more various uses even under unforgiving environment is growing, and durability at a higher level than ever before has been required from year to year.

In addition, the liquid crystal display has been increased in size and decreased in thickness mainly in TV applications in recent years, and thus the polarizing plate having a polarizing plate protective film of a constitutional member is also required to be thinned in accordance therewith.

In the polarizing plate protective film using a cellulose acylate film, it is known that a specific compound is contained in the film, for further improvement in the performance, or in order to solve various problems in the properties as the polarizing plate protective film or the production thereof.

For example, in order to improve polarizer durability, a method of incorporating an organic acid having a pKa of 2 to 7 in a polarizing plate protective film is proposed (see Patent Literature 1).

CITATION LIST

Patent Literatures
Patent Literature 1: JP-A-2011-118135 ("JP-A" means unexamined published Japanese patent application)

Technical Problem

The polarizer durability has been improved by a conventional organic acid having a pKa of 2 to 7. However, a requirement for the polarizer durability under hygrothermal condition has been increased by a recent significant technical progress. Therefore, further improvement is required. In particular, the present inventors have found as the result of their studies that if the compound described in Patent Literature 1 is used, deterioration of the polarizer under hygrothermal condition, particularly a change of perpendicular transmittance over a long time is significant and also a lightfast adhesion is insufficient. Further according to their studies, the present inventors have found it difficult to effectively improve the polarizer durability by addition of small amount of a particular organic acid because, for example, even if the particular organic acid is incorporated in one layer of the three-layer structured polarizing plate protective film, which is the layer closest to a polarizer, the particular organic acid diffuses from the one layer to other layers.

In view of the above, the present invention is contemplated for providing a composition for a polarizing plate, which enables the improvement of and the maintenance and enforcement of the polarizer durability over a long time under hygrothermal condition, by addition of small amount, and also for providing a polarizing plate protective film, a cellulose acylate film, a polarizer, a polarizing plate, and a display, each of which is obtained by the composition for a polarizing plate.

Solution to Problem

As a result of intensive studies, the present inventors have found it important, as described above, to localize a particular compound to a polarizer or the position as close to the polarizer as possible and also to develop a means to release the compound over time. The present invention has been completed on the basis of these findings.

The problems of the present invention can be solved by the following means.

<1> A composition for a polarizing plate containing a polymer having a partial structure represented by the following ring structure α or β in the molecule:

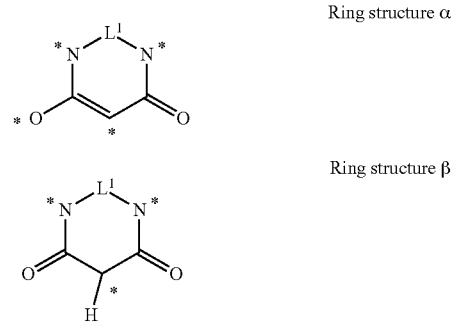

wherein $L^1$ represents a single bond, —C(=O)—, —C(=)—, an alkylene group, or an arylene group; and the symbol * designates a boning hand, or a site to which a hydrogen atom, a substituent, or a linking group binds.

<2> The composition for a polarizing plate described in the item <1>, wherein the polymer has a partial structure represented by the following Formula (1) or (2) at a main chain or a side chain of the recurring unit thereof:

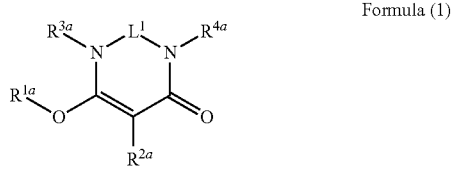

Formula (1)

-continued

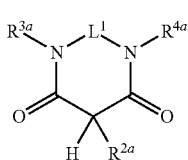

Formula (2)

wherein $L^1$ represents a single bond, —C(=O)—, —C(=S)—, an alkylene group, or an arylene group; $R^{1a}$ represents a methylene group substituted with a hetero atom, an ethylene group substituted with electron-withdrawing group, an acyl group, an carbamoyl group in which at least one of two hydrogen atoms on the nitrogen atom is substituted with group independently selected from an alkyl group, a cycloalkyl group, or an aryl group, an alkoxycarbonyl group, an aryloxycarbonyl group, a silyl group, or an sulfonyl group having an alkyl group or an aryl group; $R^{2a}$ represents an alkyl group, an alkenyl group, a cycloalkyl group, a cycloalkenyl group, an aryl group, a nitro group, a formyl group, a heterocyclic group, or a halogen atom; $R^{3a}$ and $R^{4a}$ each independently represent a hydrogen atom, an alkyl group, an alkenyl group, a cycloalkyl group, a cycloalkenyl group, an aryl group, or a heterocyclic group; and each group of $R^{1a}$, $R^{2a}$, $R^{3a}$ and $R^{4a}$ may further have a substituent; and it is noted, however, that in Formula (1), at least one of $R^{1a}$ to $R^{4a}$ while in Formula (2), at least one of $R^{2a}$ to $R^{4a}$ is incorporated into the main chain or the side chain in the form of a boning hand.

<3> The composition for a polarizing plate described in the item <1> or <2>, wherein the mass-average molecular weight of the polymer is a 1,000 or more.

<4> The composition for a polarizing plate described in any one of the items <1> to <3>, wherein the polymer is a poly(meth)acrylate, a substituted polystylene, a polyvinylacylate, a polyester, a polycarbonate, a polymaleimide, or a polyurethane, each of which may be a homopolymer or a copolymer.

<5> The composition for a polarizing plate described in any one of the items <1> to <4>, wherein the polymer has a recurring unit represented by any of the following Formulae (Pa) to (Ph):

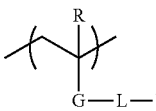

Formula (Pa)

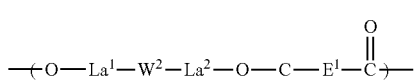

Formula (Pb)

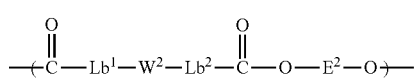

Formula (Pc)

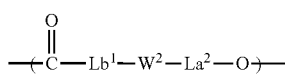

Formula (Pd)

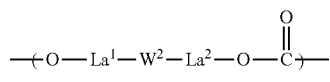

Formula (Pe)

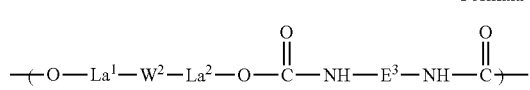

Formula (Pf)

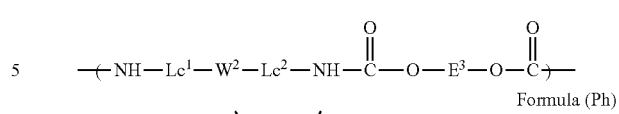

Formula (Pg)

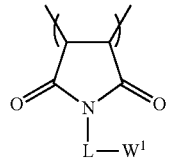

Formula (Ph)

wherein, in Formulae (Pa) to (Ph), $W^1$ represents an univalent group in the partial structure represented by the ring structure α or β; $W^2$ represents a divalent group in the partial structure represented by the ring structure α or β; R represents a hydrogen atom or a methyl group; G represents —O—C(=O)—*, —O—C(=O)—O—*, —C(=O)—O—*, —C(=O)—*, or a phenylene group; here, the boning hand in the side of the symbol * binds to L; L, $La^1$, $La^2$, $Lb^1$, $Lb^2$, $Lc^1$ and $Lc^2$ each independently represent a single bond or a divalent linking group; and $E^1$ to $E^3$ each independently represent a divalent linking group.

<6> The composition for a polarizing plate described in the item <5>, wherein $W^1$ represents an univalent group in the partial structure represented by the ring structure α or β; and $W^2$ represents a divalent group in the partial structure represented by the ring structure β.

<7> The composition for a polarizing plate described in any one of the items <1> to <6>, wherein the polymer has a recurring unit represented by the following Formula (Pa1):

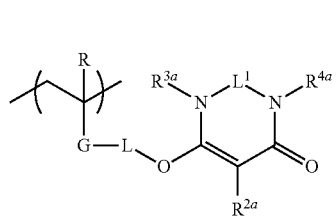

Formula (Pa1)

wherein, in formula (Pa1), R, G and L have the same meaning as the R, G and L of Formula (Pa). Moreover, $L^1$, $R^{2a}$, $R^{3a}$ and $R^{4a}$ have the same meaning as the $L^1$, $R^{2a}$, $R^{3a}$ and $R^{4a}$ of Formula (1).

<8> The composition for a polarizing plate described in the item <5> or <7>, wherein L represents *-Ld-[C(=O)]n- or *-Ld-[-O—C(=O)]n-; Ld represents a single bond or a divalent linking group; n represents 0 or 1; and the boning hand in the side of the symbol * binds to G or a nitrogen atom.

<9> The composition for a polarizing plate described in any one of the items <1> to <8>, further containing a resin, wherein the content of the polymer is from 0.01 to 40 parts by mass with respect to 100 parts by mass of the resin.

<10> The composition for a polarizing plate described in any one of the items <1> to <9>, containing a cellulose acylate or a polyvinyl alcohol-based resin.

<11> The composition for a polarizing plate described in any one of the items <1> to <10>, containing a polyvinyl alcohol-based resin, or an acylated or ketalated polyvinyl alcohol, and dichroic dye.

<12> The composition for a polarizing plate described in any one of the items <1> to <10>, containing a cellulose acylate.

<13> A polarizing plate protective film formed by the composition for a polarizing plate described in any one of the items <1> to <10> and <12>.
<14> A cellulose acylate film containing a cellulose acylate and a polymer having a partial structure represented by the following ring structure α or β in the molecule:

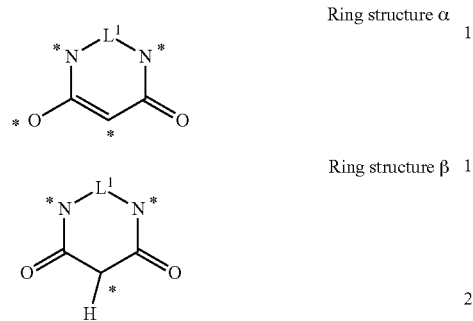

wherein $L^1$ represents a single bond, —C(=O)—, —C(=S)—, an alkylene group, or an arylene group; and the symbol * designates a boning hand, or a she to which a hydrogen atom, a substituent, or a linking group binds.
<15> The cellulose acylate film described in the item <14>, wherein the cellulose acylate film contains a laminate film having at least 2 layers, and in the case of 2 layers, either only one of the layers contains the polymer and in the case of at least 3 layers, at least one of the outer-most surface layers contains the polymer.
<16> A polarizer formed by a composition for a polarizing plate described in any one of the items <1> to <11>.
<17> A polarizing plate having the polarizing plate protective film described in the item <13> or the cellulose acylate film described in the item <14> or <15>.
<18> A polarizing plate having a polarizer described in the item <16>.
<19> A display having a polarizing plate described in the item <17> or <18>.

Herein, in the specification, a numerical range expressed using "to" denotes a range including numerical values indicated before and after the "to" as the minimum value and the maximum value of the range.

Herein, in this specification, unless otherwise specified, a group, which is able to have a substituent (for example, a group having an alkyl moiety, an aryl moiety, or a heterocyclic moiety), may have a substituent. For example, the alkyl group is an alkyl group, which may have a substituent, and the aryl group or the aromatic group is an aryl group or an aromatic group, each of which may have a substituent.

In addition, in the case where any atom has at least two substituents and the case where each of the adjacent bonded atoms has substituent, these substituents may bond to each other to form a ring.

Moreover, in the case where a plurality of groups represented by the same symbol are present and the case where a plurality of groups represented by the same symbol are present as a result of a plurality of repeatings, these may be the same as or different from each other.

In this specification, when a plurality of substituents, linking groups (hereinafter, referred to as "substituent(s) or the like") are simultaneously or alternatively defined herein, respective substituents or the like, may be the same as or different from each other.

In addition, when a specific group is not identified by simply stating "a substituent," "may have a substituent," or the like, unless otherwise specified, a substituent S is referred to. In a similar manner, also in the case of the specific group, unless otherwise specified, a specific group corresponding to the substituent S is referred to.

Advantageous Effects of Invention

The present invention allows provision of a composition for a polarizing plate which enables improvement and also maintenance and enforcement of the polarizer durability under hygrothermal condition, by addition of small amount of the polymer, and also provisions of a polarizing plate protective film, a cellulose acylate film, a polarizer, polarizing plate, and a display, each of which is obtained by the composition for a polarizing plate.

Here, the expression "under hygrothermal condition" has no particular limitation, but means the environments of temperature of 60 to 90° C. and relative humidity of 85% or more.

Other and further features and advantages of the invention will appear more fully from the following description, appropriately referring to the accompanying drawings.

DESCRIPTION OF EMBODIMENTS

Figure 1:
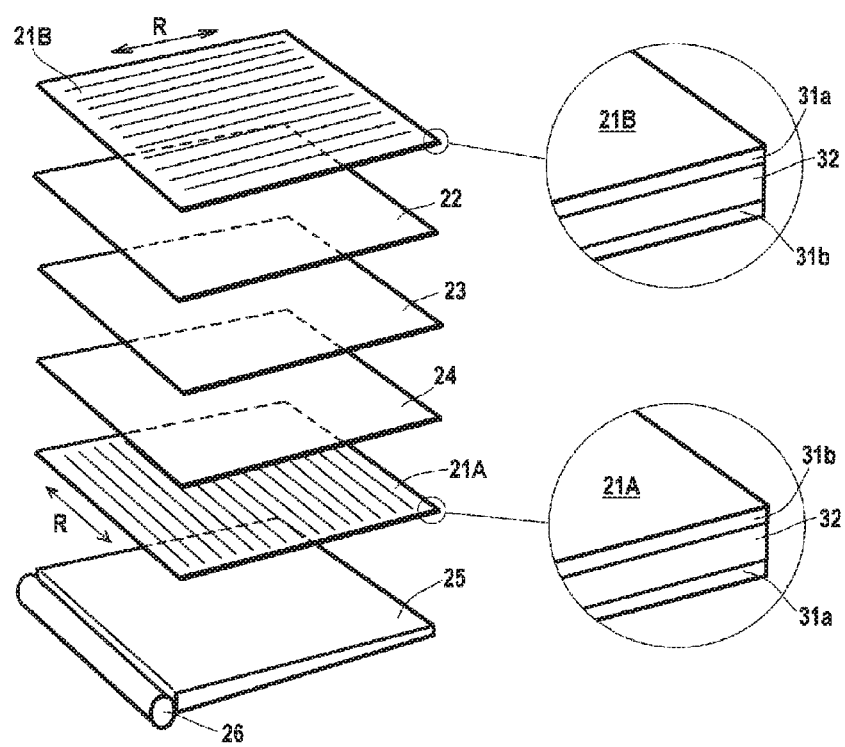
FIG. 1 is an example diagrammatically showing an internal structure of the liquid crystal display of the present invention.

Hereinafter, the present invention is described in detail referring to the embodiments.

The composition for a polarizing plate of the present invention may be used in any kinds of films or layers, as long as the composition can be used in the polarizing plate, or the composition constitutes the polarizing plate.

Examples of the foregoing film or layer include a polarizing plate protective film, a polarizer, an adhesive layer, and further an anti-glare layer, a clear hard coat layer, an antireflective layer, an antistatic layer, an anti-contamination layer, and the like.

In present invention, the composition for a polarizing plate of the present invention is preferably used in a polarizing plate protective film, a polarizer, or an adhesive layer, and is preferably used in a polarizing plate protective film having a laminated structure in particular.

Further in present invention, a cellulose acylate film containing a polymer described below is also a preferable embodiment.

<<Composition for a Polarizing Plate>>

The composition for a polarizing plate (polarizing plate composition) of the present invention contains a particular polymer (hereinafter, also referred to as a polymer of the present invention) described below. In particular, the polarizing plate composition preferably contains a resin in addition to the particular polymer. Further, the polarizing plate composition preferably contains a variety of additives, if needed.

At the start, descriptions are given beginning at the polymer of the present invention.

<Polymer of the Present Invention>

The composition or a polarizing plate of the present invention contains a polymer having a partial structure represented by the following ring structure α or β (in the description, referred to simply as "ring structure α or β") in the molecule.

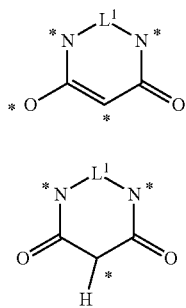

Ring structure α

Ring structure β

In the following ring structure α or β, $L^1$ represents a single bond, —C(=O)—, —C(=S)—, an alkylene group, or an arylene group; and the symbol * designates a boning hand, or a site to which a hydrogen atom, a substituent, or a linking group binds.

The number of carbon atoms of the alkylene group of $L^1$ is preferably 1 to 3, more preferably 1 or 2, and further preferably 1. Examples of the alkylene group include methylene, ethylene and propylene.

The number of carbon atoms of the arylene group of $L^1$ is preferably 6 to 12. Examples of the arylene group include Phenylene and naphthylene.

The alkylene group and the arylene group may have a substituent. Examples of such a substituent include those exemplified as the substituent S.

$L^1$ is preferably a single bond, —C(=O)—, —C(=S)—, or an alkylene group; more preferably a single bond, —C(=O)—, —C(=S)—, or a methylene group; further preferably a single bond, or —C(=O)—; and particularly preferably —C(=O)—.

The symbol * designates a boning hand, or a site to which a hydrogen atom, a substituent, or a linking group binds.

Examples of the substituent to be bonded include groups exemplified by the substituent S. In the same way, examples of the linking group include groups derived from the groups exemplified by the substituent S, for example, a linkage of the group exemplified by the substituent S, or a group formed by replacing a hydrogen atom of the group exemplified by the substituent S with a boning hand. As specific examples, in the case of an alkoxy group, for example, an ethoxy group, the linkage thereof corresponds to "—O—", and the group formed by replacing a hydrogen atom with a boning hand results in "—CH₂CH₂O—".

In the present invention, the ring structure α or β is preferably incorporated into the recurring unit. In particular, the ring structure is preferably incorporated into a main chain or a side chain thereof. In the case where the ring structure is incorporated into a main chain, each of the ring structure α or β is preferably incorporated thereto through at least 2 sections designated by the symbol *. In the case where the ring structure is incorporated into a side chain, each of the ring structure α or β is preferably incorporated thereto through one section designated by the symbol * in the pendant group with respect to the main chain.

The number of the ring structure α or β which the polymer of the present invention has in the molecule is preferably 5 or more, more preferably 6 or more, still more preferably 8 or more, and particularly preferably 10 or more. The upper limit is not particularly limited, but 10,000 or less is practical.

In the present invention, the ring structure α is preferable of the ring structures α and β.

Further, in the case of the ring structure α, it is preferable for the ring structure α to be incorporated into a side chain of the polymer, and it is more preferable for the ring structure α to be incorporated into a side chain of the polymer through the section designated by the symbol * of the "*O—" portion in the ring structure.

On the other hand, the ring structure β may be incorporated into any of the main chain and the side chain of the polymer, but is preferably into the side chain of the polymer.

In the present invention, it is preferable that the polymer leas a partial structure represented by the following Formula (1) or (2) at a main chain or a side chain of the recurring unit thereof.

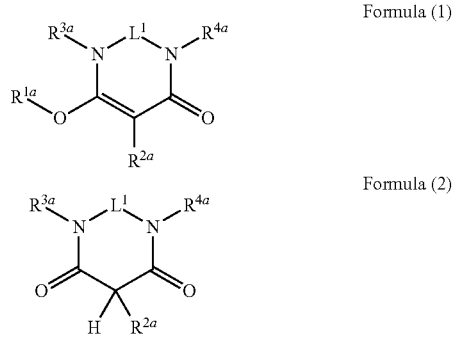

Formula (1)

Formula (2)

In Formulas (1) and (2), represents a single bond, —C(=O)—, —C(=S)—, an alkylene group, or an arylene group. $R^{1a}$ represents a methylene group substituted with a hetero atom, an ethylene group substituted with an electron-withdrawing group, an acyl group, an carbamoyl group in which at least one of two hydrogen atoms on the nitrogen atom is substituted with a group independently selected from an alkyl group, a cycloalkyl group, or an aryl group, an alkoxycarbonyl group, an aryloxycarbonyl group, a silyl group, or a sulfonyl group having an alkyl group or an aryl group (an alkylsulfonyl group or an arylsulfonyl group, referred to as "an alkyl- or aryl-sulfonyl group" in the present invention) $R^{2a}$ represents an alkyl group, an alkenyl group, a cycloalkyl group, a cycloalkenyl group, an aryl group, a nitro group, a formyl group, a heterocyclic group, or a halogen atom. $R^{3a}$ and $R^{4a}$ each independently represent a hydrogen atom, an alkyl group, an alkenyl group, a cycloalkyl group, a cycloalkenyl group, an aryl group, or a heterocyclic group. Each group of $R^{1a}$, $R^{2a}$, $R^{3a}$ and $R^{4a}$ may further have a substituent.

It is noted, however, that in Formula (1), at least one of $R^{2a}$ to $R^{4a}$ while in Formula (2), at least one of $R^{2a}$ to $R^{4a}$ is incorporated into the main chain or the side chain in the form of a boning hand.

Here, the partial represented by Formula (1) corresponds to the ring structure α, and the partial structure represented by Formula (2) corresponds to the ring structure β.

$L^1$ has the same meaning as $L^1$ in ring structure α or β, and preferable ranges are also the same.

[$R^{1a}$]

The $R^{1a}$ will be described given below.

$R^{1a}$ represents a methylene group substituted with a hetero atom, an ethylene group substituted with an electron-withdrawing group, an acyl group, an carbamoyl group in which at least one of two hydrogen atoms on the nitrogen atom is substituted with a group independently selected from an alkyl group, a cycloalkyl group, or an aryl group, an alkoxycarbonyl group, an aryloxycarbonyl group, a silyl group, or an alkyl- or aryl-sulfonyl group.

The methylene group substituted with a hetero atom includes a hetero ring group formed by a mutual bonding of the hetero atom and the carbon atom of the methylene group.

Preferred examples of the hetero atom include an oxygen atom, a nitrogen atom, and a sulfur atom. Among these, an oxygen atom is more preferred.

The methylene group substituted with a hetero atom is preferably a group represented by Formula (a) or (b),

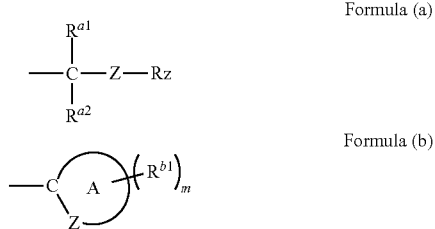

In Formula (a) or (b), Z represents —O—, —S—, or —N(Ra)—. The ring A represents a heterocycle. $R^{a1}$, $R^{a2}$ and Ra each independently represent a hydrogen atom, or a substituent; and $R^{b1}$ represents a substituent. Rz represents an alkyl group, an alkenyl group, a cycloalkyl group, a cycloalkenyl group, an aryl group, or a heterocyclic group. m is an integer of 0 or more.

Examples of the substituent for $R^{a1}$, $R^{2a}$, $R^{b1}$, and Ra include groups exemplified as the substituent S. $R^{a1}$, $R^{a2}$, $R^{b1}$ and Ra each are preferably a hydrogen atom, an alkyl group, or an aryl group; and more preferably a hydrogen atom or an alkyl group.

An alkyl group, an alkenyl group, a cycloalkyl group, a cycloalkenyl group, an aryl group, or a heterocyclic group for Rz is respectively common to an alkyl group, an alkenyl group, a cycloalkyl group, a cycloalkenyl group, an aryl group, or a heterocyclic group for $R^{2a}$ described below, and a preferable range of these groups for Rz is the same as a preferable range of these groups for $R^{2a}$.

The ring A is preferably a 5- or 6-membered ring, and more preferably a 6-membered ring. Further, the ring A-constituting atom except for Z is preferably a carbon atom. The ring A is preferably a saturated ring.

Examples of a preferable ring for the ring A include a tetrahydrofuran ring and a tetrahydropyran ring.

m is preferably 0 or 1, more preferably 0.

$R^{a1}$ and $R^{a2}$ each are preferably a hydrogen atom or an alkyl group; and more preferably a hydrogen atom.

Ra is preferably a hydrogen atom, an alkyl group, an alkenyl group, a cycloalkyl group, a cycloalkenyl group, an aryl group, or a heterocyclic group; and more a hydrogen atom or an alkyl group.

Rz is preferably an alkyl group or an aryl group, and more preferably an a group.

Of the group represented by Formula (a) or (b), the group represented by Formula (a) is preferred.

In ethylene group substituted by the electron-withdrawing group of $R^{1a}$, the electron-withdrawing group is preferably a group having a Hammett equation σ value of 0 or more. Specific examples of a substituent having a positive σp value include: a halogen atom, such as fluorine (0.06), chlorine (0.30), bromine (0.27), and iodine (0.30); a group having carbonyl, such as —CHO (0.22), —COCH$_3$ (0.50), —COC$_6$H$_5$ (0.46), —CONH$_2$ (0.36), —COO— (0.30), —COOH (0.41), —COOCH$_3$ (0.39), and —COOC$_2$H$_5$ (0.45); a group having sulfonyl or sulfinyl, such as —SOCH$_3$ (0.49), —SO$_2$CH$_3$ (0.72), —SO$_2$C$_6$H$_5$ (0.68), —SO$_2$CF$_3$ (0.93), —SO$_2$NH$_2$ (0.57), —SO$_2$OC$_6$H$_5$ (0.23), —SO$_3$— (0.09), and —SO$_3$H (0.50); a nitrogen-containing substituent, such as —CN (0.66), —NO$_2$ (0.78), —N(CH$_3$)$_3^+$ (0.82), and —N(CF$_3$)$_2$ (0.53); and a halogen atom-substituted alkyl group, such as —CCl$_3$ (0.46), —CH$_2$Cl (0.18), —CHCl$_2$ (0.32), and —CF$_3$ (0.54). Herein, a value within a parenthesis represents the σp value.

Hammett's σ value is described in, for example, C. Harsch et al, J. Med. Chem., 16, 1207 (1973), ibid., 20, 304 (1977), and Chem. Rev. 91, 165 (1991).

In the present invention, the Hammett σp value is preferably 0.20 or more. Specifically, examples of the substituent having such Hammett σp value include: an acyl group; an alkoxycarbonyl group; an aryloxycarbonyl group; a carbamoyl group in which at least one of hydrogen atoms is substituted with an alkyl or aryl group (for example, —CONHCH$_3$ (0.32)); a thioacyl group; an alkoxythiocarbonyl group; an aryloxythiocarbonyl group; a thiocarbamoyl group in which at least one of hydrogen atoms is substituted with an alkyl or aryl group (for example, —CSNHCH$_3$ (0.34)); a sulfamoyl group in which at least one of hydrogen atoms is substituted with an alkyl or aryl group (referred to as "an alkyl- or aryl-sulfamoyl group", for example, —SO$_2$N(CH$_3$)$_2$ (0.65)); an sulfonyl group having an alkyl group or an aryl group (for example, —SO$_2$CH$_3$ (0.72)); an alkyl- or aryl-sulfinyl group for example, —SOCH$_3$ (0.49)); a cyano group; a nitro group; and a phosphono group.

The electron-withdrawing group is preferably an acyl group, an alkoxycarbonyl group, an aryloxycarbonyl group, an alkyl- or aryl-sulfonyl group, a cyano group, a nitro group, a carbamoyl group in which at least one of hydrogen atoms is substituted with a group independently selected from an alkyl group, a cycloalkyl group, or an aryl group, or an alkyl- or aryl-sulfamoyl group.

The acyl group of $R^{1a}$ may be either an aromatic acyl group or an aliphatic acyl group, and it is preferable that the acyl group includes a formyl group and has 1 to 20 carbon atoms, and more preferably 2 to 20 carbon atoms.

Examples of the acyl group include formyl, acetyl, propionyl, isobutyryl, pivaloyl, lauroyl, myristoyl, acryloyl, methacryloyl, benzoyl, and naphthoyl.

Among the acyl groups, preferred groups are: a branched alkyl-acyl group (preferably a tert-alkyl carbonyl group), for example, a pivaloyl group and the like; and a phenyl carbonyl group having a substituent at the ortho position.

The carbon number of the carbamoyl group in which at least one of hydrogen atoms is substituted with a group independently selected from an alkyl group, a cycloalkyl group, or an aryl group of $R^{1a}$ is preferably from 2 to 20, and more preferably from 2 to 10.

Examples of the carbamoyl group include N-methylcarbamoyl N,N-dimethylcarbamoyl, N-phenylcarbamoyl, N,N-diphenylcarbamoyl, and N-methyl-N-phenylcarbamoyl.

The number of carbon atoms of the alkoxycarbonyl group of $R^{1a}$ is preferably 2 to 20, and more preferably 2 to 10. The alkoxycarbonyl group is preferably a branched alkoxycarbonyl group, and more preferably a tert-alkyloxycarbonyl group. Examples of the alkoxycarbonyl group include methoxycarbonyl, ethoxycarbonyl, isopropoxycarbonyl, test-butyloxycarbonyl, n-octyloxycarbonyl, and dodecyloxycarbonyl.

The number of carbon atoms of the aryloxycarbonyl group of $R^{1a}$ is preferably 7 to 20, and more preferably 7 to 16. Examples of the aryloxycarbonyl group include phenyloxycarbonyl and naphthyloxycarbonyl.

It is noted that the alkoxycarbonyl group is more preferred than the aryloxycarbonyl group.

The silyl group of $R^{1a}$ is preferably a silyl group substituted with an alkyl group or an aryl group. The number of carbon atoms of the silyl group is preferably 3 to 20, and more preferably 5 to 16. Further, in the case of the alkyl group, the alkyl-substituted silyl group in which at least one of the alkyl groups is a branched alkyl group is preferred. As the branched alkyl group, a tert-alkyl group is preferred in particular. Further, in the case of the sec-alkyl group, at least two of the alkyl groups are preferably a sec-alkyl group.

Further, the silyl group having at least one aryl group is also preferred.

Examples of the silyl group include trimethylsilyl, dimethyl-tert-butylsilyl, triisopropylsilyl, dimethylphenylsilyl, and methyldiphenylsilyl.

The number of carbon atoms of the alkyl- or aryl-sulfonyl group of $R^{1a}$ is preferably 1 to 20, and more preferably 1 to 10.

Examples of the sulfonyl group include methylsulfonyl, isopropylsulfonyl, tert-butylsulfonyl, tert-octylsulfonyl, and phenylsulfonyl.

In the present invention, as for the $R^{1a}$, a methylene group substituted with a hetero atom, an ethylene group substituted with an electron-withdrawing group, an acyl group, the above-described carbamoyl group, an alkoxycarbonyl group, or a silyl group is preferred. Further, a methylene group substituted with a hetero atom, an ethylene group substituted with an electron-withdrawing group, an acyl group, an alkoxycarbonyl group, or a silyl group is more preferred. Further, a methylene group substituted with a hetero atom, an ethylene group substituted with an electron-withdrawing group at the 2-position of the ethylene group, an acyl group, an alkoxycarbonyl group, or a silyl group is still more preferred.

[$R^{2a}$]

The $R^{2a}$ will be described given below.

$R^{2a}$ represents an alkyl group, an alkenyl group, a cycloalkyl group, a cycloalkenyl group, an aryl group, a nitro group, a formyl group, a heterocyclic group, or a halogen atom. Among these, an alkyl group, an alkenyl group, a cycloalkyl group, a cycloalkenyl group, an aryl group, a heterocyclic group, and a halogen atom are preferred; and an alkyl group, a cycloalkyl group, and an aryl group are more preferred.

These groups may have a substituent. Examples of such a substituent include those exemplified as the substituent S.

The number of carbon atoms of the alkyl group of $R^2$ is preferably 1 to 20, more preferably 1 to 10, and further preferably 1 to 8.

Examples of the alkyl group include methyl, ethyl, isopropyl, n-butyl, tert-butyl, 2-ethylhexyl, n-octyl, n-decyl, n-octadecyl, and isooctadecyl. Further, a substituted alkyl group is also preferable, and examples thereof include benzyl, phenethyl and methoxyethyl.

The number of carbon atoms of the alkenyl group of $R^{2a}$ is preferably 2 to 20, more preferably 2 to 10, and further preferably 2 to 5.

Examples of the alkenyl group include vinyl, allyl, isopropenyl, 2-pentenyl, and oleyl.

The number of carbon atoms of the cycloalkenyl group of $R^{2a}$ is preferably 3 to 20, more preferably 5 to 10, and further preferably 5 or 6.

Examples of the cycloalkenyl group include cyclopropyl, cyclopentenyl, and cyclohexenyl.

The number of carbon atoms of the cycloalkenyl group of $R^{2a}$ is preferably 5 to 20, more preferably 5 to 10, and further preferably 5 or 6.

Examples of the cycloalkenyl group include cyclopentenyl, and cyclohexenyl.

The number of carbon atoms of the aryl group of $R^{2a}$ is preferably 6 to 20, more preferably 6 to 10, and further preferably 6 to 8.

Examples of the aryl group include phenyl, and naphtyl.

The number of carbon atoms of the heterocyclic group of $R^{2a}$ is preferably 0 to 20, more preferably 1 to 10, further preferably 2 to 10, and particularly preferably 2 to 5.

The hetero ring of the heterocyclic group is preferably a 5- or 6-membered hetero ring. The hetero ring may be substituted with a substituent, or may be condensed with a benzene ring, an aliphatic ring, or a hetero ring. Herein, examples of such a substituent include those exemplified as the substituent S.

Examples of the heteroatom for constituting the hetero ring of the heterocyclic group may include a nitrogen atom, an oxygen atom, and a sulfur atom. The hetero ring may be an aromatic hetero ring or a non-aromatic hetero ring.

Examples of the hetero ring of the heterocyclic group include a thiophene ring, a furan ring, a pyrrole ring, a pyrazole ring, an imidazole ring, a thiazole ring, an oxazole ring, a triazole ring, a tetrazole ring, a pyridine ring, a pyrazine ring, a triazole ring, a pyrrolidine ring, a pyrroline ring, a pyrazolidine ring, a piperidine ring, a piperazine ring, a morpholine ring, a thiomorpholine ring, and a ring formed by condensing any one of these ring with a benzene ring (e.g. an indole ring, and a benzimidazole ring).

Examples of the halogen atom of $R^{2a}$ include a fluorine atom, a chlorine atom, and a bromine atom.

As $R^{2a}$ any of the substituents described as examples of $R^{A5}$ in the compound represented by Formula (A) described below can be preferably used.

[$R^{3a}$ and $R^{4a}$]

The $R^{3a}$ and $R^{4a}$ will be described given below.

The $R^{3a}$ and $R^{4a}$ represent a hydrogen atom, an alkyl group, an alkenyl group, a cycloalkyl group, a cycloalkenyl group, an aryl group, or a heterocyclic group. The $R^{3a}$ and $R^{4a}$ are preferably a hydrogen atom, an alkyl group, an alkenyl group, a cycloalkyl group, a cycloalkenyl group, or an aryl group, and more preferably a hydrogen atom, an alkyl group, a cycloalkyl group, or an aryl group.

The alkyl group, the alkenyl group, the cycloalkyl group, the cycloalkenyl group, the aryl group, and the heterocyclic group have the same meanings as the alkyl group, the alkenyl group, the cycloalkyl group, the cycloalkenyl group, the aryl group, and the heterocyclic group in $R^{2a}$, and preferable ranges are also the same.

As $R^{3a}$ and $R^{4a}$, any of the substituents described as examples of $R^{3a}$ and $R^{4a}$ in the compound represented by Formula (A) described below can be preferably used.

In the polymer of the present invention, at least one of $R^{1a}$ to $R^{4a}$ in Formula (1) or at least one of $R^{2a}$ to $R^{4a}$ in Formula (2) is incorporated, in the form of a boning hand, into a main chain or a side chain thereof.

In particular, in the partial structure represented by Formula (1), $R^{1a}$ is preferably incorporated, in the form of a boning hand, into a side chain of the polymer. In this case, it is preferred that a group in which one of hydrogen atoms in each of the groups represented by $R^{1a}$ is substituted by a boning hand is incorporated.

In more preferable aspect, a linkage which directly binds to the oxygen atom (section designated by the symbol * of "*O—" in the ring structure α) to which $R^{1a}$ binds, is preferably *—C(=O)—, *—C(=O)—O—, *—C(=O)—N(Ra)—, *—Si($R^{x1}$)($R^{x2}$)—, and *—SO$_2$—. Here, Ra has the same meaning as Ra in the case where Z in Formulae (a) and (b) is —N(Ra)—, and a preferable range thereof is also the same as Ra. $R^{x1}$ and $R^{x2}$ each independently represent an alkyl group or an aryl group, and an alkyl group and an aryl group described with respect to the substituent S are preferred. It is noted that the symbol * designates a site which directly binds to the oxygen atom to which $R^{1a}$ binds.

As the linkage which directly binds to the oxygen atom (section designated by the symbol * of "*O—" in the ring structure α) to which $R^{1a}$ binds, *—C(=O)— and *—C(=O)—O— are preferred among the above-described groups.

The polymer of the present invention may be a polymer having any kinds of structures, as long as the polymer has the above-described ring structure α or β, or the above-described partial structure represented by Formula (1) or (2). However, the polymer is preferably a poly(meth)acrylate, a substituted polystyrene, a polyvinylacylate, polyester, a polycarbonate, a polymaleimide, or polyurethane. Among these polymers, a poly(meth)acrylate, a substituted polystyrene, a polyvinylacylate, and polyester are preferred, and a poly(meth)acrylate, a substituted polystyrene, and a polyvinylacylate are more preferred.

Here, the a poly(meth)acrylate is a collective term of an acrylic polymer and a methacrylic polymer. The collective term includes any of polymers such as a polymer containing only an acrylic polymerization moiety, a polymer containing only a methacrylic polymerization moiety, or a polymer containing a mix of an acrylic polymerization moiety and a methacrylic polymerization moiety.

The polyvinylacylate means the polymer having a recurring unit represented by the following Formula (V-1).

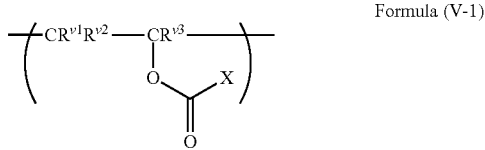

Formula (V-1)

In Formula (V-1), $R^{v1}$ and $R^{v2}$ each independently represent a hydrogen atom, an alkyl group, an aryl group, or an alkoxycarbonyl group; $R^{v3}$ represents a hydrogen atom or an alkyl group; and X presents the partial structure containing the above-mentioned ring structure α or β.

The alkyl group and the aryl group for $R^{v1}$ and $R^{v2}$ each have the same meaning as the alkyl group and the aryl group for $R^{2a}$, and preferable ranges are also the same. The alkoxycarbonyl group for $R^{v1}$ and $R^{v2}$ has the same meaning as the alkoxycarbonyl group for $R^{1a}$, and preferable ranges are also the same. The alkyl group for $R^{v3}$ has the same meaning as the alkyl group for $R^{2a}$, and preferable ranges are also the same.

It is noted that, $R^{v1}$ $R^{v2}$ and $R^{v3}$ each may have a substituent. Examples of such a substituent include those exemplified as the substituent S.

As the polymer of the present invention, among these polymers, those having a reclining unit represented by any of the following Formulae (Pa) to (Ph) are more preferred.

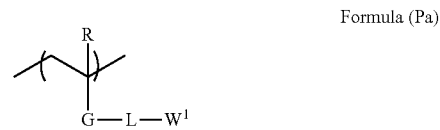

Formula (Pa)

Formula (Pb)

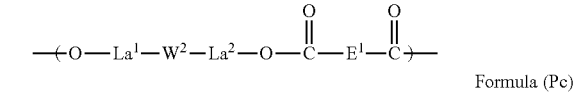

Formula (Pc)

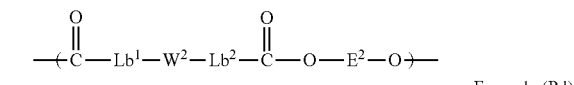

Formula (Pd)

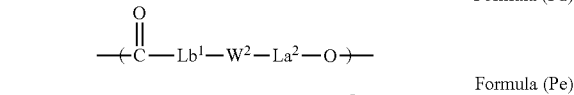

Formula (Pe)

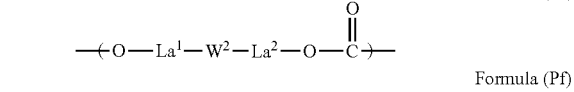

Formula (Pf)

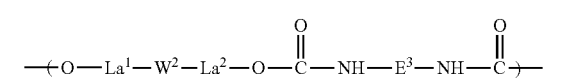

Formula (Pg)

Formula (Ph)

In Formulae (Pa) to (Ph), $W^1$ represents an univalent group in the partial structure represented by the ring structure α or β; $W^2$ represents a divalent group in the partial structure represented by the ring structure α or β. R represents a hydrogen atom or a methyl group. G represents —O—C(=O)—*, —C(=O)—O—*, —C(=O)—*, or a phenylene group. Here, the boning hand in the side of the symbol * binds to L. L, $La^1$, $La^2$, $Lb^1$, $Lb^2$, $Lc^1$ and $Lc^2$ each independently represent a single bond or a divalent linking group. $E^1$ to $E^3$ each independently represent a divalent linking group.

As a divalent linking group in L, $La^1$, $La^2$, $Lb^1$, $Lb^2$, $Lc^1$ and $Lc^2$, an alkylene group, —O—, —C(=O)—, —S—, —N(Ra)—, an arylene group, or a mixed group of these groups is preferred. Here, Ra has the same meaning as Ra in the case where Z in Formulae (a) and (b) is —N(Ra)—, and a preferable range thereof is also the same as Ra.

Among those divalent linking groups, as L, a linking group containing *-Ld-[C(=O)]n- or *-Ld-[-O—C(=O)]n- is preferred, and *-Ld-[C(=O)]n- or *-Ld-[-O—C(=O)]n- is more preferred. Here. Ld represents a single bond or a divalent linking group, n represents 0 or 1, and the side of the symbol * is a bonding hand which binds to G or the nitrogen atom.

Examples of the mixed group of an alkylene group, —O—, —C(═O)—, —S—, —SO$_2$—, —N(Ra)—, or an arylene group include —O—C(═O)—, —C(═O)—O—, —O—C(═O)—O—, —N(Ra)—C(═O)—, —N(Ra)-alkylene-O—C(═O)—*, —O—C(═O)—N(Ra)—, —N(Ra)—SO$_2$—, —SO$_2$—N(Ra)—, -alkylene-C(═O)—*, -alkylene-O—C(═O)—*, -alkylene-O—C(═O)-alkylene-*, -alkylene-O—C(═O)-alkylene-C(═O)—O-alkylene-, -alkylene-O-penylene-alkylene-alkylene-N(Ra)—C(═O)-alkylene-*, -alkylene-O—C(═O)-alkylene-C(═O)—*, -alkylene-O-phenylene-C(═O)—*, -(alkylene-O)ax-C(═O)—*, -(alkylene-O)ax-alkylene-C(═O)—* and -(alkylene-O)ax-alkylene-O—C(═O)—*. Here, ax represents a number of 1 to 10. Further, the symbol * designates a site of $W^1$ or $W^2$.

The number of carbon atoms of the alkylene group is preferably 1 to 10, more preferably 1 to 6, and further preferably 1 to 4.

The divalent linking group in $E^1$ to $E^3$ is a moiety as the result of removal of a functional group (a carboxyl group, a hydroxyl group, or an isocyanate group) from a dicarboxylic acid compound, a diol compound, or a diisocyanate compound, each of which is a material for synthesizing ordinary polyester or polyurethane. Examples of the divalent linking group include an alkylene group, a cycloalkylene group, an arylene group, and a mix of these groups, and further these groups in which a hetero atom is mediated, such as -arylene-O-arylene-, -arylene-S-arylene-, or -arylene-SO$_2$-arylene-. Further, as the divalent group obtained from a diisocyanate compound, a divalent group as the result of removal of an isocyanate group from 3-isocyanatomethyl-3, 5, 5-trimethylcyclohexylisocyanate is also preferred.

In particular, the divalent linking group in $E^1$ to $E^3$ is preferably an alkylene group and an arylene group.

The number of carbon atoms of the alkylene group is preferably from 2 to 10, and examples thereof include ethylene, propylene, pentamethylene, hexamethylene, and octamethylene groups. The number of carbon atoms of the arylene group is preferably from 6 to 20, and examples thereof include phenylene and naphthylene groups. A phenylene group is preferred.

The divalent linking group for L, $La^1$, $La^2$, $Lb^1$, $Lb^2$, $Lc^1$ and the divalent linking group for $E^1$ to $E^3$ may have a substituent. This substituent includes those groups described as examples of the substituent S.

Here, as $W^1$, an univalent group of the partial structure represented by the ring structure α or β is preferred, and an univalent group of the partial structure represented by Formula (1) or (2) is more preferred. As $W^2$, a divalent group of the partial structure represented by the ring structure α or β is preferred, a divalent group of the partial structure represented by the ring structure β is more preferred, and a divalent group of the partial structure represented by Formula (2) is further more preferred.

In the present invention, the univalent group of the partial structure represented by the ring structure α means the group in which the nitrogen atom designated by the symbol *, the carbon atom designated by the symbol *, or the oxygen atom designated by the symbol * is in the form of a bonding hand in the ring structure α, the group forming a part of the side chain of the polymer of the present invention. The univalent group of the partial structure represented by the ring structure β means the group in which the nitrogen atom designated by the symbol * or the carbon atom designated by the symbol * is in the form of a bonding hand in the ring structure β, the group forming a part of the side chain of the polymer of the present invention. The univalent group of the partial structure represented by the Formula (1) or (2) means the group in which one of $R^{1a}$ to $R^{4a}$ is in the form of a bonding hand in the Formula (1), or one of $R^{2a}$ to $R^{4a}$ is in the form of a bonding hand in the Formula (2), the linking group forming a part of the main side of the polymer of the present invention.

The divalent group of the partial structure represented by the ring structure α or β means the linking group in which the two atoms selected from the nitrogen atom designated by the symbol * and the carbon atom designated by the symbol * are in the form of a bonding hand in the ring structure α or β, the linking group forming a part of the main chain of the polymer of the present invention. The divalent group of the partial structure represented by the Formula (1) or (2) means the linking group in which two of $R^{2a}$ to $R^{4a}$ are in the form of a bonding hand in the Formula (1), or two of $R^{2a}$ to $R^{4a}$ are in the form of a bonding hand in the Formula (2), the linking group forming a part of the main chain of the polymer of the present invention.

As the polymer of the present invention, a polymer having a recurring unit represented by the following Formula (Pa1) is preferred in particular.

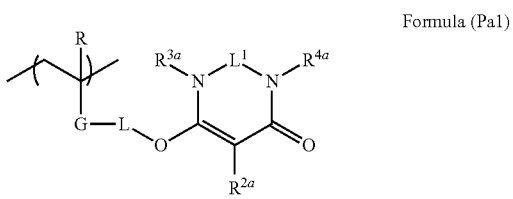

Formula (Pa1)

In formula (Pa1), R, G and L have the same meaning as R, G and L in formula (Pa), and preferable ranges are also the same. $L^1$, $R^{2a}$, $R^{3a}$ and $R^{4a}$ have the same meaning as $L^1$, $R^{2a}$, $R^{3a}$ and $R^{4a}$ in formula (1), and preferable ranges are also the same.

Here, as L, a divalent group of L, in Formula (Pa) is preferred, a linking group containing *-Ld-[C(═O)]n- or *-Ld-[-O—C(═O)]n- is more preferred, and -Ld-[C(═O)]n- or *-Ld-[-O—C(═O)]n- is further preferred. Here, Ld represents a single bond or a divalent group, n represents 0 or 1, and the side of the symbol * is a boning hand which binds to G.

As Ld, specifically exemplified groups of the divalent group of L in Formula (Pa) is also preferred.

The recurring unit represented by Formula (Pa1) is preferably a recurring unit represented by any of the following Formula (Pa1-1) to Formula (Pa1-9).

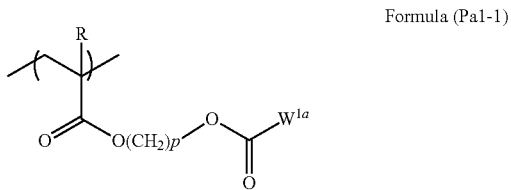

Formula (Pa1-1)

Formula (Pa1-2)

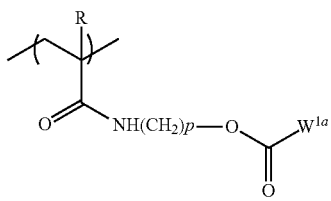

Formula (Pa1-3)

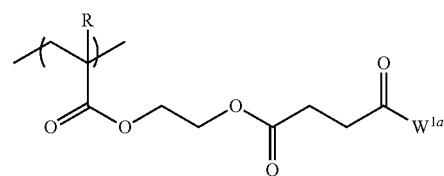

Formula (Pa1-4)

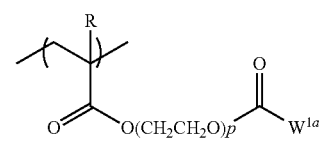

Formula (Pa1-5)

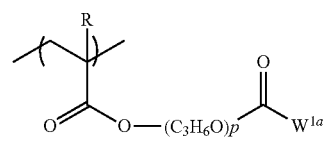

Formula (Pa1-6)

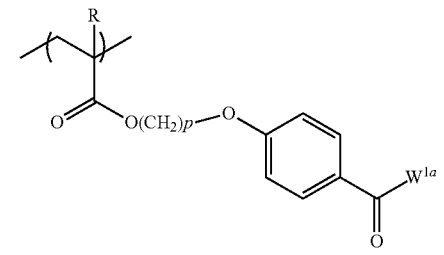

Formula (Pa1-7)

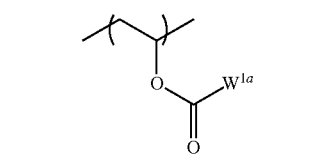

Formula (Pa1-8)

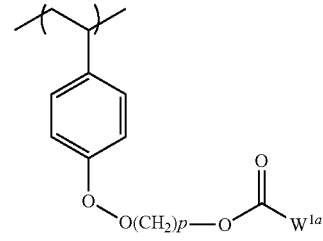

Formula (Pa1-9)

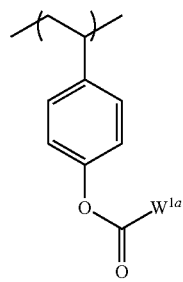

Formula (Px)

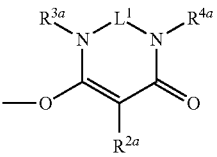

In Formulae (Pa1-1) to Formula (Pa1-9), $W^{1a}$ represents a group represented by Formula (Px). R has the same meaning as R in formula (Pa1), and preferable range is also the same. p represents the integral numbers of 1 to 30. p is preferably the integral numbers of 1 to 20, more preferably the integral numbers of 1 to 8.

In formula (Px), $L^1$, $R^{2a}$, $R^{3a}$ and $R^{4a}$ have the same meaning as $L^1$, $R^{2a}$, $R^{3a}$ and $R^{4a}$ in formula (Pa1), and preferable ranges are also the same.

Specific examples of the group represented by Formula (Px) are shown below, but the present invention is not limited to these. It is noted that, in the following examples, ph represents phenyl and eHex represents cyclohexyl.

Formula (Px)

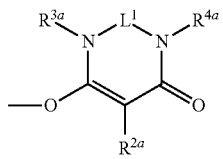

| Compound No. | $L^1$ | $R^{2a}$ | $R^{3a}$ | $R^{4a}$ |
|---|---|---|---|---|
| Px-1 | C(=O) | Ph | Ph | CH$_2$Ph |
| Px-2 | C(=O) | Ph | CH$_2$Ph | Ph |
| Px-3 | C(=O) | CH$_2$Ph | Ph | Ph |
| Px-4 | C(=O) | CH$_2$Ph | Ph | CH$_2$Ph |
| Px-5 | C(=O) | CH$_2$Ph | CH$_2$Ph | Ph |
| Px-6 | C(=O) | Ph | CH$_2$Ph | CH$_2$Ph |
| Px-7 | C(=O) | CH$_2$Ph | CH$_2$Ph | CH$_2$Ph |
| Px-8 | C(=O) | Ph | H | CH$_2$Ph |
| Px-9 | C(=O) | Ph | CH$_2$Ph | H |
| Px-10 | C(=O) | Ph | H | Ph |
| Px-11 | C(=O) | Ph | Ph | H |
| Px-12 | C(=O) | Ph | H | H |
| Px-13 | C(=O) | Ph | CH$_3$ | CH$_3$ |
| Px-14 | C(=O) | Ph | cHex | cHex |
| Px-15 | C(=O) | CH$_2$Ph | H | CH$_2$Ph |
| Px-16 | C(=O) | CH$_2$Ph | CH$_2$Ph | H |
| Px-17 | C(=O) | CH$_2$Ph | H | Ph |
| Px-18 | C(=O) | CH$_2$Ph | Ph | H |
| Px-19 | C(=O) | CH$_2$Ph | H | H |
| Px-20 | C(=O) | CH$_2$Ph | CH$_3$ | CH$_3$ |
| Px-21 | C(=O) | CH$_2$Ph | cHex | cHex |
| Px-22 | C(=O) | CH$_3$ | H | H |
| Px-23 | C(=O) | CH$_3$ | Ph | Ph |
| Px-24 | C(=O) | C$_2$H$_5$ | H | H |
| Px-25 | C(=O) | i-C$_3$H$_7$ | CH$_3$ | CH$_3$ |
| Px-26 | C(=O) | n-C$_4$H$_9$ | Ph | CH$_2$Ph |
| Px-27 | C(=O) | n-C$_4$H$_9$ | CH$_2$Ph | Ph |

-continued

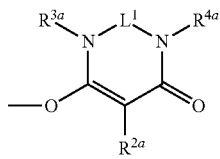
Formula (Px)

| Compound No. | L' | $R^{2a}$ | $R^{3a}$ | $R^{4a}$ |
|---|---|---|---|---|
| Px-28 | C(=O) | n-C$_4$H$_9$ | Ph | Ph |
| Px-29 | C(=O) | n-C$_4$H$_9$ | CH$_3$ | CH$_3$ |
| Px-30 | — | n-C$_4$H$_9$ | Ph | Ph |
| Px-31 | — | n-C$_4$H$_9$ | CH$_3$ | CH$_3$ |
| Px-32 | — | CH$_2$Ph | Ph | Ph |

The polymer of the present invention may be a homopolymer composed of only a recurring unit having the above-described ring structure α or β, or a partial structure represented by Formula (1) or (2), or alternatively a copolymer having such a recurring unit.

In the case where the polymer of the present invention is a poly(meth)acrylate, a substituted polystyrene, a polyvinylacylate, or a polymaleimide, the copolymerizable monomer for obtaining a recurring unit which constitutes the foregoing copolymer portion includes compounds having an ethylenycally unsaturated double bond such as (meth) acrylic acid, crotonic acid, (meth) acrylate ester, (meth)acrylic acid amide [in particular, 2-(meth) acrylamide-2-methylsulfonic acid], acrylonitrile, vinylsulfonic acid, styrene, p-methylstyrene, styrenesulfonic acid, styrenecarboxylic acid, vinyl alcohol, vinyl acetate, vinyl chloride, allyl alcohol, olefins (for example, ethylene, propylene, butylene, isobutylene), butadiene, chloroprene, and the like. It is noted that, in the above monomers, the acid group may be its salt. This salt may be an alkali metal salt or a salt with an onium ion such as ammonium or the like. Among salts, an alkali metal salt is preferred, and a potassium salt and a sodium salt are more preferred.

Among these copolymerizable monomers, monomers having an acid group are preferred. Of these monomers, (meth) acrylic acid, crotonic acid, styrenecarboxylic acid, vinylsulfonic acid, styrenesulfonic acid, and 2-(meth) acrylamide-2-methylsulfonic acid are preferred. In particular, (meth) acrylic acid is preferred.

In the case where the polymer of the present invention is polyester, polycarbonate or polyurethane, as the copolymerizable monomer, a dicarboxylic acid compound, a diol compound, a hydroxydicarboxylic acid compound, and a diisocyanate compound are preferred.

These compounds are represented by the following Formulae (c1) to (c4).

$$HOOC-E^1-COOH \quad \text{Formula (c1)}$$

$$HO-E^2-OH \quad \text{Formula (c2)}$$

$$OCN-E^3-NCO \quad \text{Formula (c3)}$$

$$HO-E^4-COOH \quad \text{Formula (c4)}$$

In Formulae (c1) to (c4), $E^1$ to $E^4$ each independently represent a divalent linking group.

$E^1$ to $E^3$ have the same meaning as $E^1$ to $E^3$ in formulas (Pb) (Pc), (Pf) and (Pg), and preferable ranges are also the same. $E^4$ has the same meaning as $E^1$ to $E^3$, and preferable range is also the same.

Examples of the compound represented by Formula (c1) include an aliphatic dicarboxylic acid, such as malonic acid, succinic acid, maleic acid, fumaric acid, glutaric acid, adipic acid, pimelic acid, suberic acid, azelaic acid, sebacic acid, dodecanedioic acid and 1,4-cyclohexanedicarboxylic acid; and an aromatic dicarboxylic acid, such as phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, and 2,6-naphthalenedicarboxylic acid.

Examples of the compound represented by Formula (c2) include ethylene glycol, diethylene triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol 1,6-hexanediol, hexanetriol, 3-methylpentane-1,3,5-triol 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 2,2,4-trimethyl-1,3-pentanediol, 2-ethyl-1,3-hexanediol, 2-methyl-1,8-octanediol, 1,9-nonanediol, 1,10-decanediol, pinacol, trimethylolpropane, trimethylolethane, and bisphenol compounds (e.g., bisphenol A, bisphenol AP, bisphenol AF, bisphenol B, bisphenol BP, bisphenol C, bisphenol bisphenol FG, bisphenol M, bisphenol S, bisphenol P, bisphenol PH, bisphenol TMG, and bisphenol Z).

Examples of the aromatic diisocyanate compound represented by Formula (c3) include 2,4-tolylene diisocyanate, dimer of 2,4-tolylene diisocyanate, 2,6-tolylene diisocyanate, p-xylene diisocyanate, m-xylene diisocyanate, 4,4'-diphenylmethane diisocyanate, 1,5-naphthylene diisocyanate, and 3,3'-dimethylbiphenyl-4,4'-diisocyanate. Examples of the aliphatic diisocyanate compound represented by Formula (c3) include hexamethylene diisocyanate, trimethylhexamethylene diisocyanate, lysine diisocyanate, and dimer acid diisocyanate. Examples of the alicyclic diisocyanate compound represented by Formula (c3) include isophorone diisocyanate, 4,4'-methylenebis(cyclohexyl isocyanate), methylcyclohexane-2,4-(or 2,6-)diisocyanate, and 1,3-(isocyanatemethyl)cyclohexane. Other examples thereof include a diisocyanate compound of a product of reaction between a diol and a diisocyanate, such as a 1,3-butylene glycol (1 mole)-tolylene diisocyanate (2 mole) adduct or the like.

Examples of the compound represented by Formula (c4) include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, 3,5-dihydroxybenzoic acid, 2,2-bis(hydroxymethyl)propionic acid, 2,2-bis(hydroxymethyl) propionic acid, 2,2-bis(3-hydroxypropyl)propionic acid, bis(hydroxymethyl)propionic acid, bis(4-hydroxyphenyl)acetic acid, 2,2 bis(hydroxymethyl)butyric acid, 4,4-bis(4-hydroxyphenyl) pentanoic acid, N,N-dihydroxyethyl glycine, and N,N-bis(2-hydroxyethyl)-3-carboxy-propionamide.

As the compound represented by Formula (c4), a lactone is also preferred. Examples thereof include ε-caprolactone, δ-valerolactone, γ-butyrolactone, and β-propiolactone.

It is noted that these compounds are the same as those compounds described above as an origin of $E^1$ to $E^3$ in formulas (Pb), (Pc), (Pf) and (Pg), and those compounds are applied to these compounds without any change.

In the present invention, in the case where the polymer contains a copolymerizable component (copolymerizable monomer), the molar ratio of the recurring unit having the above-described ring structure α or β, or a partial structure represented by Formula (1) or (2) and the copolymerizable component is preferably from 99:1 to 1:99, and more preferably from 95:5 to 5:95.

The mass-average molecular weight of the polymer of the present invention is preferably 1,000 or more, more preferably from 1,000 to 100,000, still more preferably from 2,000 to 100,000, and particularly preferably from 3,000 to 50,000.

It is noted that, in the present invention, the mass-average molecular weight is a polystyrene-equivalent value measured using gel permeation chromatography (GPC) (for example, trade name: IMC-8020, manufactured by Tosoh Corporation/4 columns: trade name: TSKguardcolumn SuperHZ-H, TSKgel SuperHZM-H, TSKgel SuperHZ4000, TSKgel SuperHZ2000, manufactured by Tosoh Corporation).

In the case where a film is formed by the polarizing plate composition of the present invention as the mass-average molecular weight of the polymer becomes higher, this allows localization of the polymer of the present invention to a particular layer or a surface side. In this case, the mass-average molecular weight is preferably from 5,000 to 100,000.

On the other hand, in the case of incorporating the polymer of the present invention in a polariziser (layer), the polarizing plate composition of the present invention may be directly added to the resin to form a polariziser during a production step of the polariziser. However, it is preferred to produce a polariziser and then to coat the polarizing plate composition of the present invention (preferably its solution) on the polariziser thereby diffusing the polymer of the present invention into the polariziser. In this case, the polymer of the present invention is preferably a polymer having a structure (the structure is preferably provided by a copolymerizable component) containing a water-soluble group, for example, a carboxylic group, a sulk) group, or a hydroxyl group. Further, the mass-average molecular weight is preferably from 1,000 to 20,000.

It is noted that although a detailed mechanism of the function effect based on the polymer of the present invention is not known, the polymer is estimated to contribute to stabilization of a complex of iodine and polyvinyl alcohol or its acylated or ketalated body (iodine PVA complex).

For this reason, by localization of the polymer of the present invention in the vicinity (including the surface) of a polarizer (layer), the polymer of the present invention is estimated to stabilize the iodine PVA complex in the polarizer (layer) thereby more effectively contributing to an effect of improvement in polarizer durability. Of the polymer of the present invention, the polymer having a partial structure represented by Formula (1) is thought to be able to more effectively improve durability over a long time by, for example, releasing with age this partial structure into outside of the molecule.

A method of achieving localization of the polymer of the present invention in the vicinity of a polarizer (layer) is described below.

A reason for allowing improvement of durability by the addition of small amounts of the polymer is estimated to be based on the localization of the polymer of the present invention in the vicinity of a polarizer (layer) by which its effect can be exhibited efficiently.

Further, a reason for improvement of durability for a long period of time is estimated to be based on the localization of the polymer of the present invention in the vicinity of a polarizer (layer), so that the polymer does not diffuse into other layers for a long period of time.

Further, in addition to this, in the case where the polymer of the present invention exists in high density in the vicinity of a polarizer (layer), such densely existing polymer is estimated to have an effect of suppressing penetration of water into the polarizer layer, and outflow of a boric acid and a polyiodine complex in the polarizer layer into other layers.

Specific examples of the polymer of the present invention are shown below, but the present invention is not limited to these.

It is noted that a/b is a molar ratio basis.

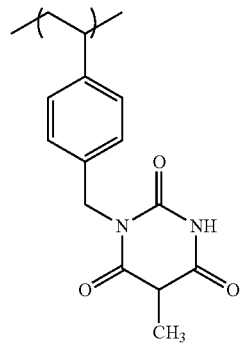

(P-101)

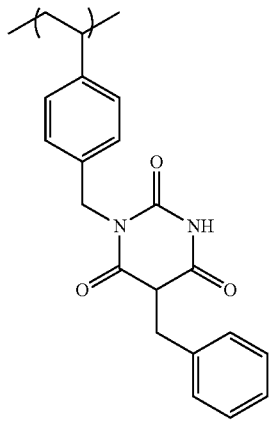

(P-102)

-continued
(P-103)
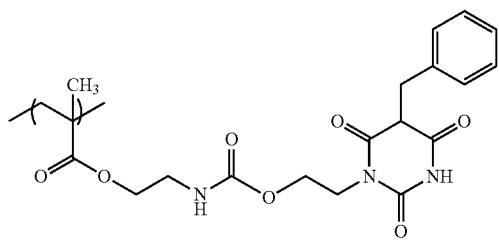
(P-104)
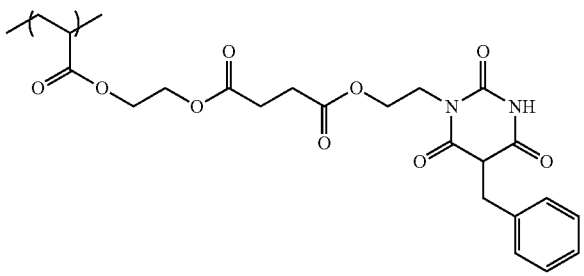
(P-105)
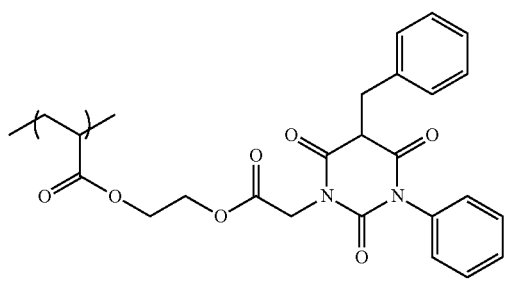
(P-106)
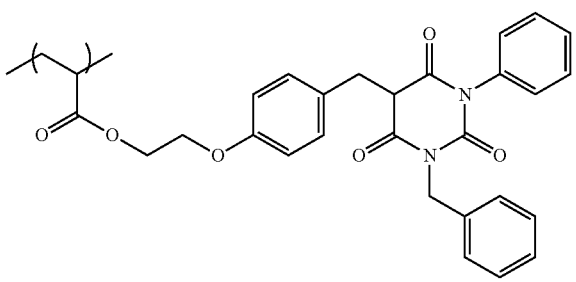
(P-107)
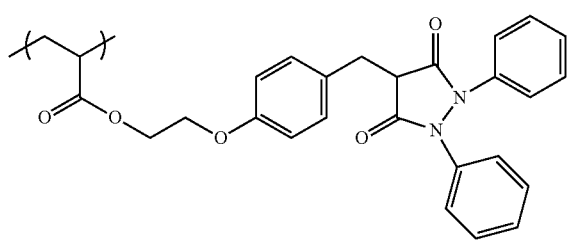
(P-108)
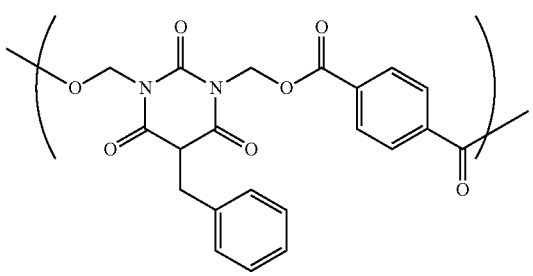
(P-109)
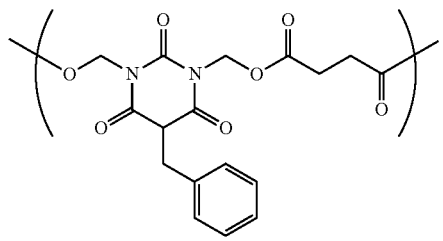
(P-110)
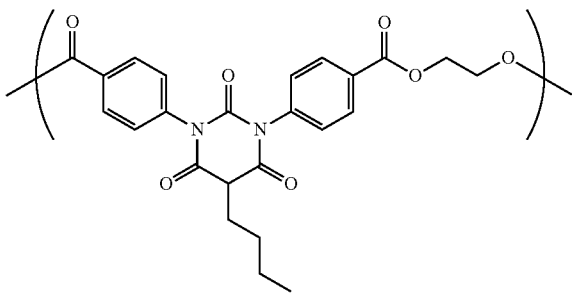
(P-111)
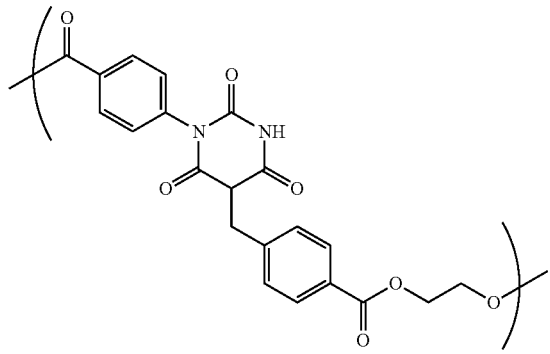
(P-112)
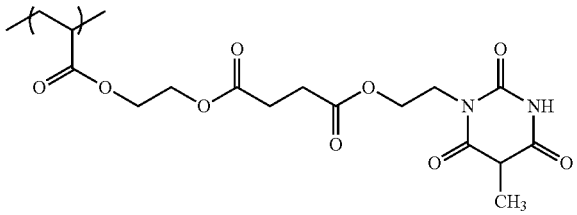

-continued
(P-113)
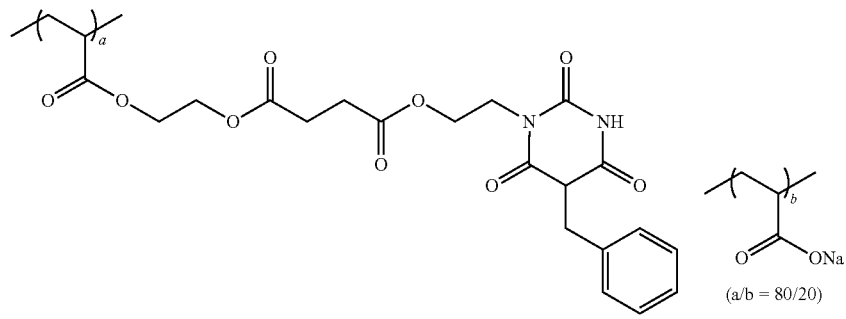
(a/b = 80/20)
(P-114)
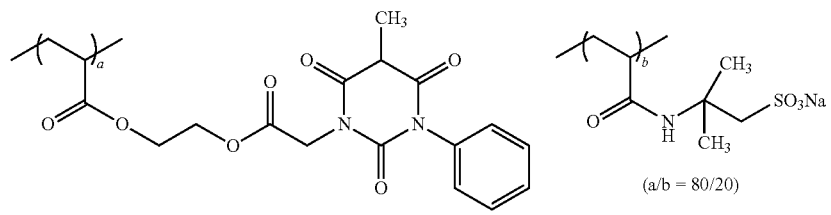
(a/b = 80/20)
(P-115)
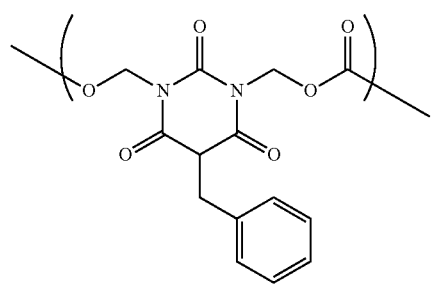
(P-116)
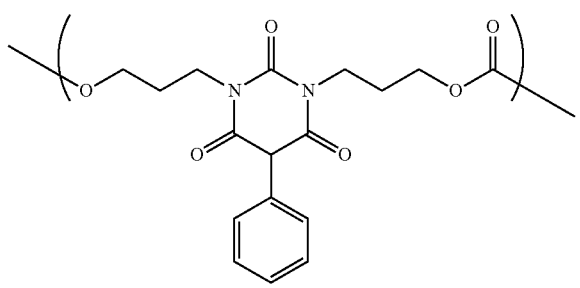
(P-117)
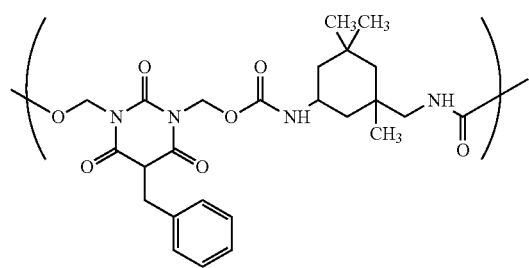
(P-118)
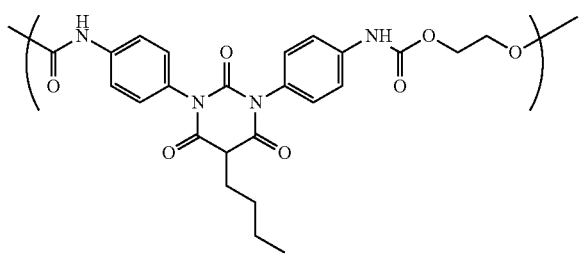
(P-119)
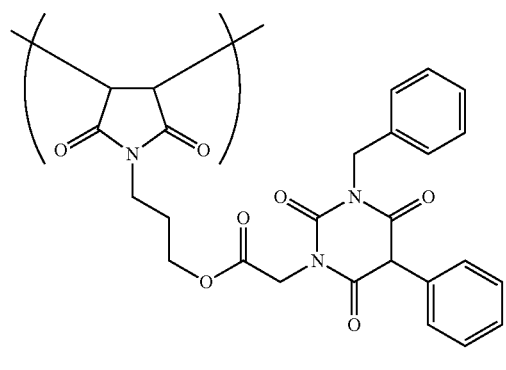
(P-120)
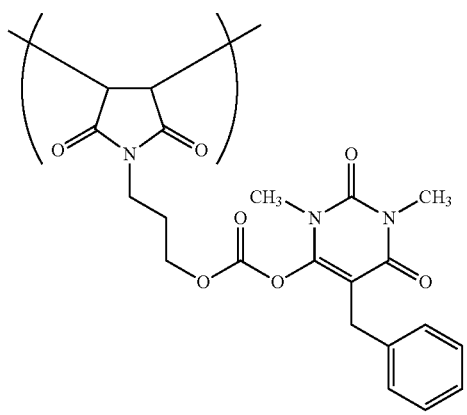

-continued
(P-201)
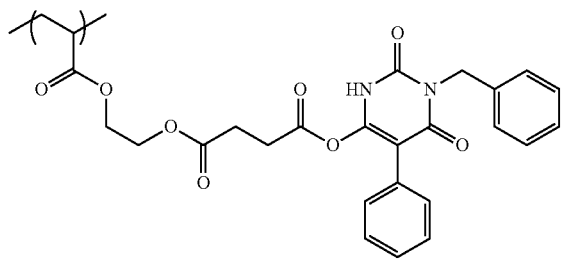
(P-202)
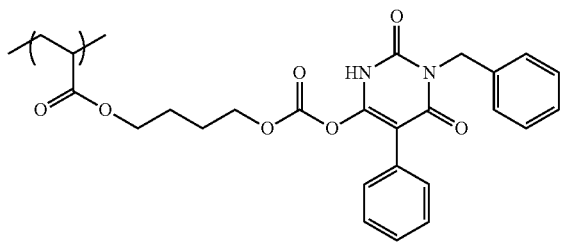
(P-203)
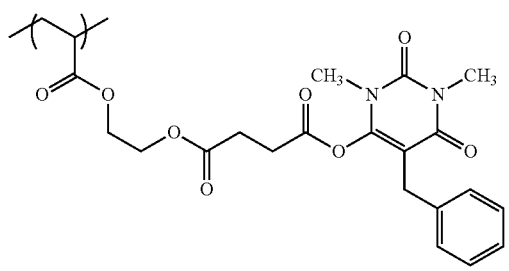
(P-204)
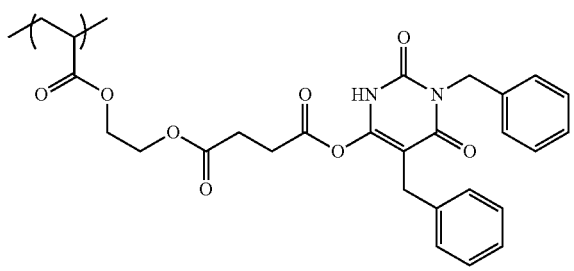
(P-205)
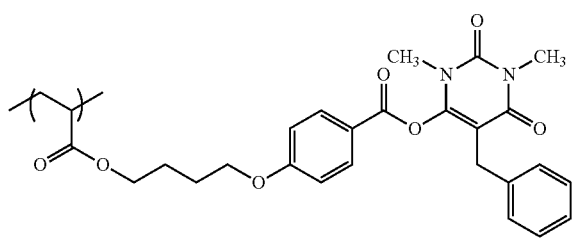
(P-206)
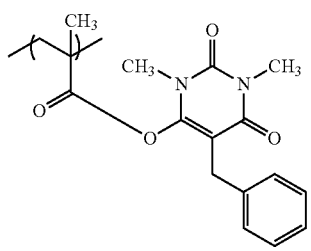
(P-207)
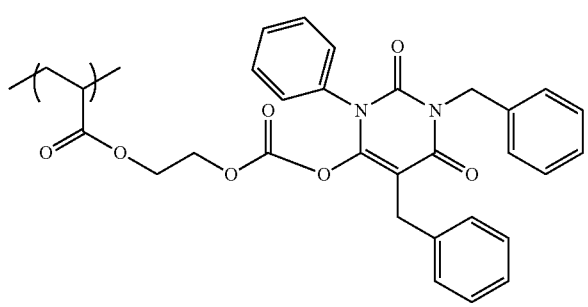
(P-208)
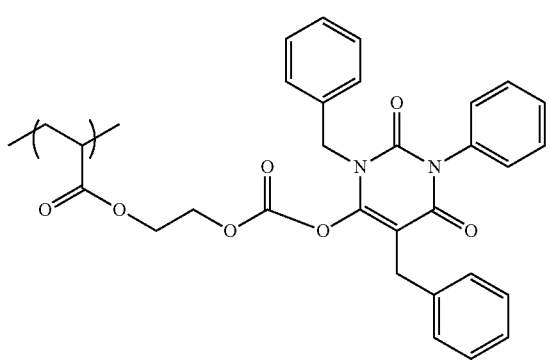
(P-209)
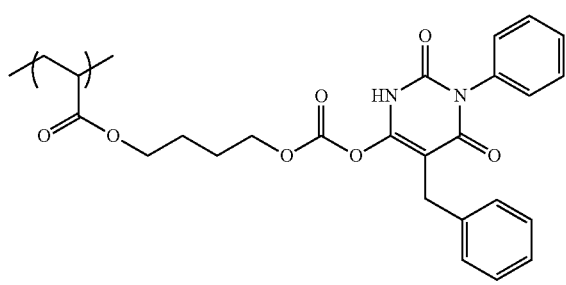
(P-210)
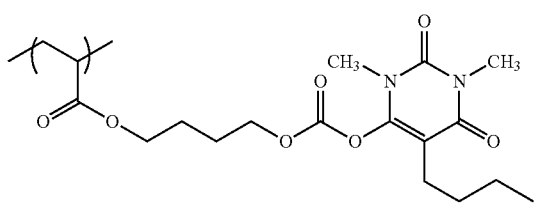

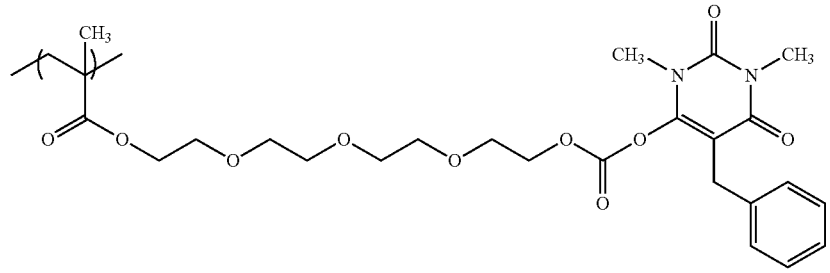
(P-211)
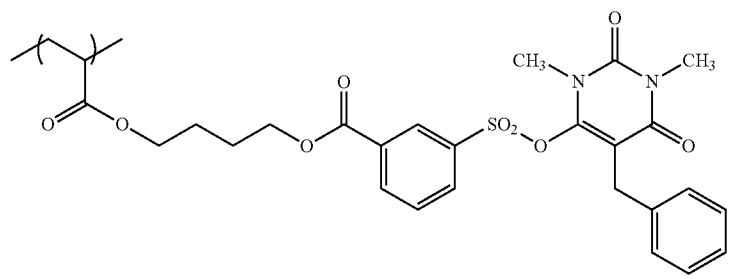
(P-212)
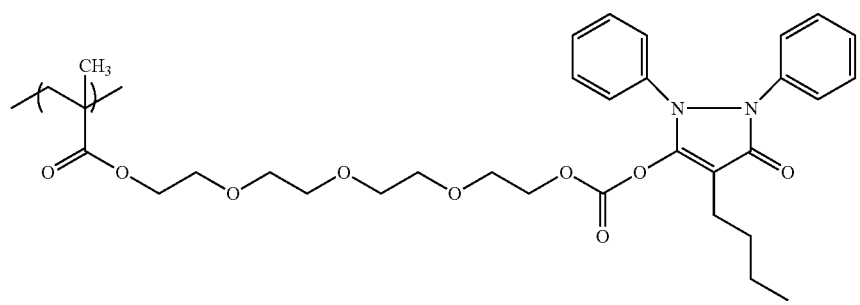
(P-213)
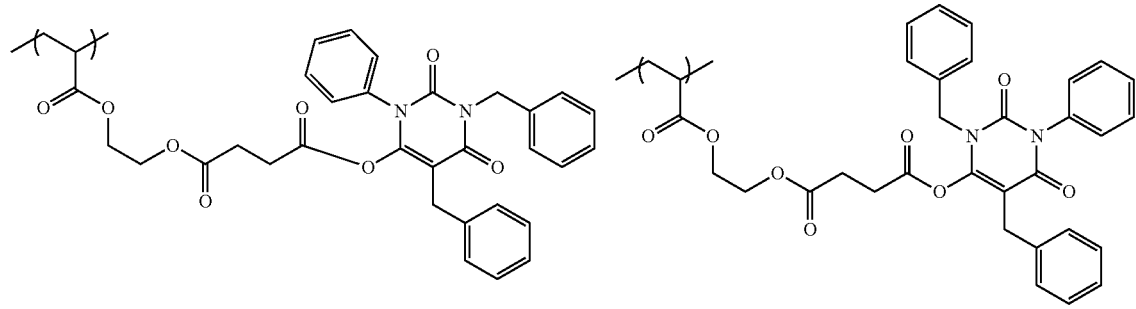
(P-214)
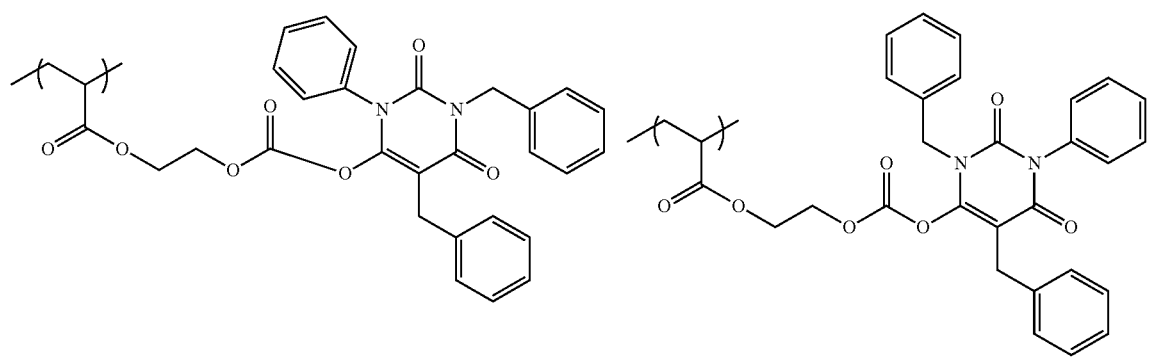
(P-215)

-continued
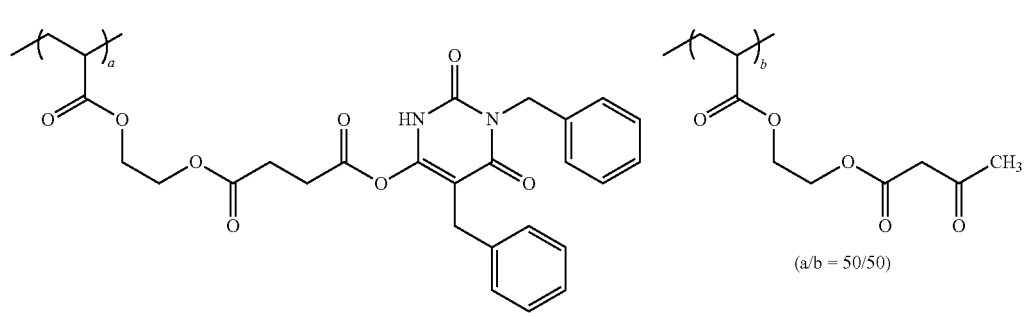
(P-216)
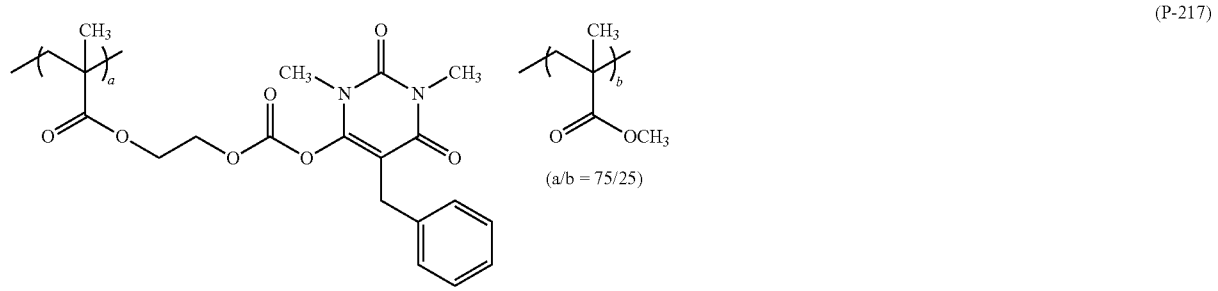
(P-217)
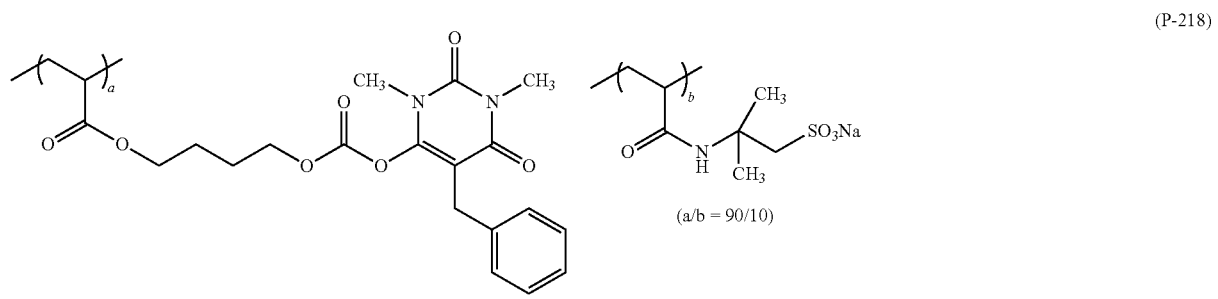
(P-218)
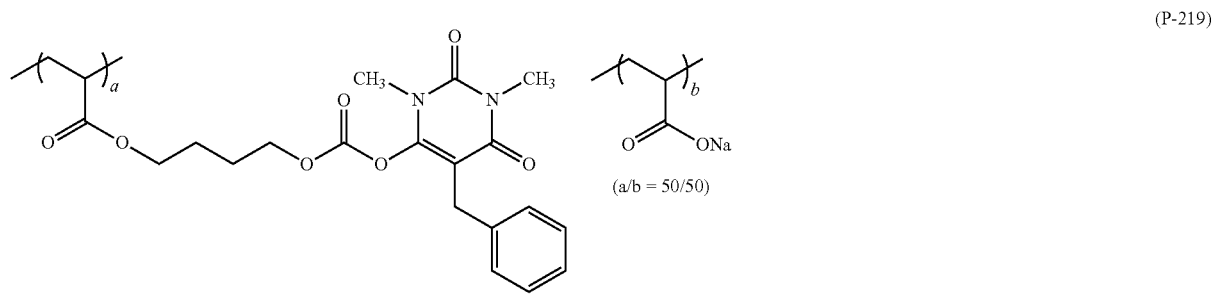
(P-219)
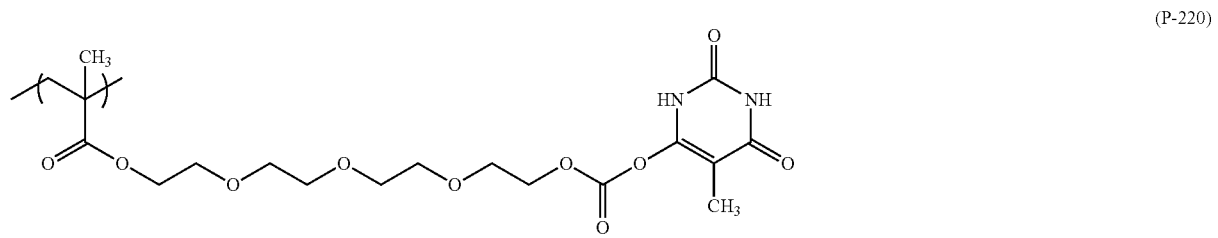
(P-220)

-continued
(P-221)
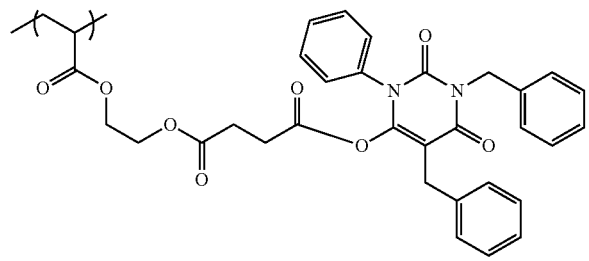
(P-222)
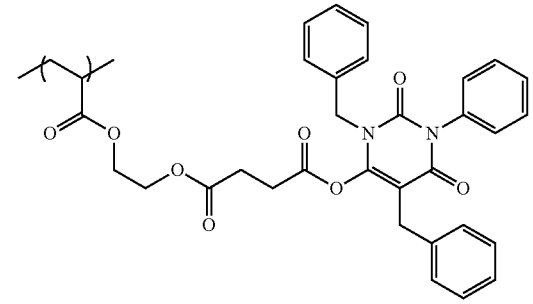
(P-223)
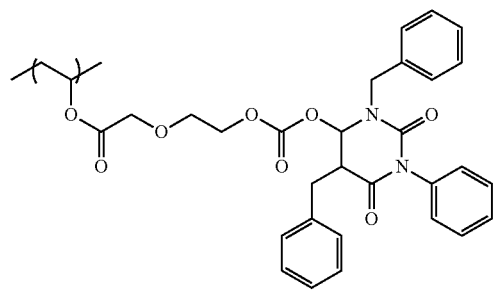
(P-224)
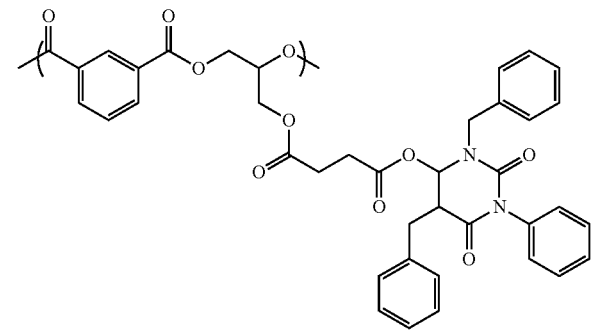
(P-225)
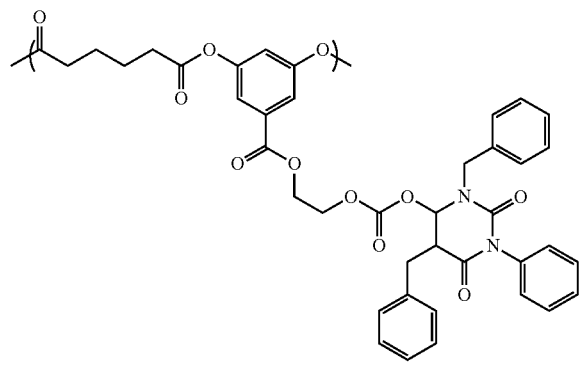
(P-226)
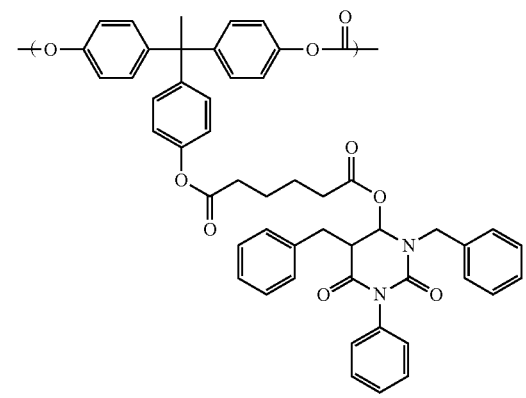
(P-227)
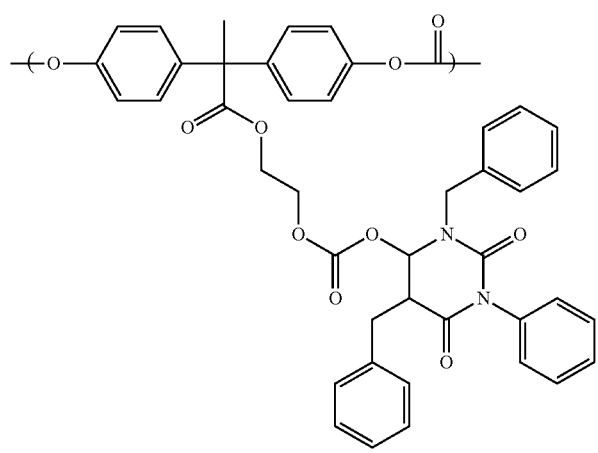

-continued

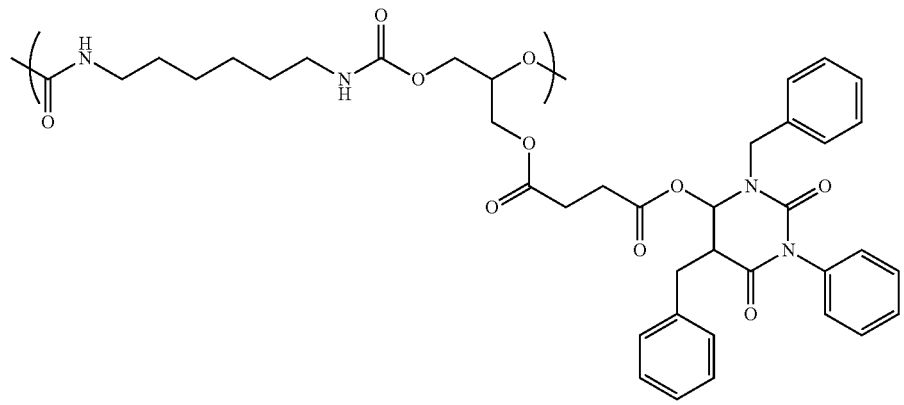
(P-228)

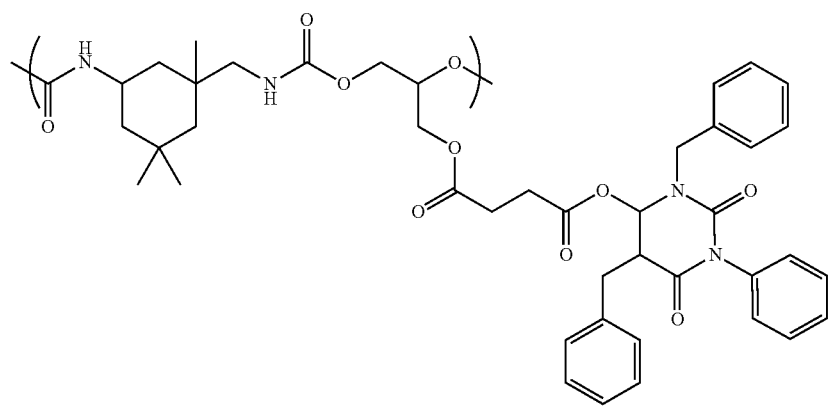
(P-229)

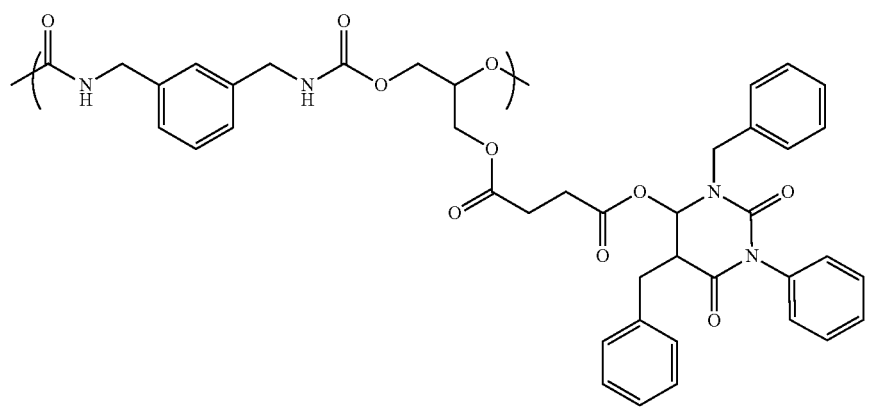
(P-230)

As a method of synthesizing the polymer of the present invention, there area method of obtaining the polymer by synthesizing a monomer containing a ring structure α or β, and then polymerizing the monomer, and a method of using a high molecular reaction. In each of these methods, a known synthesizing method can be used.

The polarizing plate composition of the present invention may contain a various kinds of materials other than the polymer of the present invention.

Among them, the polarizing plate composition of the present invention preferably contains a compound represented by Formula (A).

By a combination with the compound represented by Formula (A), an effect of the present invention is further enhanced. In addition to this effect, optical polarizer durability is also enhanced.

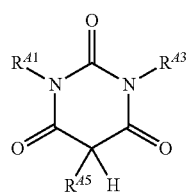

Formula (A)

In formula (A), $R^{A1}$ and $R^{A3}$ each independently represent a hydrogen atom, an alkyl group, a cycloalkyl group, an alkenyl group, or an aromatic group. Herein, the alkyl group, the cycloalkyl group, the alkenyl group, and the aromatic group may have a substituent. $R^{A5}$ represents a hydrogen atom or a substituent.

The compound represented by formula (A) also includes a tautomer or a salt thereof having a structure in which a hydrogen atom in a ring structure is enolized with a carbonyl in the adjacent ring structure, or in which an imidic acid is formed when $R^{41}$ and $R^{43}$ each are a hydrogen atom.

The alkyl group of $R^{41}$, $R^{43}$, and $R^{45}$ is preferably that having from 1 to 20 carbon atoms, more preferably from 1 to 10 carbon atoms, further preferably 1 to 5 carbon atoms, and particularly preferably from 1 to 3 carbon atoms. Among these, methyl group or ethyl group is preferred. When the alkyl group is an alkyl group in which a group having a ring structure is substituted, the alkyl group is preferably that having from 7 to 20 carbon atoms, more preferably from 7 to 12 carbon atoms, further preferably from 7 to 10 carbon atoms. The ring structure of the alkyl group having a ring structure may be an aromatic ring (including a heteroaromatic ring) or an aliphatic ring, and is preferably an aromatic hydrocarbon ring or an aliphatic ring. Examples of the alkyl group having a ring structure include benzyl group and phenethyl group. Of these, benzyl group is particularly preferable.

The cyclo group of $R^{41}$ and $R^{43}$ is preferably that having from 3 to 20 carbon atoms, more preferably from 3 to 10 carbon atoms, further preferably from 4 to 8 carbon atoms, and particularly preferably 5 or 6 carbon atoms. Examples of the cycloalkyl group include cyclopropyl, cyclopentyl, and cyclohexyl. Of these, cyclohexyl is particularly preferable.

The alkenyl group of $R^{41}$ and $R^{43}$ is preferably that having from 2 to 20 carbon atoms, more preferably from 2 to 10 carbon atoms, and further preferably from 2 to 5 carbon atoms. Examples include vinyl and allyl.

The aromatic group of $R^{41}$ and $R^{43}$ may be an aromatic hydrocarbon group or an aromatic heterocyclic group, and is preferably an aromatic hydrocarbon group.

The aromatic hydrocarbon group is preferably that having from 6 to 20 carbon atoms, more preferably from 6 to 16 carbon atoms, and further preferably from 6 to 12 carbon atoms. As the aromatic hydrocarbon group, phenyl or naphtyl is preferred, and phenyl is more preferred.

The aromatic heterocyclic group is preferably a 5- or 6-membered hetero ring, and may be condensed with a benzene ring or a hetero ring. The heteroatom for constituting the hetero ring of the aromatic heterocyclic group is preferably a nitrogen atom, an oxygen atom, or a sulfur atom. The aromatic heterocyclic group is preferably that having from 0 to 20 carbon atoms, more preferably from 1 to 16 carbon atoms, and further preferably from 3 to 12 carbon atoms. Examples of such a hetero ring include: a pyrrole ring, a thiophene ring, a furan ring, a pyrazole ring, an oxazole ring, a thiazole ring, a pyridine ring, and an indole ring.

Examples of the substituent of $R^{45}$ include those exemplified as the substituent S. An alkyl group, a cycloalkyl group, an alkenyl group, an aromatic group, a halogen atom, a formyl group, an acyl group, a cyano group, and a water-soluble group are preferred.

Herein, the water-soluble group is a group that increases solubility of the compound in water, and is a group of an anion or a cation or is a group that dissociated to be anionized (for example, pKa being preferably 10 or less).

Specific examples of such a group include: a sulfa group or a salt thereof, a carboxy group or a salt thereof, a phosphate group or a salt thereof, a hydroxy group, a mercapto group, an amino group, an onio group (preferably, an ammonio group), a sulfonamide group, an acylsulfamoyl group ($-SO_2NH-SO_2R$:R represents an alkyl group or an aryl group), an alkyl- or aryl-sulfonylsulfamoyl group, and a group having an active methine or active methylene structure.

In addition, the hydroxy group, the mercapto group, the amino group, the sulfonamide group, the acylsulfamoyl group, the alkyl- or aryl-sulfonylsulfamoyl group, and the group having an active methine or active methylene structure include any of those groups in a salt state.

$R^{45}$ is preferably a hydrogen atom, an alkyl group, a cycloalkyl group, an alkenyl group, an aromatic group, a formyl group, or an acyl group.

When $R^{41}$, and $R^{45}$ each are an alkyl group, a cycloalkyl group, an alkenyl group, or an aromatic group, examples of the substituent which they may have, include those exemplified as the substituent S. Among those, an alkyl group, a cycloalkyl group, alkenyl group, an aromatic group, a heterocyclic group, an alkoxy group, an alkylthio group, an alkylsulfonyl group, a halogen atom, a formyl group, an acyl group, a silyl group, or a water-soluble group is preferred; an alkyl group, a cycloalkyl group, an aryl group, a heterocyclic group, an alkoxy group, an alkylthio group, an alkylsulfonyl group, a halogen atom, a formyl group, an acyl group, a silyl group, or a water-soluble group is more preferred; and an alkyl group, a cycloalkyl group, an aryl group, a heterocyclic group, an alkoxy group, an alkylthio group, an alkylsulfonyl group, a halogen atom, a formyl group, an acyl group, a hydroxy group, a sulfo group or a salt thereof, a carboxy group or a salt thereof, a boronic acid group or a salt thereof, a carbamoyl group, a sulfamoyl group, or an onio group (preferably an ammonio group including a quaternary ammonio group) is further preferred.

The compound represented by formula (A) is generally classified into two kinds described below as the respective preferred range, although the compound depends on the purpose of use.

A preferred first aspect is a compound in combination with the following substituents.

The aspect refers to the compound in which $R^{41}$, $R^{43}$ and $R^{45}$ are each independently a hydrogen atom, an alkyl group, a cycloalkyl group, an alkenyl group, or an aromatic group; the alkyl group, the cycloalkyl group, the alkenyl group, and the aromatic group may have a substituent; and as a preferred substituent, the compound has a substituent other than the water-soluble group, in the substituent S.

The substituent which each of those groups may have, is preferably an alkyl group, a cycloalkyl group, an alkenyl group, an aromatic group, a heterocyclic group, an alkoxy group, an alkylthio group, an acyl group, a silyl group, or a halogen atom.

Any of $R^{41}$, $R^{43}$ and $R^{45}$ is preferably a group having a ring structure, and the number of ring structures is preferably 1 to 6, more preferably 2 to 6, further preferably 2 to 5, and particularly preferably 3 to 5.

Examples of such a ring are preferably an aliphatic hydrocarbon ring and an aromatic hydrocarbon ring; more preferably a cyclopentane ring, a cyclohexane ring, a benzene ring, and a naphthalene ring; and further preferably a cyclohexane ring and a benzene ring.

When any of $R^{41}$, $R^{43}$ and $R^{45}$ is a cyclic group, a cycloalkyl group or an aryl group is preferred; and when any of $R^{41}$, $R^{43}$ and $R^{45}$ is a group having a ring structure, specific examples of the substituent include: a group having a cycloalkyl moiety or an aryl moiety, among those exemplified as the substituent S; and the group having a cycloalkyl group or an aryl group as a substituent is preferred, and a cycloalkyl-substituted alkyl group or an aralkyl group is particularly preferred, and a benzyl group is most preferred.

As the cyclic group or the group having a ring structure, among above, a cycloalkyl group, an aryl group, or an aralkyl group is preferred.

The molecular weight of the compound of the first aspect is preferably 250 to 1,200, more preferably 300 to 800, and particularly preferably 350 to 600.

The compound represented by formula (A) becomes hard to volatilize from the polarizing plate protective film, by combining the substituents and setting the molecular weight to such a preferred range, to become retaining in the polarizing plate protective film, thereby for giving a film high in transparency.

A preferred second aspect is a compound in combination with the following substituents.

This aspect utilizes a polar effect, and in a manner contrary to the first aspect, diffusibility is also taken into consideration.

$R^{41}$ and $R^{43}$ are each independently a hydrogen atom, an alkyl group, a cycloalkyl group, an alkenyl group, or an aromatic group; and $R^{45}$ is a hydrogen atom or a substituent; and it is: 1) a compound in which any of $R^{41}$, $R^{43}$ and $R^{45}$ is a water-soluble group or a group containing a water-soluble group; 2) a compound the molecular weight of which is 128 or more and less than 250; or/and 3) a compound in which any one or any of two of $R^{41}$, $R^{43}$ and $R^{45}$ is a hydrogen atom.

The molecular weight of the compound of the second aspect is preferably 128 to 1200, and more preferably 150 to 800.

Specific examples of the compound represented by Formula (A) are shown below, but the present invention is not limited to these.

Moreover, the compounds described in JP-A-2011-118135, particularly in paragraphs 0030 to 0033, the compounds described in JP-A-2011-126968, particularly in paragraphs 0017 to 0025, the compounds described in WO 2014/034709, particularly in paragraphs 0024 to 0050, and the compounds described in JP-A-2014-194529, particularly in paragraphs 0014 to 0037 are preferably used, in combination with the polymer of the present invention.

As shown below, Ph represents a phenyl group, cHex represents a cyclohexyl group, $cC_5H_{11}$ represents a cyclopentyl group. $C_6H_4$ represents a phenylene group, a group within a parenthesis ( ), such as $C_6H_4$(p-$CH_3$), represents a substituent attached to the phenyl group, and "p-" represents a p-position.

Moreover, an asterisk (*) represents a bonding hand.

| Compound No. | $R^{41}$ | $R^{43}$ | $R^{45}$ |
|---|---|---|---|
| A-1 | Ph | $CH_2Ph$ | Ph |
| A-2 | Ph | Ph | $CH_2Ph$ |
| A-3 | Ph | $CH_2Ph$ | $CH_2Ph$ |
| A-4 | $CH_2Ph$ | $CH_2Ph$ | Ph |
| A-5 | $CH_2Ph$ | $CH_2Ph$ | $CH_2Ph$ |
| A-6 | Ph | $CH_2CH_2Ph$ | Ph |
| A-7 | Ph | $CH_2CH_2Ph$ | $CH_2Ph$ |
| A-8 | $C_6H_4$(m-$CH_3$) | $C_6H_4$(m-$CH_3$) | $CH_2Ph$ |
| A-9 | Ph | $CH_2Ph$ | $CH_2C_6H_4$(p-$OCH_3$) |
| A-10 | Ph | $CH_2C_6H_4$(p-$CH_3$) | Ph |
| A-11 | Ph | $CH_2C_6H_4$(p-t-Bu) | Ph |
| A-12 | Ph | $CH_2C_6H_4$(p-$CF_3$) | $CH_2C_6H_4$(p-$CH_3$) |
| A-13 | Ph | cHex | Ph |
| A-14 | Ph | cHex | $CH_2Ph$ |
| A-15 | $CH_2Ph$ | cHex | Ph |
| A-16 | $CH_2CH_2Ph$ | cHex | $CH_2Ph$ |
| A-17 | $CH_2Ph$ | cHex | $CH_2C_6H_4$(p-$CH_3$) |
| A-18 | cHex | cHex | Ph |
| A-19 | cHex | cHex | $CH_2Ph$ |
| A-20 | $CH_2Ph$ | Ph | cHex |
| A-21 | H | $CHPh_2$ | $CH_2Ph$ |
| A-22 | H | $CHPh_2$ | $CH_2C_6H_4$(p-$OCH_3$) |
| A-23 | H | $CH_2Ph$ | $CHPh_2$ |
| A-24 | H | Ph | 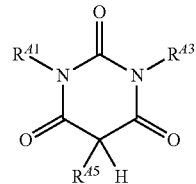 |
| A-25 | H | cHex | $CHPh_2$ |

-continued

| Compound No. | $R^{A1}$ | $R^{A3}$ | $R^{A5}$ |
|---|---|---|---|
| A-26 | H | cHex | (1-oxo-3-(p-tolyl)propyl group, chiral) |
| A-27 | H | $CHPh_2$ | $CHPh_2$ |
| A-28 | Ph | Ph | $CHPh_2$ |
| A-29 | Ph | Ph | (1-oxo-3-phenylpropyl group, chiral) |
| A-30 | $CH_2Ph$ | $CH_2Ph$ | cHex |

| 化合物番号 | $R^{A1}$ | $R^{A3}$ | $R^{A5}$ |
|---|---|---|---|
| A-31 | cHex | cHex | cHex |
| A-32 | $CH_2C_6H_4(p\text{-}CH_3)$ | $CH_2C_6H_4(p\text{-}CH_3)$ | $CH_2C_6H_4(p\text{-}CH_3)$ |
| A-33 | $C_6H_4(p\text{-}CH_3)$ | $CH_2C_6H_4(p\text{-}CH_3)$ | $CH_2C_6H_4(p\text{-}CH_3)$ |
| A-34 | $C_6H_4(p\text{-}CH_3)$ | $CH_2C_6H_4(p\text{-}CH_3)$ | $CH_2Ph$ |
| A-35 | $C_6H_4(p\text{-}Cl)$ | $CH_2Ph$ | $CH_2Ph$ |
| A-36 | $C_6H_4(p\text{-}SCH_3)$ | $CH_2Ph$ | $CH_2Ph$ |
| A-37 | $C_6H_4(p\text{-}SO_2CH_3)$ | $CH_2Ph$ | $CH_2Ph$ |
| A-38 | $C_6H_4(p\text{-}C_6H_5)$ | $CH_2Ph$ | $CH_2Ph$ |
| A-39 | $cC_5H_{11}$ | $CH_2Ph$ | $CH_2Ph$ |
| A-40 | $cC_5H_{11}$ | $cC_5H_{11}$ | $CH_2Ph$ |
| A-41 | Ph | 4-pyridyl | $CH_2Ph$ |
| A-42 | 2-pyridyl | $CH_2Ph$ | $CH_2Ph$ |
| A-43 | Ph | $CH_2Ph$ | 2-pyridyl |
| A-44 | $CH_2Ph$ | $CH_2Ph$ | 4-pyridyl |
| A-45 | Ph | $CH_2PH$ | $CH_2$-(3-indolenyl) |
| A-46 | Ph | $CH_2PH$ | $CH_2$-(2-naphthyl) |
| A-47 | Ph | $CH_2CH_2Ph$ | $CH_2$-(2-naphthyl) |
| A-48 | $CH_2Ph$ | $CH_2Ph$ | $CH_2$-(2-naphthyl) |
| A-49 | $CH_2Ph$ | H | $CH_2C_6H_4(p\text{-}Cl)$ |
| A-50 | Ph | H | $CH_2Ph$ |
| A-51 | $CH_2Ph$ | H | Ph |
| A-52 | $C_6H_4(p\text{-}CH_3)$ | H | $CH_2Ph$ |

-continued

| 化合物番号 | $R^{A1}$ | $R^{A3}$ | $R^{A5}$ |
|---|---|---|---|
| A-53 | Ph | H | Ph |
| A-54 | $CH_2Ph$ | H | $CH_2C_6H_4(p\text{-}CH_3)$ |
| A-55 | Ph | $CH_2Ph$ | $n\text{-}C_4H_9$ |
| A-56 | $n\text{-}C_4H_9$ | H | $CH_2Ph$ |
| A-57 | H | H | $CH_2Ph$ |
| A-58 | $CH_3$ | H | $CH_2Ph$ |
| A-59 | $CH_3$ | $CH_3$ | $CH_2Ph$ |
| A-60 | H | H | Ph |
| A-61 | $CH_3$ | H | Ph |
| A-62 | $CH_3$ | $CH_3$ | Ph |
| A-63 | H | H | $CH_3$ |
| A-64 | H | H | $n\text{-}C_4H_9$ |
| A-65 | Ph | $CH_2Ph$ | Cl |
| A-66 | Ph | Ph | OH |
| A-67 | H | H | $CH_2C_6H_4(p\text{-}OH)$ |
| A-68 | $CH_3$ | $CH_3$ | $CH_2C_6H_4(p\text{-}OH)$ |
| A-69 | H | H | $CH_2C_6H_3(3,4\text{-}OH)$ |
| A-70 | H | H | $CH_2C_6H_4(p\text{-}SO_3Na)$ |

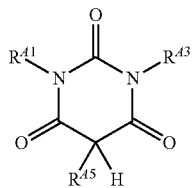

| Compound No. | $R^{A1}$ | $R^{A3}$ | $R^{A5}$ |
|---|---|---|---|
| A-71 | H | H | $CH_2C_6H_3(2,4\text{-}SO_3Na)$ |
| A-72 | H | H | $CH_2C_6H_4(p\text{-}COOH)$ |
| A-73 | H | H | $CH_2C_6H_4(p\text{-}COONa)$ |
| A-74 | H | H | $CH_2C_6H_4(p\text{-}SO_2NH_2)$ |
| A-75 | H | H | 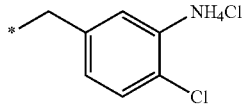 |
| A-76 | H | H | 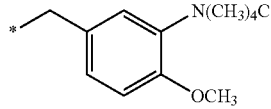 |
| A-77 | H | H | 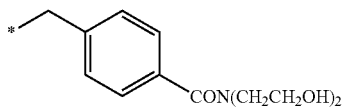 |
| A-78 | H | H | 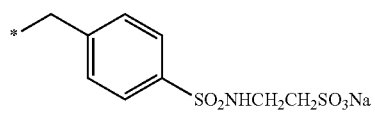 |
| A-79 | H | H | 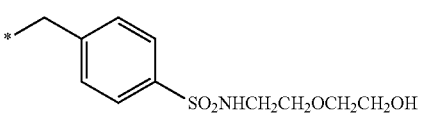 |
| A-80 | H | H | 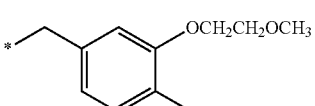 |
| A-81 | H | $C_6H_4(m\text{-}SO_2NH_2)$ | $CH_2C_6H_4(p\text{-}SO_2NH_2)$ |
| A-82 | $CH_2CH_2OCH_2CH_2OCH_3$ | $CH_2CH_2OCH_2CH_2OCH_3$ | $CH_2Ph$ |
| A-83 | H | $CH_2SO_3Na$ | $CH_2Ph$ |
| A-84 | H | H | $CH_2C_6H_3(3,4\text{-}F)$ |
| A-85 | H | $C_6H_3(3,4\text{-}F)$ | $CH_2C_6H_3(2,4\text{-}SO_3Na)$ |
| A-86 | H | 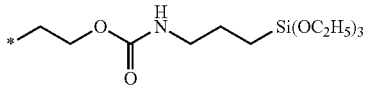 | $CH_2Ph$ |
| A-87 | H | 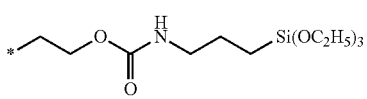 | $CH_2C_6H_3(2,4\text{-}SO_3Na)$ |
| A-88 | H | $CH_2CH_2CH_2SO_3Na$ | $CH_2C_6H_4(p\text{-}CHO)$ |
| A-89 | H | $CH_2CH_2CH_2SO_3Na$ | $CH_2C_6H_4(p\text{-}COCH_3)$ |
| A-90 | H | $CH_2C_6H_4(p\text{-}CHO)$ | $CH_2C_6H_3(2,4\text{-}SO_3Na)$ |
| A-91 | H | $CH_2C_6H_4(p\text{-}B(OH)_2)$ | $CH_2C_6H_3(2,4\text{-}SO_3Na)$ |
| A-92 | H | H | $CH_2C_6H_3(3,4\text{-}F)$ |

-continued

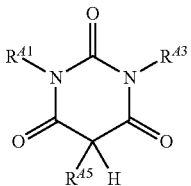

| Compound No. | $R^{A1}$ | $R^{A3}$ | $R^{A5}$ |
|---|---|---|---|
| A-93 | H | CH$_2$Ph | ![structure with p-OC(O)NH(CH$_2$)$_3$Si(OC$_2$H$_5$)$_3$ benzyl] |
| A-94 | Ph | CH$_2$Ph | CH$_2$C$_6$H$_4$(p-CHO) |
| A-95 | Ph | CH$_2$Ph | CH$_2$C$_6$H$_4$(p-COCH$_3$) |

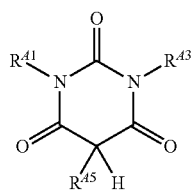

| Compound No. | $R^{A1}$ | $R^{A3}$ | $R^{A5}$ |
|---|---|---|---|
| A-96 | Ph | CH$_2$Ph | CH$_2$C$_6$H$_4$(p-CH(OCH$_3$)$_2$) |
| A-97 | Ph | CH$_2$Ph | CH$_2$C$_6$H$_4$(p-B(OH)$_2$) |
| A-98 | Ph | CH$_2$Ph | [benzyl-pinacol boronate] |
| A-99 | Ph | CH$_2$Ph | [benzyl-isobenzofuran diethoxy] |
| A-100 | H | CH$_2$C$_6$H$_4$(p-CHO) | CH$_3$ |
| A-101 | H | CH$_2$C$_6$H$_4$(p-B(OH)$_2$) | CH$_3$ |
| A-102 | H | CH$_2$C$_6$H$_3$(3,4-F) | CH$_3$ |
| A-103 | H | H | CHO |
| A-104 | H | CH$_2$C$_6$H$_4$(p-SO$_3$Na) | CHO |
| A-105 | H | CH$_2$C$_6$H$_4$(p-CHO) | CHO |
| A-106 | CH$_3$ | CH$_3$ | n-C$_4$H$_9$ |
| A-107 | CH$_2$CH$_2$SO$_3$Na | CH$_2$CH$_2$SO$_3$Na | n-C$_4$H$_9$ |
| A-108 | H | CH$_2$Ph | CH$_2$Ph |
| A-109 | cHex | cHex | n-C$_4$H$_9$ |
| A-110 | cHex | cHex | cC$_5$H$_{11}$ |
| A-111 | Ph | Ph | i-C$_3$H$_7$ |
| A-112 | Ph | Ph | C$_2$H$_5$ |
| A-113 | Ph | CH$_2$Ph | CH$_3$ |
| A-114 | H | CH$_2$CH$_2$OCONHPh | CH$_2$Ph |
| A-115 | CH$_2$COOCH$_3$ | CH$_2$COOCH$_3$ | CH$_2$Ph |

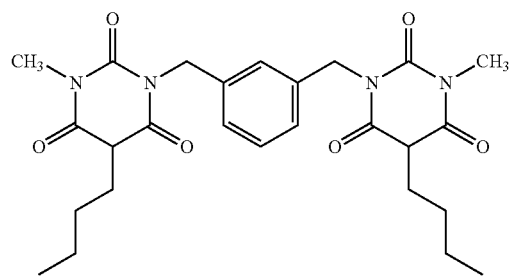
A-201
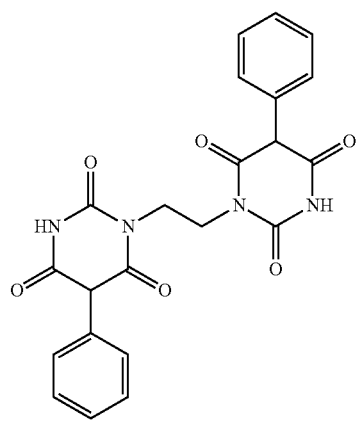
A-202
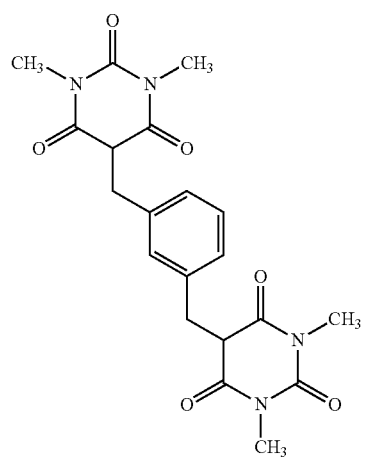
A-203
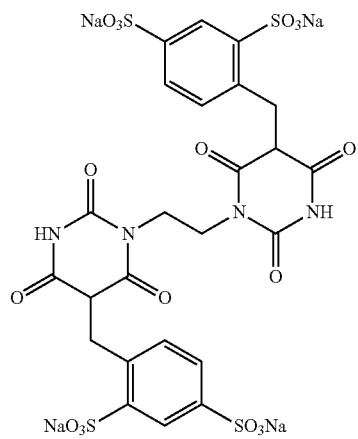
A-204
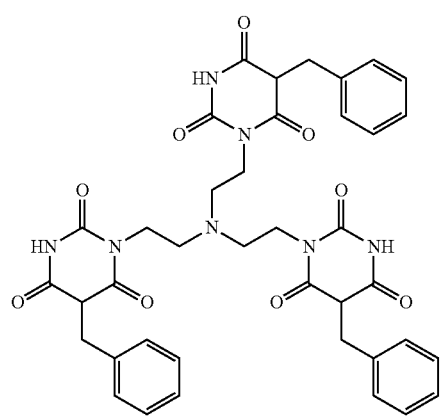
A-205
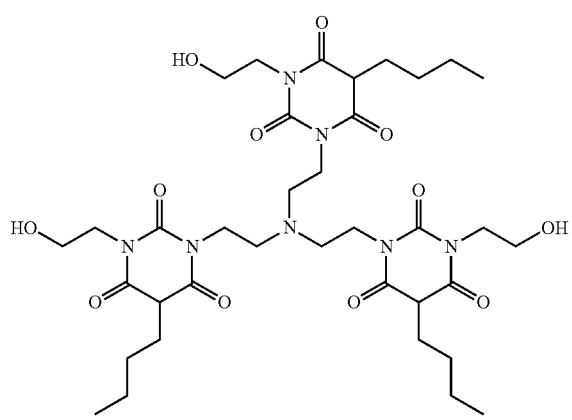
A-206
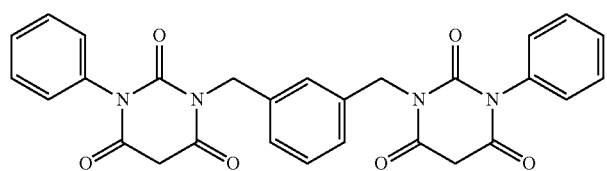
A-207

-continued

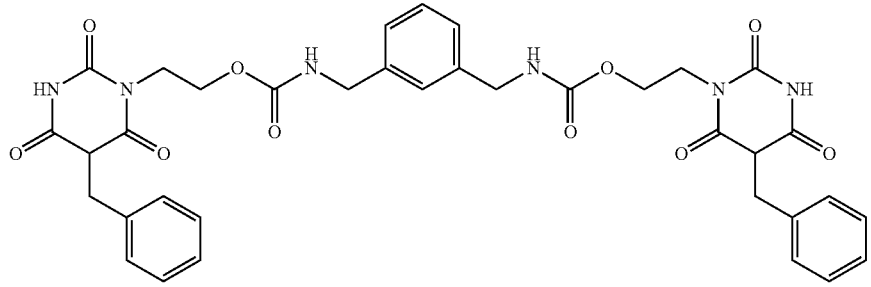
A-208

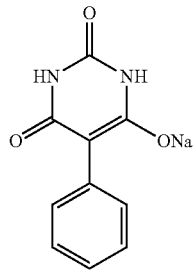
A-209

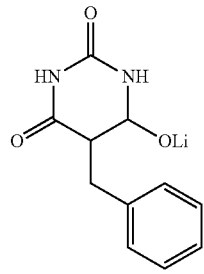
A-210

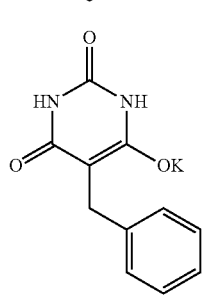
A-211

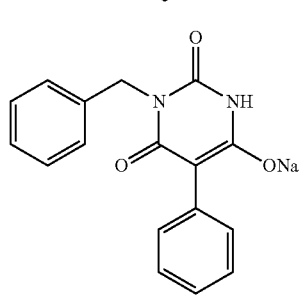
A-212

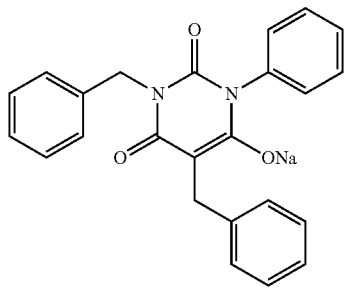
A-213

The compound represented by formula (A) is known to be able to synthesize by a method of synthesizing barbituric acid, based on condensation of a urea derivative with a malonic acid derivative. The barbituric acid having two substituents on the N atom may be obtained, by heating a N,N'-disubstituted urea with malonyl chloride, or by heating with a combination of malonic acid and an activator, such as acetic anhydride. For example, methods described, for example, in: Journal of the American Chemical Society, vol. 61, p. 1015 (1939), Journal of Medicinal Chemistry, vol. 54, p. 2409 (2011), Tetrahedron Letters, vol. 40, p. 8029 (1999), and WO2007/150011, can be preferably used.

In addition, both unsubstituted and substituted malonic acids are acceptable for use in the condensation. By using malonic acid having any of correspondent substituents for $R^{45}$ so as to configure barbituric acid, the compounds represented by formula (A) can be synthesized. Moreover, if unsubstituted malonic acid and a urea derivative are condensed, a barbituric acid in which the 5-position is unsubstituted can be obtained. Thus, by modifying the resultant compound, the compound represented by formula (A) may be synthesized.

As a method of modification on the 5-position, a nucleophilic substitution reaction with alkyl halide or the like, or an addition reaction such as a Michael addition reaction can be applied to. Moreover, a method can also be preferably applied to, in which an alkylidene or arylidene compound is formed by allowing dehydrating condensation with an aldehyde or ketone, and then a double bond is reduced. For example, the method of reduction with zinc is described in "Tetrahedron Letters, vol. 44, p, 2203 (2003)", the reduction method by catalytic reduction is described in "Tetrahedron Letters, vol. 42, p. 4103 (2001)" and "Journal of the American Chemical Society, vol, 119, p. 12849 (1997)," and the method of reduction with $NaBH_4$ is described in "Tetrahedron Letters, vol, 28, p. 4173 (1987)", or the like, respectively. All of these are synthetic methods that can be preferably applied thereto when the compound has the aralkyl group or the cycloalkyl group at the 5-position.

The synthetic method of the compound represented by formula (A) is not limited to the above.

The polarizing plate composition of the present invention contains the polymer of the present invention, and if needed, the compound represented by Formula (A) used in the combination therewith. In the present invention, it is preferable that the composition contain the resin.

The content of the polymer of the present invention is preferably from 0.01 to 40 parts by mass with respect to 100 parts by mass of the resin (in the polarizing plate composition of the present invention, or in the added object to which the polarizing plate composition of the present invention is added).

As the content ratio of the polymer of the present invention and the compound represented by Formula (A), the proportion of the compound represented by Formula (A) is preferably from 1 to 10000 parts by mass with respect to 100 parts by mass of the polymer of the present invention.

Further, the total content of the polymer of the present invention and the compound represented by Formula (A) is preferably from 0.01 to 40 parts by mass with respect to 100 parts by mass of the resin.

It is noted that, even in the case where 2 or more kinds of the polymer of the present invention are used in combination, it is preferred that the total content thereof is in the above range.

Hereinafter, the substituent S is described in detail.

The substituent S includes the following substituents.

[Substituent S]

The substituent S include: alkyl groups (preferably those having from 1 to 20 carbon atoms, for example, methyl, ethyl, isopropyl, tert-butyl, pentyl, heptyl, 1-ethylpentyl, 2-ethylhexyl, benzyl, 2-ethoxyethyl, 1-carboxymethyl); alkenyl groups (preferably those having from 2 to 20 carbon atoms, for example, vinyl, allyl, oleyl); alkynyl groups (preferably those having from 2 to 20 carbon atoms, for example, ethynyl, 2-propynyl, 2-butynyl, phenylethynyl); cycloalkyl groups (preferably those having from 3 to 20 carbon atoms, for example, cyclopropyl, cyclopentyl, cyclohexyl, 4-methylcyclohexyl); aryl groups (preferably those having from 6 to 20 carbon atoms, for example, phenyl, 1-naphtyl, 4-methoxyphenyl, 2-chlorophenyl, 3-methylphenyl); heterocyclic groups (those preferably having from 0 to 20 carbon atoms and preferably having a ring-constituting heteroatom selected from an oxygen atom, a nitrogen atom or a sulfur atom, and those preferably having a 5- or 6-membered ring which may be condensed with a benzene ring or a hetero ring, and the ring may be a saturated ring, an unsaturated ring or an aromatic ring, for example, 2-pyridyl, 4-pyridyl, 2-imidazolyl, 2-benzoimidazolyl, 2-thiazolyl, 2-oxazolyl); alkoxy groups (preferably those having from 1 to 20 carbon atoms, for example, methoxy, ethoxy, isopropyloxy, benzyloxy); aryloxy groups (preferably those having from 6 to 20 carbon atoms, for example, phenoxy, 1-naphthyloxy, 3-methylphenoxy, 4-methoxyphenoxy);

alkylthio groups preferably those having from 1 to 20 carbon atoms, for example, methylthio, ethylthio, isopropylthio, benzylthio); arylthio groups (preferably those having from 6 to 20 carbon atoms, for example, phenylthio, 1-naphthylthio, 3-methylphenylthio, 4-methoxyphenylthio); formyl group, acyl groups (those including an alkylcarbonyl group, an alkenylcarbonyl group, an arylcarbonyl group and a heterocyclic carbonyl group, and preferably having 20 or less carbon atoms, for example, acetyl, pivaloyl, acryloyl, methacryloyl, benzoyl, nicotinoyl); alkoxycarbonyl groups (preferably those having from 2 to 20 carbon atoms, for example, ethoxycarbonyl, 2-ethylhexyloxycarbonyl); aryloxycarbonyl groups (preferably those having from 7 to 20 carbon atoms, for example, phenyloxycarbonyl, naphthyloxycarbonyl); amino groups (those including an amino group, an alkylamino group, an arylamino group and a heterocyclic amino group, and preferably having from 0 to 20 carbon atoms, for example, amino, N,N-dimethylamino, N,N-diethylamino, N-ethylamino, anilino, 1-pyrrolidinyl, piperidino, morpholinyl); alkyl- or aryl-sulfonamido groups (preferably those having from 0 to 20 carbon atoms, for example, N,N-dimethylsulfonamido, N-phenylsulfonamido); sulfamoyl groups (preferably those having from 0 to 20 carbon atoms, and preferably an —$SO_2NH_2$ or alkyl- or aryl-sulfamoyl group, for example, N,N-dimethylsulfamoyl, N-phenylsulfamoyl); acyloxy groups (preferably those having from 1 to 20 carbon atoms, for example, acetyloxy, benzoyloxy); carbamoyl groups [preferably those having from 1 to 20 carbon atoms, and preferably a —$C(=O)NH_2$ or alkyl- or aryl-carbamoyl group, for example, N,N-dimethylcarbamoyl, N-phenylcarbamoyl];

acylamino groups (preferably those having from 1 to 20 carbon atoms, for example, acetylamino, acryloylamino, benzoylamino, nicotine amido); thioacyl groups, alkoxythiocarbonyl groups, aryloxythiocarbonyl groups, and thiocarbamoyl groups; (those preferred range and specific examples including ones different in only the case where $C(=O)$ moieties in acyl groups, alkoxycarbonyl groups, aryloxycarbonyl groups, and carbamoyl groups corresponding thereto are substituted with ($C=S$)); silyl groups (preferably those having from 3 to 20 carbon atoms, more preferably a silyl group substituted with an alkyl, an aryl an alkoxy or aryloxy, further preferably a trialkylsilyl group or a trialkoxysilyl group, for example, trimethylsilyl dimethylphenylsilyl, trimethoxysilyl, triethoxysilyl); halogen atoms (for example, fluorine atom, chlorine a bromine atom, iodine atom); acylsulfamoyl groups (those including an alkylcarbonylsulfamoyl group, an alkenylcarbonylsulfamoyl group, an arylcarbonylsulfamoyl group, and a heterocyclic carbonylsulfamoyl group, and preferably having 20 or less carbon atoms, for example, acetylsulfamoyl, pivaloylsulfamoyl, acryloylsulfamoyl, methacryloylsulfamoyl, benzoylsulfamoyl, nicotinoylsulfamoyl); alkyl- or aryl-sulfonylsulfamoyl groups (preferably those having from 1 to 20 carbon atoms, for example, methylsulfonylsulfamoyl, ethylsulfonylsulfamoyl, phenylsulfonylsulfamoyl, tolylsulfonylsulfamoyl cyano group; nitro group; hydroxy group or anions thereof; mercapto group or anions thereof; sulfo group or salts thereof; carboxy group or salts thereof; phosphate group or salts thereof; boronic acid groups or salts thereof; boronic ester groups; and onto groups (for example, sulfonio groups of sulfonium salts, ammonio groups of ammonium salts, iodonio groups of iodonium salts, phosphonio groups of phosphonium salts).

Any of these substituents may be further substituted with a substituent. Examples of such a substituent include those exemplified as the substituent S.

Specific examples include: an aralkyl group in which an alkyl group is substituted with an aryl group (for example, benzyl, phenethyl, and diphenylmethyl); a group in which an alkyl group is substituted with an alkoxycarbonyl group or a cyano group (for example, benzoylmethyl); a perfluoroalkyl group in which an alkyl group is substituted with a fluorine atom, such as trifluoromethyl; and a substituted aryl group in which an aryl group is substituted with the substituent S. Moreover, specific preferable examples also include: a group having an active methine or active methylene structure (an alkyl group substituted with an electron-withdrawing group, a group having a moiety in which methine or methylene is bonded with an electron-withdrawing group, or a group having a methine or methylene moiety sandwiched by electron-withdrawing groups).

<Resin>

The polarizing plate composition of the present invention is preferably used in a polarizing plate protective film, a polarizer, and an adhesive layer.

The polarizing plate protective film, the polarizer, and the adhesive layer are formed by a resin component, and therefore the polarizing plate composition of the present invention preferably contains the resin component.

The resin component varies depending on a purpose or an intended use for using the polarizing plate composition of the present invention.

For example, a hydrophobic resin in a polarizing plate protective film, a water-soluble additive containing a resin component in the adhesive layer and a polyvinyl alcohol-based resin (polyvinyl alcohol, acylated or ketalized polyvinyl alcohol, and the like, these are also referred to as a PVA) in the polarizer are used respectively.

As the resin component contained in the polarizing plate composition of the present invention, a cellulose acylate resin, a polycarbonate resin, a polyester carbonate resin, a polyester resin, an acrylate resin such as a polyacrylate resin and a polymethacrylate resin, a cycloolefin resin such as a norbornene resin, and a polyvinyl alcohol-based resin including polyvinyl alcohol, or acylated or ketalized polyvinyl alcohol are preferred, and a cellulose acylate resin and a polyvinyl alcohol-based resin are more preferred.

Hereinafter, the polarizing plate protective film, the polarizer, and the adhesive layer, in each of which the polarizing plate composition of the present invention is preferably used, are described separately. It is noted that the polarizing, plate protective film, the polarizer, and the adhesive layer are formed or produced by the polarizing plate composition of the present invention, or are composed of the polarizing plate composition of the present invention. Therefore, the polarizing plate protective film, the polarizer, and the adhesive layer described below may be replaced with the polarizing plate composition of the present invention (each composition for the polarizing plate protective film, the polarizer, and the adhesive layer).

[[Polarizing Plate Protective Film]]

The polarizing plate protective film may be either a single layer configuration, or a laminate configuration composed of multi-layers.

In the case where the protective film for a polarizing plate is the laminate having at least two layers, a double-layered or three-layered structure is preferable, and a three-layered structure is more preferable, in the case of the three-layered structure, it is preferable to have one layer of a core layer (that is, it is the thickest layer, and it is also referred to as the base layer hereinafter) and a skin layer A and a skin layer B, which sandwich the core layer. Among these, in the present invention, the three-layered structure formed of: (skin layer B)/(core layer)/(skin layer A) is preferred. The skin layer A is a layer brought into contact with a metal support, and the skin layer B is a layer at the interface with the air on the side opposite to the metal support, when the protective film for a polarizing plate is produced by the solvent casting method. It is noted that, generally, both the skin layer A and the skin layer B are also referred to as a skin layer (or surface layer).

In the present invention, the polarizing plate protective film formed of the polarizing plate composition of the present invention, in the case of a laminate body composed of 2 or more layers, allows a development of polarizer durability under hygrothermal condition and also a development of optical polarizer durability, with effect in a small amount of the polymer.

From the configuration that a polarizing plate protective film is stuck to a polarizer, in the case of the polarizing plate protective film having a laminate structure, the polymer of the present invention can be localized by forming only a layer close to the polarizer (in the case of 2 layers, either one of the layers) from the polarizing plate composition of the present invention.

In the present invention, in order to develop the effect in a small amount, a laminate structure of 3 or more layers is preferred. It is preferred to form only the most surface layer of the polarizing plate protective film, particularly only a layer close to the polarize (the above-described skin A), from the polarizing plate composition of the present invention. This enables the polymer of the present invention to incorporate into the outermost surface layer In particular, in the case where the polarizing plate protective film is a cellulose acylate film, polarizer durability under hygrothermal condition and also optical polarizer durability can be effectively improved.

Examples of the resin of the polarizing plate protective film includes: a cellulose ester resin; a polycarbonate resin; a polyester carbonate resin; a polyester resin; art acrylic resin such as a polyacrylate resin and a polymethacrylate resin; a cycloolefin resin such as a norbornene resin; a polysulfone resin; a polyether sulfone resin; a polystyrene resin; and an imide resin such as an olefin-maleimide resin and glutarimide resin. These resins may be used alone or in a mixture thereof. Among these resin, a cellulose ester resin, a polyester resin, an acrylic resin, a cycloolefin resin, a polystyrene resin, and an imide resin, each of which has relatively small birefringence based on a molecular orientation and photoelastic coefficient, are preferred. A cellulose ester resin, a polyester resin, an acrylic resin, and a cycloolefin resin are more preferred. A cellulose ester resin, an acrylic resin, and a cycloolefin resin are still more preferred. A cellulose ester resin is particularly preferred.

The content of the polymer of the present invention in the polarizing plate protective film or the addition amount thereof in the composition is not particularly limited, but preferably from 0.01 to 40 parts by mass, more preferably from 0.01 to 30 parts by mass, and particularly preferably from 0.1 to 30 parts by mass, with respect to 100 parts by mass of the resin which constitutes the polarizing plate protective film, or, in the case of the laminate structure, of the resin which constitutes a layer to be applied. By controlling the content to the above range, polarizer durability under hygrothermal condition, which is an effect of the present invention, is enhanced. Further, suppression of film coloration can be sufficiently developed and also film transparency is maintained.

Further, even in the case where 2 or more kinds of the polymers of the present invention are contained in combination, or the polymer of the present invention is used in combination with the compound represented by Formula (A), it is preferred that the total content thereof is in the above range.

Hereinafter, a polyacrylate resin, cycloolefin resin, polyester resin such as polyethylene terephthalate and a cellulose acylate resin (also referred to simply as cellulose acylate) of the cellulose ester resin are described.

[Acrylic Resin]

In the present specification, the term "acrylic resin" includes not only an acrylic resin, but also a methacrylic resin. Therefore, hereinafter, the term "acrylic resin" is also described as "(meth) acrylic resin".

In the polarizing plate protective film of the present invention, incorporation of the (meth) acrylic resin as a primary component is one of preferable embodiments.

Here, the primary component indicates a component which has the largest content ratio by mass, of the components which are contained in the polarizing plate protective film. The content of the (meth) acrylic resin is preferably from 10 to 99.99% by mass, more preferably from 20 to 99.99% by mass, and still more preferably from 30 to 99.99% by mass.

The (meth) acrylic resin is obtained by polymerizing a (meth) acrylic monomer, and may contain a structural unit obtained from monomers other than the (meth) acrylic monomer. The (meth) acrylic resin is preferably those obtained by polymerizing a monomer composition containing an ultraviolet-absorbing monomer and the (meth) acrylic monomer in particular.

As the ultraviolet-absorbing monomer, a benzophenone ultraviolet-absorbing monomer and a benzotriazole ultraviolet-absorbing monomer are preferred, and a benzotriazole ultraviolet-absorbing monomer is more preferred.

As the ultraviolet-absorbing monomer, only one kind thereof may be used or at least 2 kinds thereof may be used in combination.

As the above-described (meth) acrylic monomer, any suitable (meth) acrylic monomers may be adopted within a scope which docs not undermine the effectiveness of the present invention. Examples of the (meth) acrylic monomer include a (meth) acrylic acid and a (meth) acrylate ester. An alkyl ester of (meth) acrylic acid whose alkyl moiety has 1 to 6 carbon atoms is preferred, and methyl methacrylate is more preferred.

As the (meth) acrylic monomer, only one kind thereof may be used or at least 2 kinds thereof may be used in combination.

As the (meth) acrylic resin, from the viewpoint of having high resistance to heat, high transparency and high mechanical strength, a (meth) acrylic resin having a lactone ring structure is preferred.

The above-described (meth) acrylic resin having a lactone ring structure is preferably a (meth) acrylic resin produced from a monomer composition in which the above-described ultraviolet-absorbing monomer is also contained in the monomer composition used at the time of producing the (meth) acrylic resin having a lactone ring structure, described in JP-A-2000-230016, JP-A-2001-151814, JP-A-2002-120326, JP-A-2002-254544, JP-A-2005-146084, JP-A-2006-171464 and the like.

The mass-average molecular weight (Mw) of the polymer of the (meth) acrylic resin is preferably 1,000 or more and 2,000,000 or less, more preferably 5,000 or more and 1,000,000 or less, still more preferably from 10,000 or more and 1,000,000 or less.

[Cycloolefin Resin]

In the polarizing plate protective film of the present invention, incorporation of the cycloolefin resin as a primary component is one of preferable embodiments. The content of the cycloolefin resin in the polarizing plate protective film is preferably from 10 to 99.99% by mass, more preferably from 20 to 99.99% by mass, and still more preferably from 30 to 99.99% by mass.

As the cycloolefin resin, a cycloolefin resin having at least one polar group is preferred, and it is preferred that the polarizing plate protective film formed of the cycloolefin resin has a certain amount of moisture permeability.

By the at least one polar group which the cycloolefin resin has, solubility in an organic solvent such as dichloromethane is improved, so that a solution cast method can be carried out. In the solution cast method, film formation can be performed at a lower temperature than the melt cast method and therefore the solution cast method less causes decomposition and sublimation of the additives and is preferred.

Examples of the polar group include a hydroxyl group, an alkoxy group having 1 to 10 carbon atoms, an acyloxy group having 1 to 10 carbon atoms, an alkoxycarbonyl group having 2 to 10 carbon atoms, an aryloxycarbonyl group, a cyano group, an amide group, an imide ring-containing group, a triorganosiloxy group, a triorganosilyl group, an amino group, an acyl group, an alkoxysilyl group having 1 to 10 carbon atoms, a sulfonyl-containing group, a carboxyl group and the like. As these polar groups, specifically, examples of the alkoxy group include methoxy, ethoxy, and the like. Examples of the acyloxy group include an alkylcarbonyloxy group such as acetoxy and propionyloxy, and an arylcarbonyloxy group such as benzoyloxy. Examples of the alkoxycarbonyl group include methoxycarbonyl, ethoxycarbonyl, and the like. Examples of the aryloxycarbonyl group include phenoxycarbonyl, naphthyloxycarbonyl, fluorenyloxycarbonyl, biphenyloxycarbonyl, and the like. Examples of the triorganosiloxy group include trimethylsiloxy, triethylsiloxy, and the like. Examples of the triorganosilyl group include trimethylsilyl, triethylsilyl, and the like. Examples of the amino group include a primary amino group. Examples of the alkoxysilyl group include trimethoxysilyl, triethoxysilyl, and the like.

Among these, an alkoxycarbonyl group is preferred, and a methoxycarbonyl group is more preferred.

The cycloolefin resin is preferably a resin represented by the following formula (RC).

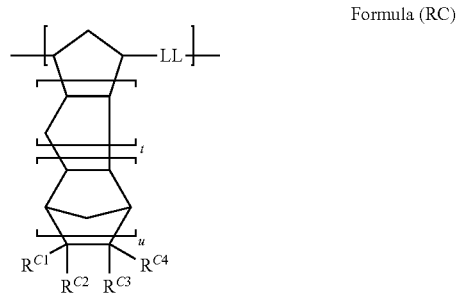

Formula (RC)

In Formula (RC), t is 0 or 1; and u is 0 or an integer of not less than 1. LL represents a vinylene group or an ethylene group; and $R^{C1}$ to $R^{C4}$ are each independently a hydrogen atom, a halogen atom, a substituted or unsubstituted hydrocarbon group having 1 to 30 carbon atoms, or a polar group; in the hydrocarbon group, carbon atoms may bind to one another through a linking group having an oxygen atom, a nitrogen atom, a sulfur at or a silicon atom. Here, a pair of $R^{C1}$ and $R^{C2}$ or a pair of $R^{C3}$ and $R^{C4}$ may bind to one another to form a divalent hydrocarbon group, or alternatively to form a carbon ring or a hetero ring. Each of multiple LL, multiple $R^{C1}$, multiple $R^{C2}$, multiple $R^{C3}$ and multiple $R^{C4}$ may be the same or different from one another. From the viewpoint of improvement in the solution cast suitability, it is preferable that at least one of $R^{C1}$ to $R^{C4}$ is the polar group.

u is preferably the integral numbers of 0 to 2, more preferably o or 1.

Examples of the halogen atoms of $R^{C1}$ to $R^{C4}$ include a fluorine atom, a chlorine atom, and a bromine atom.

Examples of the hydrocarbon group having 1 to 30 carbon atoms of $R^{C1}$ to $R^{C4}$ include: an alkyl group such as methyl, ethyl, or propyl; a cycloalkyl group such as cyclopentyl, or cyclohexyl; an alkenyl group such as vinyl, allyl, or propenyl; an aryl group such as phenyl, biphenyl, naphthyl, or anthracenyl. These hydrocarbon groups may be substituted. Examples of the substituent include a halogen atom such as a fluorine atom, a chlorine atom, bromine, or the like, a phenysulfonyl group, and the like.

Further, the above-described hydrocarbon group may bind to a ring structure directly or through a linking group (linkage). Examples of the linking group include: a divalent hydrocarbon group having 1 to 10 carbon atoms such as an alkylene group represented by —$(CH_2)_{mm}$— (mm represents an integer 1 to 10); and a linking group containing an oxygen atom, a nitrogen atom, a sulfur atom, or a silicon atom. Specific examples of the linking group containing an oxygen atom, a nitrogen atom, a sulfur atom, or a silicon atom include a carbonyl group [—C(=O)—], a carbonyloxy group [—C(=O)O—], an) oxycarbonyl group [—OC(O)—], a sulfonyl group [—$SO_2$—], an ether linkage [—O—], a thioether linkage [—S—], an imino group [—NH—], an amide linkage [—NH—C(=O)—, —C(=O)NH—], a siloxane linkage [—$OSi(R^{CA})_2$—(in formula, $R^{CA}$ represents an alkyl group such as methyl or ethyl)], and a group in which at least 2 kinds of these groups are linked.

A pair of $R^{C1}$ and $R^{C2}$ or a pair of $R^{C3}$ and $R^{C4}$ may bind to one another to form a divalent hydrocarbon group, or alternatively to form a carbon ring or a hetero ring. However, it is preferred not to form the divalent hydrocarbon group, the carbon ring or the hetero ring. It is noted that the carbon ring or hetero ring to be formed may be either a single-ring structure, or a multi-ring structure, and the carbon ring or hetero ring may be either an aromatic ring, or a non-aromatic ring, but the non-aromatic ring is more preferred than the aromatic ring.

Synthesis methods of these cycloolefin resins can be performed referring to paragraphs [0039] to [0068] of JP-A-2001-114836.

It is preferable that the glass transition temperature (Tg) of these cycloolefin resins measured by a differential scanning calorimeter (DSC) is not lower than 70° C., more preferably 90° C. to 185° C., further preferably 100° C. to 165° C., and particularly preferably 120° C. to 160° C.

The mass-average molecular weight (Mw) of the polymer of the cycloolefin resin is preferably 5,000 or more and 1,000,000 or less, more preferably 8,000 or more and 200,000 or less.

The saturated water absorption of the cycloolefin resin is preferably 1% by mass or less, and more preferably 0.8% by mass or less.

The intrinsic viscosity (ηinh) of the cycloolefin resins measured in chloroform at 30° C. is preferably 0.1 to 1.5 dl/g, and further preferably 0.4 to 0.2 dl/g. Besides, the limiting viscosity [η] of the cycloolefin resins measured in decalin at 135° C. is preferably 0.01 to 20 dl/g, more preferably 0.03 to 10 dl/g, and further preferably 0.05 to 5 dl/g. The melt flow rate (MFR) thereof measured with a load of 2.16 kg at 260° C. following ASTM D1238 is preferably 0.1 to 200 g/10 m more preferably 1 to 100 g/10 min, and further preferably 5 to 50 g/10 min.

Furthermore, the softening point of the cycloolefin resins is preferably not lower than 30° C., more preferably not lower than 70° C., and more preferably 80 to 260° C. as a softening point measured by thermal mechanical analyzer (TMA).

Further, as the cycloolefin resin, hydrogenation rate of the hydrogenated polymer is preferably 50% or more, more preferably 90% or more, and still more preferably 98% or more, in terms of the value measured at $^1$H-NMR (60 MHz). As the hydrogenation rate becomes higher, the cycloolefin resin film to be obtained becomes better in terms of stability to heat and light. Further, the content of gel contained in the hydrogenated polymer is preferably 5% by mass or less, and more preferably 1% by mass or less.

The cycloolefin resin is preferably non-crystalline or preferably has low crystallinity, and the crystallinity measured by X-ray diffraction method is preferably 20% or less, more preferably 10% or less, and still more preferably 2% or less.

[Polyester Resin]

As the polyester resin, polyethyleneterephthalate, polyethyleneisophthalate, polybuthyleneterephthalate, poly (1,4-cyclohexylene dimethyleneterephthalate), polyethylene-2,6-naphthalate, and the like can be used, and the polyester resin may contain other copolymerizable components.

In the polarizing plate protective film of the present invention, incorporation of the polyester resin as a primary component is one of preferable embodiments. The content of the polyester resin in the polarizing plate protective film is preferably from 10 to 99.99% by mass, more preferably from 30 to 99.99% by mass, and still more preferably from 70 to 99.99% by mass.

The polyester resin has a high transparency and excellent thermal and mechanical properties, and control of retardation by a stretch process can be achieved.

In particular, the polyethyleneterephthalate is preferred from the points that it has a broad utility and is easily obtainable and has a large intrinsic birefringence, thereby obtaining a large retardation with relative ease even in the case of a thin film thickness thereof.

The polyester resin can be synthesized by an ester exchange reaction or a polycondensation reaction of a dicarboxylic acid and a diol in accordance with a conventional method.

The polyester film can be produced in accordance with a general production method of the polyester film. For example, the general production method includes a method of inciting a polyester resin, and stretching a sheet-like extrusion-molded non-orientation polyester in a longitudinal direction at the temperature of its glass transition temperature or higher by using a velocity difference between rolls, and stretching the stretched sheet in a transverse direction by means of a tenter, and then subjecting the stretched sheet to a thermal treatment.

The polyester film may be either a uniaxially stretched film or a biaxially stretched film.

In the film formation of the polyester film, the longitudinal stretching temperature and the transverse stretching temperature are each preferably 80 to 130° C., and particularly preferably 90 to 120° C. The longitudinal stretch ratio is preferably 1M to 3.5 times, and particularly preferably 1.0 to 3.0 times. The transverse stretch ratio is preferably 2.5 to 6.0 times, and particularly preferably 3.0 to 5.5 times. In order to control the retardation to the above-described range, the control of a ratio of the longitudinal stretch ratio to the transverse stretch ratio is preferred. If a difference between the longitudinal stretch ratio and the transverse stretch ratio is too small, an improvement of retardation becomes difficult. This situation is not preferred. Further, to set a low stretching temperature is also a favorable handling in order to improve retardation. In the subsequent thermal treatment, the treatment temperature is preferably 100 to 250° C., and particular preferably 180 to 245° C.

The number-average molecular weight of the polyester resin is preferably 5,000 or more, more preferably 6,000 or more, and still more preferably 10,000 or more. Further, the glass transition temperature thereof is not particularly limited, hut preferably from 20 to 90° C., and more preferably from 30 to 80° C. It is noted that the intrinsic viscosity of polyethylene terephthalate is 0.62 dl/g.

[Cellulose Acylate]

In the present invention, cellulose acylate is used as a main component of the cellulose acylate film. One kind of cellulose acylate may be used, or alternatively two or more kinds thereof may be used. For example, the cellulose acylate may be a cellulose acylate having only an acetyl group as the acyl substituent thereof; a cellulose acylate having a plurality of different acyl substituents as the acyl substituent thereof may be used, or alternatively, the cellulose acylate may be a mixture of cellulose acylates that are different from one another.

The cellulose material for cellulose acylate which is used in this invention includes cotton liter and wood pulp (hardwood pulp, softwood pulp), and cellulose acylate obtained from any such cellulose material are usable herein. Those cellulose material may be mixed for use herein. The cellulose materials are described in detail, for example, by Marusawa & Uda's in "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein.

In the present invention, the acyl group of the cellulose acylate in one molecule may be substituted with one kind, or two or more kinds of acyl groups. It is preferable that the cellulose acylate used in the present invention has an acyl group having 2 or greater carbon atoms as a substituent. The acyl group having 2 or greater carbon atoms is not particularly limited such that it may be an aliphatic acyl group or an aromatic acyl group. Examples thereof include cellulosic alkylcarbonyl groups, alkenylcarbonyl groups, aromatic carbonyl groups, and aromatic alkylcarbonyl groups, each of which may have a substituted group. Preferable examples thereof include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexane carbonyl, oleoyl, benzoyl, naphthyl carbonyl, and cinnamoyl. Among these, acetyl, propionyl, butanoyl decanoyl, octadecanoyl, tert-butanoyl, oleoyl, benzoyl, naphthyl carbonyl, and cinnamoyl are more preferred. Further, acetyl, propionyl and butanoyl are preferred.

It is preferable that the cellulose acylate used in the present invention has an acyl group having 2 to 4 carbon atoms as a substituent. When two or more kinds of acyl groups are used, it is preferable that one kind of the acyl groups is an acetyl group, and another kind of the acyl group having 2 to 4 carbon atoms is preferably propionyl group or butyryl group. By use of these cellulose acylates, a solution with a good solubility can be prepared. Especially in a non-chlorine organic solvent, preparation of a good solution becomes possible. Further, preparation of a solution having a low viscosity and a good filterability becomes possible.

The glucose unit having β-1, β-4 bonds, which constitutes cellulose, has tree hydroxy groups at the 2-, 3-, and 6-positions thereof. The cellulose acylate is a polymeric substance (polymer) in which a part of or all of these hydroxy groups is or are acylated.

The acyl substitution degree indicates a degree of acylation of the hydroxy groups located at the 2-, 3-, and 6-positions of cellulose. When each of the hydroxy groups at the 2-, 3-, and 6-positions of all of the glucose units is acylated, the total acyl substitution degree is 3. For example, when each of the hydroxy groups only at the 6-position of all of the glucose units is acylated, the total acyl substitution degree is 1. In the same manner, even if each of the hydroxy groups at either the 6-position or the 2-position of all of the glucose unit is acylated, the total acyl substitution degree is 1.

That is to say, the acyl substitution degree indicates a degree of acylation, provided that when all of the hydroxy groups of the glucose molecule are entirely acylated, the acyl substitution degree is 3.

As the details of the method of measuring the acyl substitution degree, measurement can be performed according to the method described in Tezuka et al., Carbohydrate Res., 273, 83-91 (1995), or in accordance with the method specified in ASTM-D817-96.

If a total acetyl substitution degree of the cellulose acylate to be used in the present invention is taken as A, A is preferably 1.5 or more and 3.0 or less (1.5≤A≤3.0), more preferably 2.00 to 2.97, still more preferably 2.50 or more and 2.97 or less, and particularly preferably 2.70 to 2.95.

Moreover, in cellulose acetate in which only the acetyl group is used as the acyl group of the cellulose acylate, when the total acetyl substitution degree is taken as B, B is preferably 2.0 or more and 3 or less (2.0≤B≤3.0), more preferably 2.0 to 2.97, still more preferably 2.5 or more and 2.97 or less, further more preferably 2.55 or more and 2.97 or less, particularly preferably 2.60 to 2.96, and most preferably 2.70 to 2.95.

The effects of the polymer of the present invention are exerted particularly with respect to the cellulose acylate in which A that is the total degree of acyl substitution is more than 2.00.

In the case where the polarizing plate protective film of the present invention is a laminate multilayer configuration), the degree of acyl group substitution of the cellulose acylate in each layer may be uniform, or a plurality of cellulose acrylates which have different degrees of acyl group substitution or different acyl groups may be present in one layer in a mixed manner, in the cellulose acylate film.

In the case where an acid anhydride or an acid chloride is used as an acylating agent in acylation of the cellulose, methylene chloride or an organic acid, for example, acetic acid and the like, is used as an organic solvent which acts as a reaction solvent.

As for the catalyst, when the acylating agent is an acid anhydride, a protic catalyst, such as sulfuric acid, is preferably used. While, when the acylating agent is an acid chloride (for example, $CH_3CH_2COCl$) a basic compound is used.

A most common industrial method for the synthesis of a mixed fatty acid ester of cellulose, is a method of acylating cellulose with a mixed organic acid component that includes fatty acids corresponding to an acetyl group and to any other acyl group (acetic acid, propionic acid, valeric acid, and the like) or their acid anhydrides.

The cellulose acylate may be produced, for example, according to the method described in JP-A-10-45804.

In the polarising plate protective film of the present invention, especially in the cellulose acylate film preferably used in the present invention, it is the proportion of preferably from 5 to 99% by mass, more preferably from 20 to 99% by mass, and particularly preferably from 50 to 95% by mass, of the cellulose acylate, with respect to the total solid content of the film, from the viewpoint of water-vapor transmission ratio.

[Other Additives]

To the polarizing plate protective film of the present invention, along with the polymer of the present invention, particularly to the cellulose acylate film, a retardation-controlling agent (a retardation-developing agent and a retardation-reducing agent), a plasticizer such as a polycondensation ester compound (polymer), a polyvalent ester of a polyvalent alcohol, a phthalic acid ester, and a sugar ester, and the like, may be added; and, further, any of additives, such as a ultraviolet absorber, an adical scavenger, a degradation inhibitor (an antioxidant), peeling accelerator, hardening agent, and a matting agent, may be added.

In the present specification, when compound groups are described, they may be described incorporating therein the expression"-based", for example, like a phosphoric acid ester-based compound. However, in this case, this means the same as the phosphoric acid ester compound.

As the retardation-reducing agent, the retardation-developing agent, the plasticizer, a hydrophobizing agent including a polyhydric alcohol ester-based or a polycondensation ester-based, a carbohydrate derivative-based plasticizer, the antioxidant, the ultraviolet absorber, and the matting agent, compounds or materials as described in JP-A-2013-28782, paragraphs 0061 to 0126 and WO 2014/034709, paragraphs 0066 to 0216 are preferred, and the entire descriptions also including the content thereof are preferably incorporated by reference herein.

Further, as the hardening agent, a compound having a plurality of an amide linkage, a urethane linkage, or a ureide linkage is preferred, and a compound represented by Formula (I) or Formula (A-100) described in a pamphlet of WO 2014/133041 and a compound represented by Formula (I) described in JP-A-2013-127058 are preferred. In the present specification, paragraph Nos. 0065 to 0256 of a pamphlet of WO 2014/133041 and paragraph Nos. 0094 to 0116 of JP-A-2013-127058 can be preferably incorporated by reference.

(Radical Scavenger)

The polarizing plate protective film preferably contains a radical scavenger. Any of a HALS and a reductone is preferably used, as the radical scavenger.

The HALS is particularly preferably a compound having a 2,2,6,6-tetramethyl-piperidine ring, it is preferably a compound in which the 1-position of the piperidine is a hydrogen atom, an alkyl group, an alkoxy group, a hydroxy group, an oxy radical group (—O.), an acyloxy group, or an acyl group, and it is more preferably a compound in which the 4-position thereof is a hydrogen atom, a hydroxy group, an acyloxy group, an amino group which may have a substituent, an alkoxy group, or an aryloxy group. In addition, it is also preferably a compound having from two to live 2,2,6,6-tetramethyl-piperidine rings in the molecule.

Examples of such a compound include: Sunlizer HA-622 (trade name, manufactured by Sort K.K.); CHIMASSORB 2020FDL, TINUVIN 770DF, TINUVIN 152, TINUVIN 123, and FLAMESTAB NOR 116 FF (each trade name, manufactured by BASF Japan Ltd, (the former Chiba Specialty Chemicals)); and CYASORB UV-3346, and CYASORB UV-3529 (each trade name, manufactured by SUN CHEMICAL Company Ltd.).

Examples of the reductones include: compounds exemplified in JP-A-H6-27599, paragraphs 0014 to 0034; compounds exemplified in JP-A-H6-110163, paragraphs 0012 to 0020; and compounds exemplified in JP-A-118-114899, paragraphs 0022 to 0031.

In addition, it is possible to use preferably an oil-solubilized derivative of ascorbic acid or erythorbic acid in the present invention, and examples thereof in elude ascorbyl stearate, L-ascorbyl tetraisopalmitate, L-ascorbyl palmitate, erythorbyl palmitate, and erythorbyl tetraisopalmitate. Among them, those having an ascorbic acid skeleton are preferable, and myristate, palmitate, and stearate of L-ascorbic acid esters are particularly preferable.

The content of the radical scavenger in the polarizing plate protective film is preferably from 0.001 to 2.0 parts by mass, and more preferably from 0.01 to 1.0 parts by mass, to 100 parts by mass of the resin constituting the polarizing plate protective film.

(Degradation Inhibitor)

To the polarizing plate protective film, a degradation inhibitor (for example, an antioxidant, a peroxide decomposition agent, a radical inhibitor, a metal deactivator, an acid trapping agent, and an amine) may be added. Moreover, the ultraviolet absorber is also one of the degradation inhibitors. These degradation inhibitor and the like are preferably those described in JP-A-S60-235852, JP-A-H3-199201, JP-A-H5-1907073, JP-A-H5-194789, JP-A-H5-271471, JP-A-H6-107854, JP-A-H6-118233, JP-A-H6-148430, JP-A-H7-11056, JP-A-H7-11055, JP-A-H7-11056, JP-A-H8-29619, JP-A-H8-239509, JP-A-2000-204173, and JP-A-2006-251746.

The radical scavenger also exhibits the degradation preventing action, but an amine is also known as a degradation inhibitor. Examples thereof include: compounds described in JP-A-H5-194789, paragraphs 0009 to 0080; and an aliphatic amine, such as tri-n-octylamine, triisooctylamine, tris(2-ethylhexyl)amine, and N,N-dimethyldodecylamine.

In addition, it is also preferable to use a polyvalent amine having two or more amino groups, and those having two or more primary or secondary amino groups are preferable, as the polyvalent amine. Examples of the compound having two or more amino groups include: a nitrogen-containing heterocyclic compound (a compound having a pyrazolidine ring, a piperazine ring, or the like); and a polyamine-based compound (a compound which is a chain or cyclic polyamine and contains, for example, diethylenetriamine, tetraethylenepentamine, N,N'-bis(aminoethyl)-1,3-propanediamine, N,N,N',N'',N''-pentakis(2-hydroxypropyl)diethylenetriamine, polyethyleneimine, modified polyethyleneimine, or cyclam, as a basic skeleton).

The content of the degradation inhibitor in the polarizing plate protective film is preferably from 1 ppm to 10%, more preferably from 1 ppm to 5.0%, and still more preferably from 10 ppm to 1.0%, on the mass basis.

(Peeling Accelerator)

To the polarizing plate protective film, any of peeling accelerators may be added.

The peeling accelerator is preferably an organic acid, a polyvalent carboxylic acid derivative, a surfactant, or a chelating agent. For example, compounds described in JP-A-2006-45497, paragraphs 0048 to 0081, compounds described in JP-A-2002-322294, paragraphs 0077 to 0086, compounds described in JP-A-2012-72348, paragraphs 0030 to 0056, and compounds described in WO 2014/

034709, paragraphs 0206 to 0216, can be preferably used. The content of the peeling accelerator in the polarizing plate protective film is preferably from 1 ppm to 5.0%, more preferably from 1 ppm to 2.0%, on the mass basis.

Hereinafter, preferable properties of the polarizing plate protective film are described with regard to a cellulose acylate film as a representative for the polarizing plate protective film. However, the present invention is not limited only to the cellulose acylate film.

[Elastic Modulus (Tensile Elastic Modulus)]

The cellulose acylate film exhibits practically-sufficient elastic modulus (tensile elastic modulus). The range of the elastic modulus, although it is not particularly limited, is preferably from 1.0 GPa to 7.0 GPa, and more preferably from 2.0 GPa to 6.5 GPa, from the viewpoint of production suitability and handling properties. The polymer of the present invention acts such that the cellulose acylate film is hydrophobized by addition of the polymer a cellulose acylate film, thereby improving elastic modulus. In this point, the present invention also has an advantage.

(Photoelastic Coefficient)

The absolute value of photoelastic coefficient of the cellulose acylate is preferably $8.0 \times 10^{-12}$ m$^2$/N or less, more preferably $6.0 \times 10^{-12}$ m$^2$/N or less, and still more preferably $5.0 \times 10^{-12}$ m$^2$/N less. Lessening the photoelastic coefficient of the cellulose acylate film enables suppression of generation of unevenness under of hydrothermal condition upon mounting of the cellulose acylate film into a liquid crystal display as a polarizing plate protective film. The photoelastic coefficient is measured and calculated in accordance with the following method, unless it is explicitly stated otherwise.

The lower limit of the photoelastic coefficient is not particularly limited. However, it is practical to be $0.1 \times 10^{-12}$ m$^2$/N or more.

The cellulose acylate film is cut into a specimen of 3.5 cm×12 cm and retardation (Re) is measured under each load of non-load, 250 g, 500 g, 1000 g and 1500 g using an ellipsometer (M 150 [trade name], manufactured by JASCO Corporation), and by calculation based on the slope of a straight line of Re change to stress the photoelastic coefficient is measured.

(Moisture Content)

The moisture content of the cellulose acylate film can be evaluated by measurement of equilibrium moisture content under the constant temperature and humidity. The equilibrium moisture content is obtained by the following method. That is, the moisture content of a sample which has reached equilibrium after leaving it for 24 hours at the above-described temperature and humidity is measured in accordance with Karl Fischer Method, and the obtained moisture content (g) is divided by the sample mass (g) to obtain the equilibrium moisture content.

The moisture content of the cellulose acylate film of the present invention under the conditions of 25° C. and relative humidity of 80% is preferably 5% by mass or less, more preferably 4% by mass or less, and still more preferably less than 3% by mass. Lessening the moisture content of the cellulose acylate film enables suppression of generation of display unevenness under hygrothermal condition upon mounting of the optical film including the cellulose acylate film into a liquid crystal display as a polarizing plate protective film. The lower limit of the moisture content is not particularly limited. However, it is practical to be 0.1% by mass or greater.

(Water-Vapour Transmission Ratio)

The water-vapour transmission ratio of the cellulose acylate film can be measured and evaluated by the following method. That is, the mass of water-vapour which passes through the sample for 24 hours in the atmosphere of temperature: 40° C. and relative humidity: 90% is measured in accordance with the water-vapour transmission ratio test (cup method) prescribed in JIS 70208, and the obtained value is converted to the mass of water-vapour which passes through the sample for 24 hours per m$^2$ of the sample area to evaluate the water-vapour transmission ratio.

The water-vapour transmission ratio of the cellulose acylate film of the present invention is preferably from 500 to 2000 g/m$^2$·day, and more preferably from 900 to 1300 g/m$^2$·day.

(Haze)

The cellulose acylate film may have a haze of preferably 1% or less, more preferably 0.7% or less, most preferably 0.5% or less. When the haze is lowered to the above-described upper limit or less, the cellulose acylate film has advantages in that transparency of the film is more increased and thus the film becomes more usable as an optical film. The haze is measured and calculated in accordance with the method used in Examples described below, unless it is explicitly stated otherwise. The lower limit of the haze is not particularly limited. However, it is practical to be 0.001% by mass or greater.

Haze of the cellulose acylate film of 40 mm×80 mm in size is measured in an environment at 25° C. and 60% relative humidity, using a haze meter (HGM-2DP, from Suga Test Instruments Co., Ltd.), in compliance with JIS K7136.

(Film Thickness)

The average film thickness of the cellulose acylate film is preferably from 10 to 100 μm, more preferably from 15 to 80 μm, and still more preferably from 15 to 70 μm. Setting the average film thickness to 15 μm or greater is preferable, because handling properties during production of a web film are improved. While, on the other hand, when the average film thickness is set to 7 μm or less, the response to humidity change becomes easy and thus maintenance of the optical characteristics becomes easy.

Further, in the case where the cellulose acylate film has a multi-layered structure of three or more multi-layers, the film thickness of the core layer is preferably from 3 to 70 μm, and more preferably from 5 to 60 μm each of the film thicknesses of the skin layer A and skin layer B are more preferably from 0.5 to 20 μm, particularly preferably from 0.5 to 10 μm, and most preferably from 0.5 to 5 μm.

(Width)

The film width of the cellulose acylate film is preferably from 700 to 3000 mm, more preferably from 1000 to 2800 mm, and particularly preferably from 1300 to 2500 mm.

[Production Method of Polarizing Plate Protective Film]

Production method of polarizing plate protective film, the production method of the cellulose acylate film is not particularly limited, but the cellulose acylate film is preferably produced by the melt-casting film forming method or the solution film forming method. The production by the solution film firming method (a solvent casting method) is more preferable. Examples of production of cellulose acylate film using a solvent casting method are given in U.S. Pat. Nos. 2,336,310, 2,367,603, 2,492,078, 2,492,977, 2,492,978, 2,607,704, 2,739,069 and 2,739,070, British Patents 640731, 736892, JP-B-45-4554, JP-B-49-5614, and JP-A-60-176834, JP-A-60-203430, JP-A-62-115035, are referred to herein. The cellulose acylate film may be stretched. Regarding the method and condition for stretching treatment, for example, referred to are JP-A-62-115035, JP-A-4-152125, JP-A-4-284211, JP-A-4-298310, JP-A-11-48271.

(Casting Methods)

Solvent casting methods may include a method for uniformly extruding a prepared dope from a pressure die onto a metal support, a doctor blade method for adjusting, with a blade, the film thickness of a dope once cast on a metal support, a reverse roll coater method for adjusting it with a reverse rotating roll, and the like, but the method of using a pressure die is preferred. The pressure die includes a coat hanger type or a T die type, and any of them may be preferably used, in addition to these methods exemplified herein, various methods of film production by casting a cellulose acylate solution, which are known in the prior art, may be employed. When each of conditions is set in consideration of the difference in the boiling points of solvents used, the same effects as the contents described in each publication can be obtained.

Co-Casting

In formation of the polarizing plate protective film, in particular, the cellulose acylate film, a multi-layer casting method such as a co-casting method, a sequential casting method and a coating method is preferable. Especially, a simultaneous co-casting method is particularly preferred from the viewpoints of stable production and production cost.

In the case of production by a co-casting method or a sequential casting method, initially a solution (dope) of the composition containing a resin used in a polarizing plate protective film for each layer and the polymer of the present invention are prepared.

The co-casting method (multilayer simultaneous casting method) is a casting method in which individual layers are simultaneously cast by simultaneously extruding co-casting dopes onto a casting support band or dram) from a casting Giesser through which the individual casting dopes for intended layers (the number of the layers may be three or more) are simultaneously extruded via different slits and the like, and then at a suitable time, the film formed on the support is peeled away and dried.

A localization method in the co-casting method is not limited in particular. Examples thereof include a method of using a dope containing the polymer of the present invention for forming a layer in which the polymer of the present invention is localized, white using a dope contain none of the polymer of the present invention as a dope for forming another layer.

The Sequential Casting Method

The sequential casting method is a casting method in which first a casting dope for first layer is extruded out and cast onto a casting support through a casting Giesser, then after it is dried or not dried, a casting dope for second layer is extruded through the casting Giesser and cast onto it, and if needed, three or more layers are sequentially formed by casting and laminating dopes in the same manner as the above, and then at a suitable time, the resulting laminate is peeled away from the support and dried to form polarizing plate protective film. The coating method is generally a method in which a core layer is formed of film by means of film formation with solution, then a coating solution for a surface layer is prepared, and then using a suitable coater, the coating solution is applied onto the core layer first on one surface thereof and next on the other surface thereof, or simultaneously on both surfaces thereof, and dried to form a multi-layered polarizing plate protective film.

A localization method in the sequential casting method is not limited in particular. Examples thereof include a method of forming a polarizing plate protective film having a laminate structure by forming a core layer containing none of the polymer of the present invention in the form of a film in accordance with a solution cast method, and then preparing a coating liquid containing the polymer of the present invention, and then coating the coating liquid on one side of the core layer and drying the coated layer. In this case, the coating liquid which contains the polymer of the present invention acts as a solution of the polarizing plate composition of the present invention.

As the endlessly running metal support for use in production of polarizing plate protective film, it is possible to use a dram the surface of which is mirror-finished by chromium plating, or a stainless belt (may be called as a band) the surface of which is mirror-finished by surface polish. One or at least two pressure dies may be used by arranging it above the metal support. Preferably, one or two pressure dies are arranged. In case where two or more pressure dies are arranged, a casting amount of the dope may be divided into portions which are suitable for the individual dies; or the casting dope may be fed to the die at a suitable proportion from a plurality of precision metering gear pumps. The temperature of the dope (resin solution) used for casting is preferably from −10° C. to 55° C., and more preferably from 25° C. to 50° C. In this case, the solution temperature may be the same throughout the entire process, or may be different in differ stages of the process. In case where the temperatures are different in different stages, it is no problem as long as the dope has a desired temperature just before casting.

Further, the material of the above metal support, although it is not particularly limited, is preferably made of SUS (for example, SUS 316).

(Peeling)

The method of producing the polarizing plate protective film, in particular, the cellulose acylate film preferably includes a process of peeling off the above dope film from the metal support. In the method of producing a polarizing plate protective film, the peeling method is not particularly limited, and a peeling property can be improved by any known methods such as addition of a peeling accelerator.

(Stretching Process)

The method of producing the polarizing plate protective film, particularly the cellulose acylate film, may include a step of stretching the film-formed polarizing plate protective film for the purpose of regulating mechanical properties or providing a phase difference. The stretching direction of the polarizing plate protective film is preferable in any of the polarizing plate protective film conveying direction (MD direction) and an orthogonal direction (TD direction) to the conveying direction. However, the orthogonal direction to the polarizing plate protective film conveying direction (TD direction is particularly preferred from the viewpoint of the subsequent polarizing plate-manufacturing process using the polarizing plate protective film.

A method of stretching the film in the TD direction is described in, for example, JP-A-62-115035, JP-A-4-152125, JP-A-4-284211, JP-A-4-298310, JP-A-11-48271 and the like. In the case of stretching in the MD direction, the polarizing plate protective film is stretched when the polarizing plate protective film winding speed is set to be faster than the polarizing plate protective film peeling-off speed, for example, by adjusting a speed of the polarizing plate protective film-conveying roller. In the case of stretching in the TD direction, the polarizing plate protective film may be stretched by conveying the polarizing plate protective film while holding the width of the polarizing plate protective film with a tenter, and extending the width of the tenter gradually. After drying the polarizing plate protective film, the film may be also stretched by using a stretching machine (preferably uniaxial stretching by using a long stretching machine).

In case where the polarizing plate protective film is used as a protective film for a polarizer, the transmission axis of the polarizer and the in-plane slow axis of the polarizing plate protective film are required to be arranged parallel to one another in order to suppress the light leakage when viewed from oblique directions to the polarizing plate. The transmission axis of the roll film-shaped polarizer that is produced continuously is generally parallel to the width direction of the roll film, and therefore, in order to continuously sticking the above roll film-shaped polarizing element together with a protective film composed of the roll film-shaped the polarizing plate protective film, the in-plane slow axis of the roll film-shaped protective film is required to be parallel to the width direction of the polarizing plate protective film. Accordingly, the film is preferably stretched to a larger extent in the TD direction. The stretching treatment may be conducted during the course of the film production process, or the original film obtained by rewinding the produced film may be subjected to a stretching treatment.

The stretching in the TD direction is preferably from 5 to 100%, more preferably from 5 to 80%, and particularly preferably from 5 to 40%. Meanwhile, non-stretching means that stretching is 0%. The stretching treatment may be conducted during the course of the film production process, or the original film obtained by rewinding the produced film may be subjected to a stretching treatment. In the former case, stretching may be conducted in the condition where a certain amount of a residual solvent is contained, and when the residual solvent amount, i.e., (mass of residual volatile substance/mass of film after heat treatment)×100%, is from 0.05 to 50%, the stretching is preferably conducted. It is particularly preferable to conduct the stretching of from 5 to 80% in the condition where the residual solvent amount is from 0.05 to 5%.

(Drying)

The method of producing the polarizing plate protective film, in particular, the cellulose acylate film, it is preferable from the viewpoint of enhancing the retardation that the method includes a step of drying the polarizing plate protective film and a step of stretching the thus dried polarizing plate protective film at a temperature which is equal to or higher than the glass transition temperature (Tg) −10° C.

The method of drying of the dope provided on a metal support generally includes: a method of blowing a hot air from a surface side of the metal support (dram or belt), that is to say, from the surface of a web provided on the metal support; a method of blowing a hot air from a back side of the dram or belt; a back-side liquid heat transfer method in which a temperature-modulated liquid is brought into contact with the back side opposite to the casting side of the dram or belt, thereby heating the dram or belt through heat transfer to control a surface temperature; and the like. Among these, the back-side liquid heat transfer method is preferred. The surface temperature of the metal support before casting is conducted is not particularly limited as long as it is not higher than the boiling point of a solvent which is used for a dope. However, in order to promote drying or to make the dope lose fluidity on the metal support, the surface temperature is preferably set to a temperature which is from 1 to 10° C. lower than the boiling point of the solvent having the lowest boiling point among the solvents used for the dope. However, this shall not apply in the case where the casting dope is cooled and then peeled off without drying.

The adjustment of the polarizing plate protective film thickness may be achieved by adjusting a concentration of the solid contained in the dope, a slit space of the die nozzle, an extrusion pressure from a die, a speed of the metal support or the like so as to be a desired thickness.

The thus-obtained polarizing plate protective film is preferably wound at the degree of from 100 to 10000 m, more preferably from 500 to 7000 in, and still more preferably from 1000 to 6000 m in length per roll. At the time of winding, at least one end thereof is preferably subjected to knurling. The width of knurling is preferably from 3 to 50 min and more preferably from 5 to 30 mm. The height thereof is preferably from 0.5 to 500 μm and more preferably from 1 to 200 μm. This may be either one-way press or two-way press.

When the film is used as an optical compensation film for a large screen liquid crystal display, molding the film so as to be, for example, 1470 rum or more in width is preferred. Further, the aspect of the polarizing plate protective film of the present invention includes a film piece that is cut to a size capable of being mounted as it is in a liquid crystal display, as well as a film that is manufactured in a long shape by continuous production and wound in a roll shape. The polarizing plate protective film of the latter aspect is stored or conveyed as it is, and is used by cutting it to a desired size when the film is mounted in a liquid crystal display, or when the film and a polarizer or the like are stuck together in practice. Alternatively, the polarizing plate protective film is used by cutting it to a desired size when the film is mounted in a liquid crystal display in practice after sticking the film in a long shape as it is with a polarizer composed of a polyvinyl alcohol film or the like manufactured similarly in a long shape. As an aspect of the optical compensation film which is wound in a roll shape, an aspect of a film which is wound in a roll shape and has a roll length of 2500 m or more, is exemplified.

<<Functional Layer>>

In the polarizing plate protective film of the present invention, the functional layer according to the intended purpose can be provided on the polarizing plate protective film, if desired. Specific examples of the functional layer include a hard coat layer, an antireflection layer, a light-scattering layer, a stain-proofing layer, and an antistatic layer, and these may serve as a plurality of functions in one layer.

For example, the hard coat layer is a layer for imparting hardness or scratch resistance to the polarizing plate protective film. For example, in the case where the polarizing plate protective film containing the polymer of the present invention is provided with the hard coat layer, the hard coat layer may be provided by coating a coating composition on a layer containing the polymer of the present invention and curring it, or alternatively the hard coat layer may be provided by coating the coating composition on the side opposite to the layer containing the polymer of the present invention and curring it. In any of these cases, the hard coat layer having a high adhesion to the polarizing plate protective film, particularly a cellulose acylate film can be formed. A filler and/or an additive may be added to the hard coat layer, thereby to make the hard coat layer itself have mechanical, electrical or optical physical performance or chemical performance, such as water repellency or oil repellency. The thickness of the hard coat layer is preferably 0.1 to 6 μm, more preferably from 3 to 6 μm. Having such a thin hard coat layer of which the thickness falls within the range, the resultant polarizing plate protective film containing the hard coat layer can have improved physical preferably in point of brittleness reduction and curling prevention, and can attain other advantages of weight saving and production cost cutting.

Preferably, the hard coat layer is formed by curing a curable composition. Preferably, the curable composition is prepared as a liquid coating composition. One example of the coating composition contains a monomer or an oligomer for a matrix formation binder, a polymer and an organic solvent. Curing the coating composition applied can form the intended hard coat layer. The curing reaction includes crosslinking polymerization.

[[Polarizer]]

[Resin]

In the polarizer according to the present invention, a polyvinyl alcohol-based resin is preferably used. The polarizer according to the present invention contains as a main component the polyvinyl alcohol resin, and the resin generally occupies 80 mass % or more in the polarizer. The polyvinyl alcohol is generally a material obtained by saponifying polyvinyl acetate, and is allowed to contain a component copolymerizable with vinyl acetate, for example, as unsaturated carboxylic acid, unsaturated sulfonic acid, olefins, and vinyl ethers. Moreover, use can also be made of a modified polyvinyl alcohol-based resin containing, for example, an acetoacetyl group, a sulfo group, a carboxy group, an oxyalkylene group.

In the present invention, a polyvinyl alcohol, or an acylated or ketalated polyvinyl alcohol is preferred.

A saponification degree of the polyvinyl alcohol-based resin is not particularly limited, but from the viewpoint of solubility or the like, it is preferably 80 to 100 mol %, and particularly preferably 90 to 100 mol %. A polymerization de gee of the polyvinyl alcohol-based resin is not particularly limited, but it is preferably 1,000 to 10,000, and particularly preferably 1,500 to 5,000.

An elastic modulus of the poly polyvinyl alcohol-based resin film before stretching is preferably 0.1 MPa or more and 500 MPa or less, and more preferably 1 MPa or more and 100 MPa or less in terms of a Young's modulus.

By setting the modulus to such a range, the polyvinyl alcohol-based resin film can be produced, which is excellent in an effect on inhibiting occurrence of wrinkles after stretching, and which has sufficient mechanical strength.

A thickness of the polyvinyl alcohol-based resin film before stretching is not particularly limited, but from the viewpoints of stability of film retention, and homogeneity of stretching, it is preferably 1 μm to 1 mm, and particularly preferably 20 to 200 μm. Moreover, a thickness of the polyvinyl alcohol-based resin film after stretching is preferably 2 to 100 μm, and for improving light leakage, it is preferably 7 to 25 μm. According to those thicknesses, a thickness of the film in the polarizer is determined.

The content of the polymer of the present invention in the polarizer or the addition amount thereof in the composition is not particularly limited, but preferably from 0.01 to 40 parts by mass, more preferably from 0.01 to 30 parts by mass, and particularly preferably from 0.01 to 20 parts by mass, with respect to 100 parts by mass of the resin which constitutes the polarizer.

Further, even in the case where 2 or more kinds of the polymers of the present invention are contained in combination, or the polymer of the present invention is used in combination with the compound represented by Formula (A), it is preferred that the total content thereof is in the above range.

<<Dichroic Dye>>

The polarizer according to the present invention contains a dichroic dye. Herein, the dichroic dye means a dye absorbance of which is different depending on directions. Examples thereof include an iodide ion, a diazo dye, a quinone dye, and any of other dichroic dyes. As the dichroic dye, use can be preferably made of a polyiodide ions or dichroic stain, such as $I_3^-$ and $I_5^-$, or a dichroic dye.

In the present invention, the polyiodide ions are particularly preferably used. With regard to the polyiodide ions, as described in "Application of polarizing plates," edited by Ryo Nagata, CMC Publishing Co., Ltd., or industrial Materials, vol. 28. No. 7, pp. 39 to 45, a polyvinyl alcohol is immersed into a liquid in which iodine is dissolved in an aqueous potassium iodide solution and/or an aqueous boric acid solution, and the polyiodide ions are formed in a state in which iodine is adsorbed and oriented on the polyvinyl alcohol.

The content of the dichroic dye is preferably 0.1 to 50 parts by mass, more preferably 0.5 to 20 parts by mass, and further preferably 1.0 to 15 parts by mass, with respect to 100 parts by mass of the polyvinyl alcohol-based resin.

In addition to the polyvinyl alcohol-based resin and the dichroic dye, and the polymer of the present invention, a plasticizer and/or a surfactant may be added, when necessary, to the polarizer according to the present invention.

<Method of Producing Polarizer>

A method of producing the polarizer of the present invention includes a step of performing film formation of a polyvinyl alcohol-based resin solution (the polymer of the present invention may be incorporated therein. In this case, the polyvinyl alcohol-based resin solution acts as a solution of the polarizing plate composition of the present invention) in the form of film, a step of stretching the polyvinyl alcohol-based resin film, and a step of dying the stretched polyvinyl alcohol-based resin film with a dichroic dye.

As a method of producing the polarizer according to the resent invention, for example, the polarizer is preferably formed, by achieving film formation of the polyvinyl alcohol-based resin, and then introducing iodine thereinto. Production of the polyvinyl alcohol-based resin film can be made, for example, with reference to the method described in JP-A-2007-86748, paragraphs 0213 to 0237, Japanese Patent No. 3342516, JP-A-H09-328593, JP-A-2001-302817, and JP-A-2002-144401. Further, the timing to add the polymer of the present invention to a polyvinyl alcohol-based resin also is not particularly limited.

In the step of forming the polyvinyl alcohol-based resin solution into the film shape, the polyvinyl alcohol-based resin is preferably added to water while stirring, to prepare a stock (undiluted) solution in which the polyvinyl alcohol-based resin is dissolved into water or the organic solvent. A concentration of the polyvinyl alcohol-based resin in the stock solution is preferably 5 to 20% by mass. Moreover, the resultant slurry may be dehydrated, to once prepare a polyvinyl alcohol-based resin wet cake having a moisture content of about 40%. When the additive is further added thereafter, for example, a method is preferred in which the wet cake of the polyvinyl alcohol is put in a dissolver, the plasticizer and/or water are/is added thereto, and the resultant mixture is stirred while water vapor is blown from a bottom of the tank. As a temperature of the resin therein, the resin is preferably heated to 50 to 150° C., and an inside of the system may be pressurized.

It is noted that, in the case where the polymer of the present invention is water-soluble or semi water-soluble (the term "water-soluble" and "semi water-soluble" are described in the section of description about an adhesive layer), addition of the polymer of the present invention to the polarizer at this step (use of a solution of the polarizing plate composition of the present invention as a polyvinyl alcohol-based resin solution) is preferred from the viewpoint of effectively introducing the polymer of the present invention to the polarizer. Further, the addition of the polymer of the present invention is preferably carried out by a method of placing a wet cake of polyvinyl alcohol in a dissolution bath, and then agitating the content while injecting water vapor from the bath bottom.

In the present invention, a method is preferably applied to in which the stock solution of the polyvinyl alcohol-based resin solution prepared as above is cast, to form the film. The casting method is not particularly limited. However, a heated stock solution of the polyvinyl alcohol-based resin solution is preferably supplied to a twin-screw extruder, and cast from a discharging means (preferably a die, and more preferably a T-shaped slit die) onto the support by means of a gear pump, to form the film. Moreover, a temperature of the resin solution discharged from the die is not particularly limited.

As the support, a casting drum is preferred, and a diameter, a width, a rotational speed, and a surface temperature of the drum is not particularly limited. Among these, the diameter of the casting drum is preferably 2,000 to 5,000 mm, more preferably 2,500 to 4,500 mm, and particularly preferably 3,000 to 3,500 mm.

The width of the casting drum is preferably 2 to 6 m, more preferably 3 to 5 m, and particularly preferably 4 to 5 in.

The rotational speed of the casting drum is preferably 2 to 20 m/min, more preferably 4 to 12 m/min, and particularly preferably 5 to 10 m/min.

The surface temperature of the casting drum is preferably 40 to 140° C., more preferably 60 to 120° C., and particularly preferably 80 to 100° C.

The resin temperature at an outlet of the T-shaped slit die is preferably 40 to 140° C., more preferably 60 to 120° C., and particularly preferably 80 to 100° C.

Then, drying is preferably performed, by allowing a back surface and a front surface of the resultant roll to alternately pass through a drying roller. A diameter, a width, a rotational speed, and a surface temperature of the drying roller are not particularly limited. Among these, the diameter of the drying drum is preferably 200 to 450 mm, more preferably 250 to 400 mm, and particularly preferably 300 to 350 mm.

Moreover, a length of the obtained film is not particularly limited, and the film can be formed into a long film of generally 2,000 m or more, and preferably 4,000 m or more. A width of the film is also not particularly limited, but is preferably 2 to 6 m and more preferably 3 to 5 m.

The polyvinyl alcohol-based resin solution is formed into the film shape, and then the film is stretched. To stretching, use can be preferably made of: the longitudinally uniaxial stretching manner as described in U.S. Pat. No. 2,454,515; or the tenter manner as described JP-A-2002-86554. A preferred stretching ratio is preferably 2 times to 12 times, and more preferably 3 times to 10 times. Moreover, a relationship among the stretching ratio, a master roll thickness, and a polarizer thickness can be preferably adjusted to an expression: (polarizer film thickness after sticking polarizing plate protective film/master roll thickness)×(total stretching ratio)>0.17, as described in JP-A-2002-040256; and a relationship between a width of the polarizer in leaving a final bath, and a polarizer width in sticking the polarizing plate protective film can also be preferably adjusted to an expression: 0.80≤(polarizer width in sticking polarizing plate protective film/width of polarizer in leaving final bath)≤0.95, as described in JP-A-2002-040247.

After stretching, the polyvinyl alcohol-based resin film is dyed with the dichroic dye. Dyeing is performed by adsorption in a gas-phase or a liquid-phase. When iodine is used as the dichroic dye as an example in which dyeing is performed in the liquid phase, the polymer film for the polarizer is immersed into an aqueous iodine/potassium iodide solution, for dying. Iodine is preferably in 0.1 to 20 g/L, potassium iodide is preferably in 1 to 200 g/L, and a mass ratio of potassium iodide to iodine is preferably 1 to 200. A dyeing time is preferably 10 to 5,000 seconds, and a liquid temperature is preferably 5 to 60° C. A dyeing step may be placed in any of steps before and after the stretching step. However, the film is particularly preferably dyed in the liquid phase before the stretching step, because the film is properly swollen and stretching is become readily.

Moreover, to dyeing, the method described in JP-A-2002-86554 can be applied to. As a dyeing method, not only immersion but also arbitrary means, such as application (coating) and spraying of iodine or a dye solution, can be applied to. Moreover, as described in JP-A-2002-290025, the method may also be applied to, in which dyeing is performed while controlling a concentration of iodine, a dyeing bath temperature, a stretching ratio in the bath, or/and stirring a bath liquid in the bath.

In addition, as described in Japanese Patent No. 3145747, a boron-based compound, such as boric acid and sodium tetraborate decahydrate, may be added to the dyeing solution.

As other steps, a swelling step, a film-hardening step, and a drying step may be performed. These steps are described in JP-A-2011-237580, paragraphs 0039 to 0050, and the content is incorporated by reference herein.

In the present invention, the polarizer containing the polymer of the present invention is preferably produced by the following steps including:

(1) a step of forming the polyvinyl alcohol-based resin solution into a film shape, (2) a step of stretching the polyvinyl alcohol-based resin film, (3) a step of dyeing, with the dichroic dye, the polyvinyl alcohol-based resin film after stretching, (4) a step of crosslinking, with boric acid, the polyvinyl alcohol-based resin film after dyeing, and (5) a step of coating and drying a solution containing the polymer of the present invention (this is also referred to as a polymer-containing solution, and corresponds to the polarizing plate composition of the present invention).

The step (5) of coating a polymer-containing solution in the above-described is preferably carried out after, in the following order, the step of preparing a polarizer in the step (4) and the step of sticking a polarizing plate protective film together with an adhesive onto one surface of the polarizer.

Further, a solvent for the polymer-containing solution is preferably a solvent in which the polymer of the present invention can be dissolved. Examples of the solvent include methylethyl ketone (MEK), methanol, tetrahydrofuran (THF), and the like. These solvents may be used in mix.

Further in the present invention, a polarizing plate is also preferably produced by sticking a polarizer and a polarizing plate protective film together with an adhesive containing the polymer of the present invention (this corresponds to a polarizing plate composition of the present invention), or by sticking a polarizer and a substrate (liquid crystal cell) together with an adhesive containing the polymer of the present invention. This allows incorporation of the polymer of the present invention into the bonded layers, so that the polymer of the present invention is able to get contact with the polarizer (layer).

[[Adhesive Layer]]

In a method of laminating the polarizing plate of the present invention and each of constituent members such as a polarizing plate protective film, a polarizer and the like, an adhesive layer is preferably used. Although the situation is different depending on properties of the adhesive layer, if the adhesive layer has tackiness, the adhesive layer can be used to stick them together without any change of the adhesive layer. It is noted that on this occasion a step of improving adhesiveness, such as a saponification treatment, may be added.

[Resin Used for the Adhesive Layer]

The resin used for the adhesive layer is not particularly limited, as long as it has compatibility to the polymer of the present invention and has a function to stick them together. The form of the adhesive layer also is not particularly limited. As the adhesive layer, an adhesive having stickiness may be used. Alternatively, an adhesive which develops adhesiveness by drying or a reaction may be used. In the present invention, the adhesive means to include a pressure sensitive adhesive in addition to an adhesive.

The adhesive layer according to the present invention contains the resin as a main component, and proportion of the resin is generally 60 mass % or more of the adhesive layer. The proportion of the resin is preferably 70% by mass or more of the adhesive layer.

The content of the polymer of the present invention in the adhesive layer or the addition amount thereof in the composition is not particularly limited, but preferably from 0.01 to 40 parts by mass, more preferably from 0.01 to 30 parts by mass, and particularly preferably from 0.01 to 20 parts by mass, with respect to 100 parts by mass of the resin which constitutes the adhesive layer.

Further, even in the case where 2 or more kinds of the polymers of the present invention are contained in combination, or the polymer of the present invention is used in combination with the compound represented by Formula (A), it is preferred that the total content thereof is in the above range.

The adhesive layer is formed by, for example, coating and drying a coating liquid containing a predetermined proportion of an adhesive (this corresponds to a solution of the polarizing plate composition of the present invention) on at least one surface of a polarizing plate protective film or a polarizer. As a method of preparing the coating liquid, any of appropriate methods may be adopted. As a liquid which can be used for preparing a coating liquid by adding thereto the polymer of the present invention, a commercially available solution or dispersion liquid may be used, or a solution which is obtained by adding a solvent to a commercially available solution or dispersion liquid, may be used. Alternatively, a solution Obtained by dissolving or dispersing a solid content to a wide variety of solvent may be used.

As the adhesive, an adhesive having any of appropriate properties, forms and adhesion mechanism may be used depending on its purposes. Specifically, examples of the adhesive include a water-soluble adhesive, an ultraviolet cure adhesive, an emulsion adhesive, a latex adhesive, a mastic adhesive, a double adhesive, a paste adhesive, a foam adhesive, and a supported film adhesive, a thermoplastic adhesive, a thermal fusion adhesive, a heat solidification adhesive, a hot-melt adhesive, a thermal active adhesive, a heat seal adhesive, a thermosetting adhesive, a contact adhesive, a pressure sensitive adhesive, a polymerizable adhesive, a solution adhesive, a solvent-active adhesive, and the like. A water-soluble adhesive and an ultraviolet cure adhesive are preferred. In particular, in the case where a polarizer adjacent layer in the polarizing plate of the present invention is an adhesive layer formed from such an adhesive, among these adhesives, a water-soluble adhesive which is excellent in terms of transparency, adhesiveness, operability, quality of the product, and economy is preferably used.

(A) Water-Soluble Adhesive

The water-soluble adhesive may contain, for example, at least one of a water-soluble natural polymer or a synthetic polymer. Examples of the natural polymer include a protein, a starch, and the like. Examples of the synthetic polymer include a resol resin, a urea resin, a melamine resin, polyethylene oxide, polyacryl amide, polyvinyl pyrrolidone, an acrylate ester, a methacrylate ester, a polyvinyl alcohol-based resin, and the like. Among these, a water-soluble adhesive containing a polyvinyl alcohol-based resin is preferably used. In particular, in the polarizing plate of the present invention, an embodiment that the polarizer adjacent layer contains a water-soluble adhesive containing a polyvinyl alcohol-based resin is preferred from the viewpoint that adhesion to the polarizer is very excellent and adhesion to the polarizing plate protective film is also excellent.

The form of the adhesive layer also is not particularly limited. An adhesive having stickiness may be used. Alternatively, an adhesive which develops adhesiveness by drying or a reaction may be used.

As the pressure sensitive adhesive, any of appropriate pressure sensitive adhesives can be adopted. Specifically, examples thereof include a solution pressure sensitive adhesive, a non-aqueous emulsion pressure sensitive adhesive, an aqueous pressure sensitive adhesive, a hot-melt pressure sensitive adhesive, and like. In particular, in the case where the adhesive layer is formed from a pressure sensitive adhesive, among these, a solution pressure sensitive adhesive containing an acrylic polymer as abase polymer is preferably used. This is because the solution pressure sensitive adhesive exhibits appropriate stickiness (for example, wettability, cohesive property, and adhesiveness) to the polarizer and the polarizing plate protective film, and has excellent optical transparency, weather resistance and heat resistance.

(Metal Compound Colloid)

The water-soluble adhesive may contain a metal compound. In particulate, the water-soluble adhesive containing a metal compound colloid in addition to a polyvinyl alcohol-based resin or the like is preferred from the viewpoint of improving polarizer durability under high humidity. This is because the adhesive allows prevention of generation of "knick" which is a defect of local unevenness occurring at the interface between the poplarize and the polarizing plate protective film, thereby preventing a flow of moisture of an environmental humidity into the polarizer when a durability test of the polarizing plate is carried out under high humidity.

The metal compound colloid may be present, for example, in a form that metal compound fine particles are dispersed in a dispersion medium, or are durably stabilized by a static stabilization due to a mutual repulsion of similarly charged fine particles. The average size of the fine particles which form the metal compound is not particularly limited. However, the average size is preferably in the range of 1 to 100 nm, more preferably in the range of 1 to 50 nm, and particularly preferably in the range of 2 to 40 nm. This is because, while ensuring adhesiveness by uniformly dispersing fine particles in the adhesive layer, generation of the knick can be more preferably prevented whereby polarizer durability can be improved.

As for the metal compound, any of appropriate compounds can be adopted. Examples of the metal compound include a metal oxide such as alumina, silica, zirconia, titania or the like, a metal salt such as aluminum silicate, calcium carbonate, magnesium silicate, zinc carbonate, barium carbonate, calcium phosphate or the like, and a mineral such as cerite, talc, cray, kaolin or the like. Among them, alumina is preferred.

In the case of blending a metal compound (preferably metal compound colloid), the blend amount is preferably 40% or less by mass, and more preferably from 1 to 30% by mass, with respect to a resin (adhesive) which constitutes the adhesive layer.

(Other Additives)

In the adhesive layer in the present invention, other compounds may be blended in addition to the additive without departing from the spirit of the present invention.

Examples of the other compound include a crosslinking agent such as boric acid for improvement of adhesion between an adhesive layer and a film layer or a polarizer layer. With regard to boric acid, adhesion is known to be improved by incorporating boric acid into an adhesive layer, because boric acid binds to a hydroxyl group of the polymer to form a crosslinking structure.

The polymer of the present invention has an effect of promoting a linkage between boric acid and a hydroxyl group of the polymer. In the case of the polarizing plate protective film which has a lot of hydroxyl groups produced by a saponification treatment of the surface thereof, such as a cellulose acylate polarizing plate protective film, addition of the polymer of the present invention to the adhesive layer allows promotion of the boric acid cross-linkage between the adhesive layer and the polarizer layer, and between the adhesive layer and the polarizing plate protective film whereby adhesion can be improved to a higher level.

It is noted that even a resin film which does not contain a hydroxyl group on a film surface, including a polyester resin such as polyethyleneterephthalate or the like; and a cycloolefin resin, can be modified to a film having a hydroxyl group on a film surface by a saponification treatment in the same manner as described above whereby the same effect can be achieved.

The above-described crosslinking agent and the polymer of the present invention are preferably combined in particular with polyvinyl alcohol or a cellulose acylate resin, each of which is a polymer having a lot of hydroxyl groups.

In the case of blending boric acid, the blend amount thereof is preferably from 1 to 1000% by mass, and more preferably from 10 to 100% by mass, with respect to the polymer of the present invention.

Examples of the other additives include a chain transfer agent, a sensitizing agent, a takifier, a thermoplastic resin, a filler, a flow adjuster, a plasticizer, an antifoamer and the like. In the case of blending the other additives, the blend amount thereof is preferably 40% by mass or less, and more preferably from 0.1 to 30% by mass, with respect to the resin (adhesive) which constitutes the adhesive layer.

The matters relating to resins materials used in these adhesive layers, and their handling can be found in descriptions of paragraphs [0069] to [0138] of JP-A-2012-014148, paragraphs, [0013] to [0020] of JP-A-2009-244800, paragraphs. [0039] to [0086] of JP-A-2010-230806, paragraphs, [0114] to [0119] of JP-A-2009-139658, and the like.

The thickness of the adhesive layer may be appropriately set in accordance with an intended use, adhesion force and the like. Specifically, in the case of using a pressure sensitive adhesive in the adhesive layer, the thickness of the adhesive layer is preferably from 0.1 to 50 μm, more preferably from 0.5 to 20 μm, still more preferably from 1 to 15 μm, and particularly preferably from 5 to 10 μm.

In the case of using an adhesive in the adhesive layer, the thickness of the adhesive layer is preferably from 10 to 500 nm, more preferably from 10 to 400 nm, and still more preferably from 20 to 350 nm.

(B) Ultraviolet Cure Adhesive

As the adhesive layer in the polarizing plate of the present invention, an ultraviolet cure adhesive layer may be also preferably used. Use of the ultraviolet cure adhesive allows adhesion between a polarizing plate protective film and a polarizer with high adhesion strength. In the present specification, the ultraviolet cure adhesive layer means an ultraviolet cure adhesive layer in which an ultraviolet cure adhesive is cured ultraviolet rays.

(Composition of the Ultraviolet Cure Adhesive)

As the ultraviolet cure adhesive, a radical polymerization adhesive, a cation polymerization adhesive, and the like are exemplified by classification according to the way of cure. On the other hand, an acrylic resin adhesive, an epoxy resin adhesive, and the like are exemplified by classification according to the chemical species of the adhesive component. In the present invention, any of these adhesives may be used and a mixture of two or more kinds of these adhesives may be used. However, from the viewpoints of handleability and adhesion strength to be obtained, a cation polymerization epoxy resin adhesive is preferably used. The epoxy resin means a compound or a polymer which has average 2 or more epoxy groups in the molecule and cures by a polymerization reaction associated with the epoxy groups. According to customary practice in this technical field, even though such compound is a monomer, the monomer is termed an epoxy resin.

As the epoxy resin contained in the ultraviolet cure adhesive, from the viewpoints of weather resistance, refractive index, a cationic polymerizable property, and the like, an epoxy resin containing no aromatic ring in the molecule is preferably used. Examples of the epoxy resin containing no aromatic ring in the molecule include a hydrogenated epoxy resin, an alicyclic epoxy resin, an aliphatic epoxy resin, and the like.

The hydrogenated epoxy resin can be obtained by selectively subjecting an aromatic epoxy resin to a nuclear hydrogenation reaction in the presence of a catalysis under pressure. Examples of the aromatic epoxy resin includes: a bisphenol-based epoxy resin such as diglycidyl ether of bisphenol A, diglycidyl ether of bisphenol F, and diglycidyl ether of bisphenol S; novolac-based epoxy resin such as phenol novolac epoxy resin, cresol novolac epoxy resin, and hydroxybenzaldehydephenol novolac epoxy resin; a multi-functional epoxy resin such as glycidyl ether of tetrahydroxyphenyl methane, glycidyl ether of tetrahydroxybenzophenone, and epoxidized polyvinyl phenol. Among these hydrogenated epoxy resins, hydrogenated diglycidyl ether of bisphenol A is preferably used.

As the aliphatic epoxy resin, a polyglycidyl ether of an aliphatic polyol or its alkyleneoxide adduct can be exemplified. More specifically, examples thereof include: diglycidyl ether of 1,4-butane diol; diglycidyl ether of 1,6-hexane diol; triglycidyl ether of glycerin; triglycidyl ether of trimethylol propane; diglycidyl ether of polyethylene glycol; diglycidyl ether of propylene glycol; and polyglycidyl ether of polyether polyol which is obtained by adding one kind or 2 or more kinds of alkyleneoxides (ethylene oxide or propylene oxide or the like) to an aliphatic polyol such as ethylene glycol, polypropylene glycol, or glycerin.

As an epoxy resin, a hydrogenated epoxy resin is preferable.

In the present invention, as for the epoxy resin, only one kind thereof may be used alone, or alternatively 2 or more kinds thereof may be used in combination.

The epoxy equivalent of the epoxy resin in the present invention is ordinarily in the range of 30 to 3,000 g/equivalent, and preferably 50 to 1,500 g/equivalent. If the epoxy equivalent exceeds 30 g/equivalent, flexibility of the adhesive layer after curing is improved, so that adhesion strength is improved. On the other hand, if the epoxy equivalent is 3,000 g/equivalent or less, compatibility with other components contained in the adhesive is improved.

In the present invention, as described above, cationic polymerization is preferably used as the curing reaction of the epoxy resin. It is preferred for this purpose that the ultraviolet cure adhesive contains a photo-cationic polymerization initiator. The photo-cationic polymerization initiator generates cationic species or a lewis acid by exposure to ultraviolet rays, thereby initiating polymerization reaction of the epoxy group. Any of the photo-cationic polymerization initiators may be used. However, the initiator provided with a potential is preferred from the viewpoint of workability.

The method of curing an adhesive by using a photo-cationic polymerization initiator and exposing it to ultraviolet rays has an advantage in that curing becomes possible at an ordinary temperature, so that necessity to consider heat resistance of the polarizer and strain due to expansion is lowered, and a polarizing plate protective film and a polarizer can be preferably adhered. Further, the photo-cationic polymerization initiator acts like a catalyst by light and therefore, even though this initiator is mixed into an epoxy resin, the adhesive is excellent in storage stability and workability.

The photo-cationic polymerization initiator is not particularly limited, but examples thereof include: an onium salt such as an aromatic diazonium salt, an aromatic iodonium salt, an aromatic sulfonium salt and the like; and an iron-arene complex and the like.

As the photo-cationic polymerization initiator, each initiator may be used alone, or alternatively 2 or more kinds thereof may be used in mix. Among them, since the aromatic sulfonium salt in particular has an ultraviolet absorption property even in the wavelength region of 300 nm or more, the aromatic sulfonium salt provides an excellent curing property and allows provision of a cured material having a good mechanical strength and adhesion strength, so that the aromatic sulfonium salt is preferably used.

The blend amount of the photo-cationic polymerization initiator is ordinarily from 0.5 to 100 parts by mass, and preferably from 1 to 50 parts by mass, with respect to 100 parts by mass of the epoxy resin. By controlling the blend amount of the photo-cationic polymerization initiator to this range, the epoxy resin is sufficiently cured and a mechanical strength and adhesion strength are maintained. Further, if the blend amount of the photo-cationic polymerization initiator is 100 parts by mass or less with respect to 100 parts by mass of the epoxy resin, ionic materials in the cured material are hard to increase, so that a hygroscopic property of die cured material does not become too high, and consequently the durable performance of the polarizing plate is hard to decrease.

In the case of using the photo-cationic polymerization initiator, further the ultraviolet cure adhesive may contain a photosensitizer, if needed. Use of the photosensitizer allows increase in reactivity of the cation polymerization, so that a mechanical strength and adhesion strength of the cured material can be improved. Examples of the photosensitizer material include a carbonyl compound, an organic sulfur compound, a persulfide, a redox compound, azo and diazo compounds, a halogen compound, a photo-reducible dye, and the like. As the photosensitizer, each photosensitizer may be used alone, or alternatively 2 or more kinds thereof may be used in mix. The photosensitizer is preferably contained in the range of 0.1 to 20 parts by mass with respect to 100 parts by mass of the ultraviolet cure adhesive.

Further, the ultraviolet cure adhesive may contain a compound which promotes cation polymerization, such as oxetanes and polyols.

The ultraviolet cure adhesive may contain other additives such as an ion trapping agent, an antioxidant, a chain transfer agent, a sensitizer, a tackifier, a thermoplastic resin, a filler, a flow adjuster, a plasticizer, an antifoamer and the like, as long as the efficacy of the present invention is undermined by them. Examples of the ion trapping agent include powdered bismuth-based, antimony-based, magnesium-based; aluminum-based, calcium-based, or titanium-based inorganic compounds or their mixture. Examples of the antioxidant include a hindered phenol-based antioxidant and the like.

In the case of using the polymer of the present invention in the adhesive layer, if the resin of the polarizing plate protective film is cellulose acylate and a water-soluble adhesive (a polyvinyl alcohol-based resin in particular) is used, the polymer of the present invention is preferably a water-soluble compound.

This is because the polymer of the present invention is easy to diffuse into a polarizer (layer), so that a beneficial effect can be obtained in the present invention.

On the other hand, in the case where the resin of the polarizing plate protective film is a synthetic resin, in which a natural product is not used as a material, such as an acrylic resin and a cycloolefin-based resin, and an ultraviolet cure adhesive is used, as the polymer of the present invention, a semi water-soluble compound is preferred.

It is noted that the water-soluble compound preferably has such solubility in water that the compound is dissolved in a proportion of 0.1 g or more with respect to 100 of water at 25° C. The semi water-soluble compound preferably has such solubility in water that the compound is dissolved in a proportion of 0.01 g or more with respect to 100 ml of water at 25° C.

(Method of Laminating Polarizer and Adhesive Layer)

The method of laminating a polarizer and an adhesive layer includes a step of laminating the polarizer and the adhesive layer.

The addition time of the polymer of the present invention is not particularly limited, as long as it has been added at the time of completion of the product.

The method of laminating an adhesive layer on a polarizer is not particularly limited, but lamination by coating may be preferably used from the viewpoint of control and efficiency of the production. As a coating method, any of appropriate methods may be adopted. Examples of the coating method include spin coat, roll coat, roll coat, dip coat, bar coat, and the like.

Here, examples of the method of forming an adhesive layer using the polarizing plate composition of the present invention include a method of additionally using the polymer of the present invention in the composition of the adhesive and forming an adhesive layer in accordance with a method of forming an ordinary adhesive layer.

<<Polarizing Plate>>

The polarizing plate of the present invention includes at least a polarizer and the polarizing plate protective film. The polarizing plate of the present invention preferably includes a polarizer and the polarizing plate protective film of the present invention, in particular, cellulose acylate film provided on one side or both sides of the polarizer. Further, in the present invention, the polarizing plate is formed by incorporating therein the polarizing plate composition of the present invention and the polymer of the present invention is contained in or added to any of the layers of at least the polarizing plate protective film, the polarizer and the adhesive layer.

The polarizing plate protective film of the present invention and the polarizer are preferably stuck together such that a transmission axis of the polarizer and a slow axis of the polarizing plate protective film of the present invention are substantially bisected at right angles, or are parallel or crossed at 45°. It is preferable that a transmission axis of the polarizer and a slow axis of the polarizing plate protective film of the present invention in the liquid crystal display of the present invention are stuck together so as to be substantially bisected at a right angle each other. Herein, the expression "substantially bisected at right angle" means that the direction of principal refractive index nx of the polarizing plate protective film of die present invention and the direction of the transmission axis of the polarizer are crossed at the angle of 90°±10°, and they are crossed preferably at the angle of 90°±5° and more preferably at the angle of 90°±1°. Setting the angle to the above range enables further reduction in light leakage under the condition of polarizing plate crossed-Nicols. The measurement of the slow axis can be performed by various known methods and can be performed, for example, using a birefringence meter (KOBRA DH, manufactured by Oji Scientific Instruments).

The aspect of the polarizing plate of the present invention includes a film piece that is cut to a size capable of being mounted as it is in a liquid crystal display, as well as a film that is manufactured in a long shape by continuous production and wound in a roll shape (for example, an aspect having the roll length of 2500 m or longer and an aspect having the roll length of 3900 in or longer). When it is intended for the large-screen liquid crystal display, the width of the polarizing plate is preferably set to 1470 mm or longer. The specific configuration of the polarizing plate of the present invention is not particularly limited, and known configuration may be used. For example, the configuration shown in FIG. 6 of JP-A-2008-262161 may be used.

<<Display>>

The present invention is used preferably for application to a display using a polarizer.

Examples of such application to a display include an antireflection usage of a liquid crystal display or an electroluminescent display.

When described by taking the liquid crystal display as an example, the liquid crystal display of the present invention has at least the liquid crystal cell and the polarizing plate of the present invention. In the case where the liquid crystal display of the present invention has a first polarizing plate and a second polarizing plate described below as the polarizing plate, an IPS, OCB or VA modal liquid crystal display, in which at least either one of the first and second polarizing plates is the polarizing plat of the present invention, is preferred.

The liquid crystal display of the present invention preferably has a liquid crystal cell and a polarizing plate which is layered on both sides of the liquid crystal cell and equipped with a polarizing plate protective film on the surface of the side opposite to the liquid crystal cell side. In other words, it is preferable that the liquid crystal display of the present invention has the first polarizing plate, the liquid crystal cell, and the second polarizing plate and is equipped with the polarizing plate protective film of the present invention on the surface opposite to the polarizing plate surface sandwiched between each of the polarizing plates and the liquid crystal cell. The liquid crystal display having such a configuration is excellent in the suppression of display unevenness and exerts high display performance.

In addition, the liquid crystal display of the present invention preferably has a polarizing plate protective film, particularly a cellulose acylate film in which the polarizing plate disposed on the visual recognition side has a hard coat layer on the surface of the polarizing plate protective film on the visual recognition side. The liquid crystal display having such a configuration exerts excellent excoriation resistance and light resistance in addition to high display performance excellent in the suppression of display unevenness.

Figure 2:
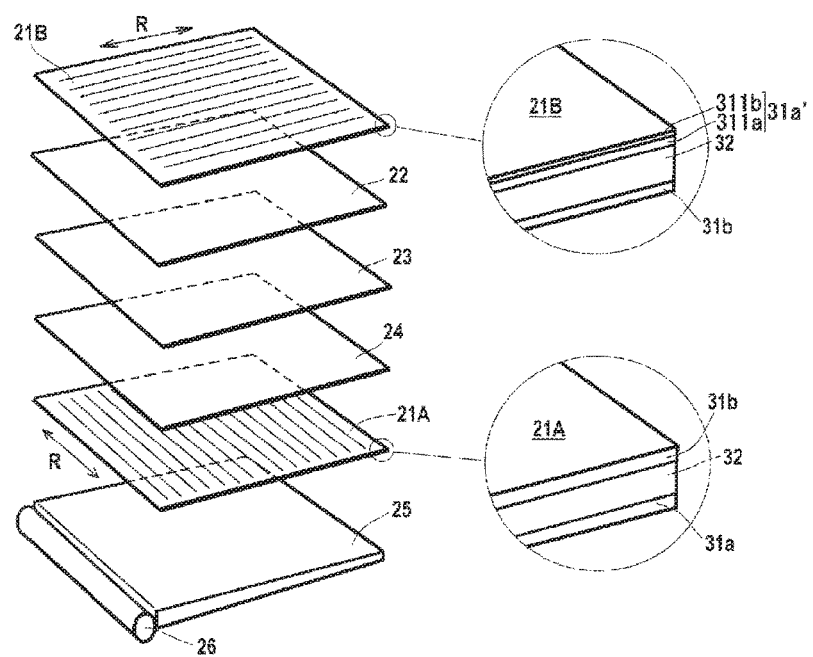
FIG. 2 is an example diagrammatically showing another internal structure of the liquid crystal display of the present invention.

As the liquid crystal display of the present invention, an internal configuration of a typical liquid crystal display is shown in FIG. 1 and FIG. 2. In FIG. 1, a liquid crystal display having polarizing plates 21A and 21B in which the polarizing plate protective films 31a and 31b of the present invention composed of a cellulose acylate film are disposed on both surfaces of a polarizer 32 is illustrated. In addition, in FIG. 2, a liquid crystal display equipped with a polarizing plate 21B disposed on the visual recognition side in which a polarizing plate protective film 31a' has a hard coat layer 311b on the surface on the visual recognition side of the polarizer 32 via a cellulose acylate film 311a is illustrated.

Meanwhile, the configuration of an example of the liquid crystal display of the present invention is illustrated in FIG. 1 and FIG. 2, but the specific configuration of the liquid crystal display of the present invention is not particularly limited, and a known configuration can be adopted. Further, the configuration shown in FIG. 2 of JP-A-2008-262161 may be preferably used.

EXAMPLES

The present invention will be described in more detail based on the following examples, but the invention is not intended to be limited thereto.

In the following Synthetic Examples and Working Examples, the mass-average molecular weight was measured by the method described below.

The polystyrene-based mass-average molecular weight (Mw) was measured using a gel permeation chromatography (GPC) (trade name: HTC-8020, manufactured by Tosoh Corporation/four columns: trade names: TSKguardcolumn SuperHZ-H, TSKgel SuperHZM-H, TSKgel SuperHZ4000, and TSKgel SuperHZ2000, manufactured by Tosoh Corporation), and using a tetrahydrofuran (THF) solvent.

[Synthesis of the Polymer of the Present Invention]

The polymer of the present invention was synthesized in the following manner.

Synthetic examples of representative polymers are described below.

(Synthesis of the Exemplified Polymer P-101)

Exemplified polymer P-101 was synthesized in accordance with the following synthetic scheme.

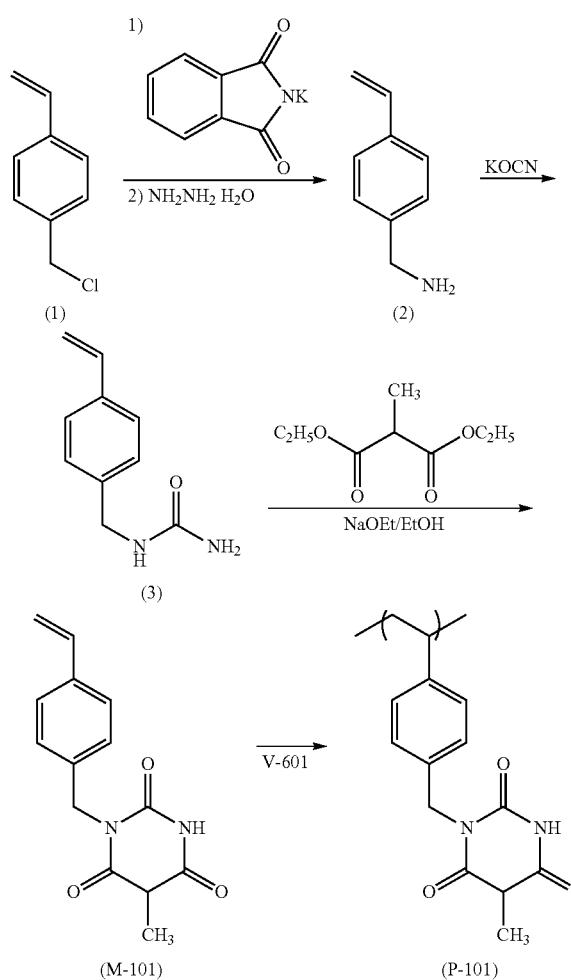

Using p-chloromethylstyrene (1) as a starting material, p-aminomethylstyrene (2) was synthesized in accordance with a method described in Tetrahedron, 60, 11407-11414 (2004).

7.5 g (57 mmol) of p-aminomethylstyrene (2), 12.0 g (100 mmol) of potassium cyanate and 150 mL of methanol were placed in a flask, and then 7.8 mL of acetic acid was added thereto, and the mixture was heated at 50° C. while stirring for 5 hours. Then, after cooling it down to 0° C., 200 mL of water was added thereto, and the precipitated solid was obtained by a suction filtration and then a cooled aqueous methanol solution (methanol/water=1/3) was poured over the precipitated solid to wash it. By drying the crystals, 8.0 g of intermediate urea body (3) was obtained. The yield was 80%.

7.8 g (44 mmol) of the intermediate urea body (3), 8.5 g (49 mmol) of diethyl methylmalonate, 30 g (87 mmol) of a 20% NaOC₂H₅/ethanol solution, and 150 mL of ethanol were placed in a flask, and the mixture was refluxed by heat for 3 hours under nitrogen stream. Then, after distilling away about 100 mL of ethanol under reduced pressure, the mixture was cooled down to 0° C. and 200 mL of water was added thereto. Further, a 1N hydrochloric acid was added to make it acidic, thereby precipitating a product. The precipitated solid was obtained by a suction filtration and then water was poured over the precipitated solid to wash it. By drying the crystals, 9.5 g of monomer (M-101) was obtained. The yield was 82%.

1 g of monomer (M-101), 0.357 g of a radical initiator V-601 (manufactured by Wako pure chemical industries, Ltd.), and 5 ml of methylethyl ketone (MEK) were placed in a 50 mL eggplant flask, and then nitrogen substitution was carried out sufficiently. The mixture was heated by reflux at 80° C. for 4 hours under a nitrogen atmosphere, to polymerizing the monomer (M-101). After cooling the reaction mixture down to room temperature, the reaction mixture was gradually added to 100 mL of methanol to carry out a reprecipitation technique. The precipitated solid was collected by a suction filtration and dried. 0.8 g of the exemplified polymer P-101 was obtained. The yield was 80%. The mass-average molecular weight (Mw) was 3,000.

(Synthesis of the Exemplified Polymer P-215)

Exemplified polymer P-215 was synthesized in accordance with the following synthetic scheme.

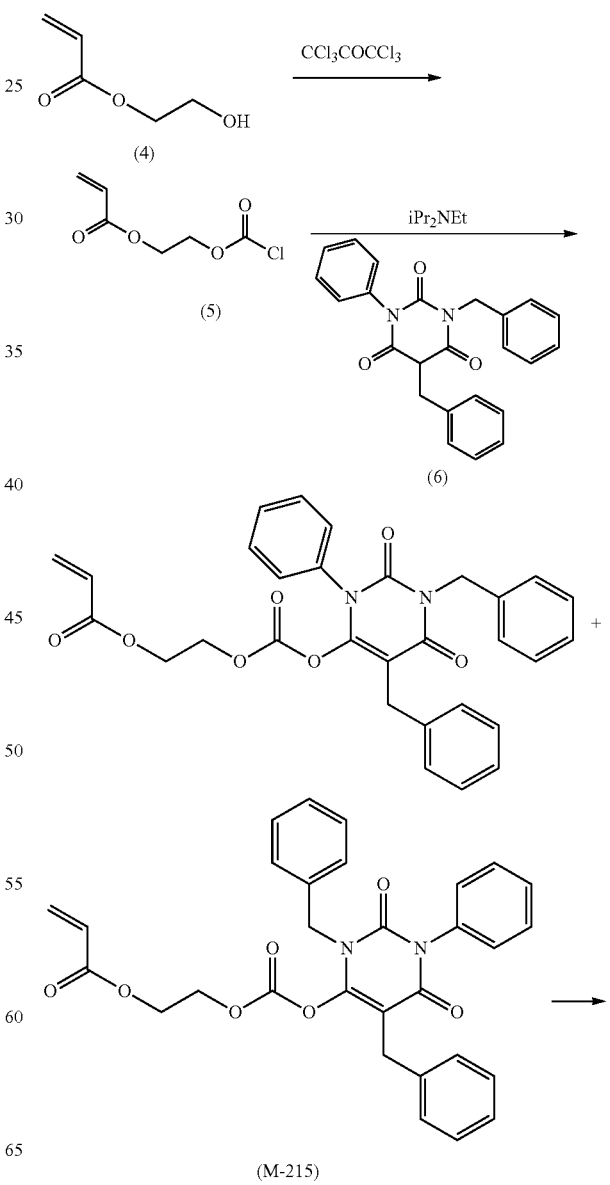

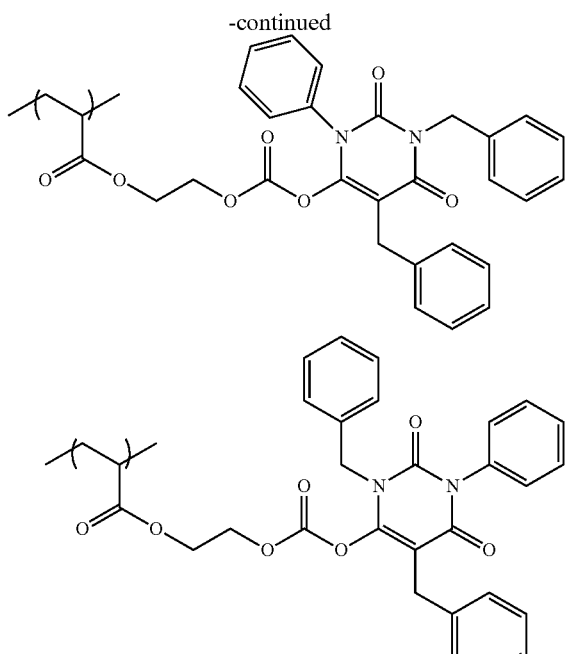

(P-215)

The chlorocarbonate ester body (5) was synthesized from hydroxyethyl acrylate (4) in accordance with an ordinary method.

It is noted that compound (6) was synthesize in accordance with a method described in a pamphlet of WO 2014/034709.

6.2 g (18.0 mmol) of compound (6), 3.76 mL (21.6 mmol) of diisopropylethyl amine and 50 mL of THF were placed in a flask and the mixture was cooled down to 5° C., and 4.7 g (19.8 mmol) of the chlorocarbonate ester body (5) was added drop-wise thereto over 10 minutes. After adding drop-wise, the mixture was stirred at 40° C. for 2 hours. After distilling the solvent away and then purifying the residue by a silica gel column chromatography (developing solvent: ethyl acetate/hexane), 4.22 of the monomer M-215 (a mixture of 2 kinds of compounds) was obtained.

1.2 g of monomer (M-125) (a mixture of 2 kinds of compounds), 15 mg of a radical initiator V-601 (manufactured by Wako pure chemical industries, Ltd.), and 11 mL of MEK were placed in a 50 mL eggplant flask, and then nitrogen substitution was carried out sufficiently. The mixture was heated by reflux at 80° C. for 4 hours under a nitrogen atmosphere, to polymerizing the monomer (M-125). After cooling the reaction mixture down to room temperature, the reaction mixture was gradually added to 50 mL of methanol to carry out a reprecipitation technique. The precipitated solid was collected by a suction filtration dried. 0.6 g of the exemplified polymer P-125 was obtained. The yield was 50%. The mass-average molecular weight (Mw) was 12,000.

Example 1

As described below, a polarizing plate was prepared by using a polarizing plate protective film prepared by coating a polarizing plate composition of the present invention containing the polymer of the present invention on a cellulose acylate film to evaluate polarizer durability.

1. Preparation of Polarizing Plate No. H101
1) Preparation of Cellulose Acylate

Sulfuric acid (7.8 parts by mass with respect to 100 parts by mass of cellulose) was added as a catalyst, and an acetic acid was added, and the cellulose was acetylated by the reaction at 40° C. Further, after acetylation, ripening (aging) was conducted at 40° C., Further, a low molecular component part of the cellulose acetate was removed by washing the acetate with acetone. The total acetyl substitution degree (B) of the obtained cellulose acylate was 2.87 and the polymerization degree thereof was 370.

2) Preparation of Polarizing Plate Protective Film No. 101
(Preparation and Casting of Cellulose Acetate Solution)

The cellulose acylate prepared as described above and the following solvent were poured into a mixing tank in the following composition ratio, and the cellulose acylate was dissolved while stirring to prepare the cellulose acetate solution 101.

| Composition of cellulose acetate solution 101 | |
|---|---|
| Cellulose acetate with the total acetyl substitution degree (B) 2.87 and the polymerization degree 370 | 100.0 parts by mass |
| Methylene chloride (the first solvent) | 402.0 parts by mass |
| Methanol (the second solvent) | 60.0 parts by mass |

After casting the cellulose acetate solution 101 using a band casting machine, followed by drying at 100° C. so as to have a residual solvent content of 40%, the film was peeled off. The film thus peeled-off was further dried for 20 minutes at an ambient temperature of 140° C. The film thickness of the thus-obtained cellulose acylate films was 40 μm.

(Preparation and Coating of the Polymer Solution 1)

The following polymer and cellulose acetate were added to the solvent (methyl acetate:methylethyl ketone:propyleneglycol-1-monomethylether-2-acetate, mass ratio of 54:45:1) so as to be the following concentration. In order to dissolve the cellulose acetate, the mixture was cooled to −70° C. to prepare the polymer solution (solution of the polarizing plate composition of the present invention) 1.

| Concentration of the component in the polymer solution 1 | |
|---|---|
| Cellulose acetate (the acetyl substitution degree: 2.81) | 2.5 mass % |
| Concentration of the recurring unit of the polymer P-201 | 0.3 mmol/L |

The above polymer solution 1 was coated on one surface of the above cellulose acylate film using a wire bar coater #8 and was dried at 60° C. for 120 seconds to prepare the polarizing plate protective film (cellulose acylate film) No. 101 of the present invention. The film thickness was 42 μm.

3) Saponification Treatment of Polarizing Plate Protective Film No. 101

The polarizing plate protective film No. 101 was soaked in a 2.3 mol/L sodium hydroxide aqueous solution, at 55° C. for 3 minutes. The film was then washed in a water-washing bath at room temperature and neutralized with 0.05 mol/L sulfuric acid at 30° C., The film was, again, washed in a water-washing bath at room temperature and further dried by warm air at 100° C. Thus, the saponification treatment of the surface of the polarizing plate protective film No. 101 was carried out.

4) Preparation of Polarizing Plate No. 101

The saponification-treated polarizing plate protective film No. 101 and a polyvinyl alcohol-based polarizer were stuck together with an adhesive. On this occasion, the polarizer was stuck to the surface of the polarizing plate protective film on which the polymer solution 1 was coated. The similarly saponification-treated FUJITAC (registered trademark) TD80 (manufactured by FUJIFILM Corporation) was stuck to the opposite surface of the polarizer (surface which the polarizing plate protective film No. 101 is not stuck) to prepare the polarizing plate of the present invention No. H101. On this occasion, arrangement was made such that a transmission axis of the polarizer, and the transverse direction of the thus-prepared polarizing plate protective film or cellulose acylate film would become parallel.

2. Preparation of Polarizing Plates No. H102 to H105, Hc11 and Hc12

Polarizing plate protective films Nos. 102 to 105, c11 and c12 were prepared in the same manner as polarizing plate protective film No. 101, except that, in the preparation of the polarizing plate No. H101, each polymer solution prepared by replacing polymer P-201 with exemplified polymers or the like shown in the following Table 1 was used. Further, polarizing plates Nos. H102 to H105 of the present invention and polarizing plates for comparison Hc11 and Hc12 were prepared in the same manner as the polarizing plate No. H101, except that, in the preparation of the polarizing plate No. H101, the polarizing plate protective films Nos. 102 to 105, c11 and c12 were used in place of the polarizing plate protective film No. 101.

The used polymers and additive A are shown below.

(P-201)

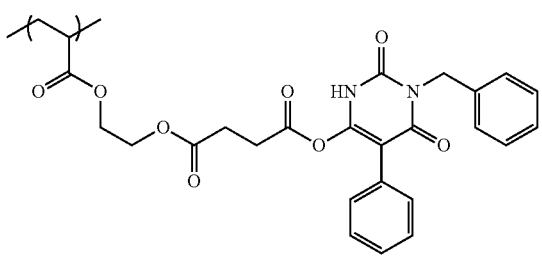

(P-204)

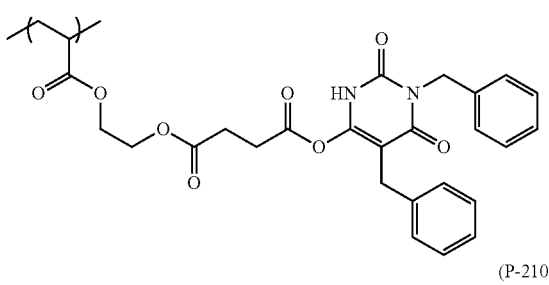

(P-210)

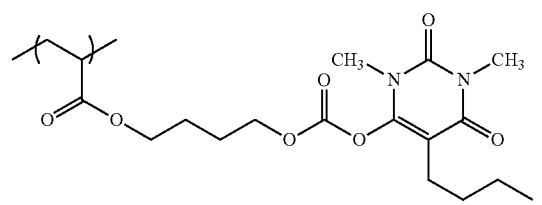

-continued (P-214)

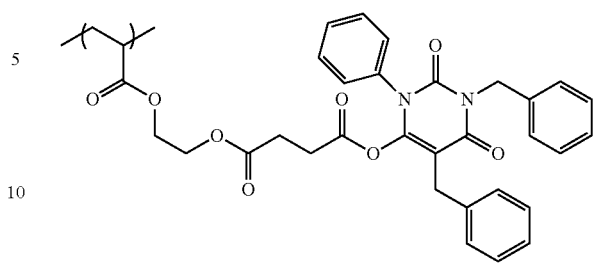

(P-215)

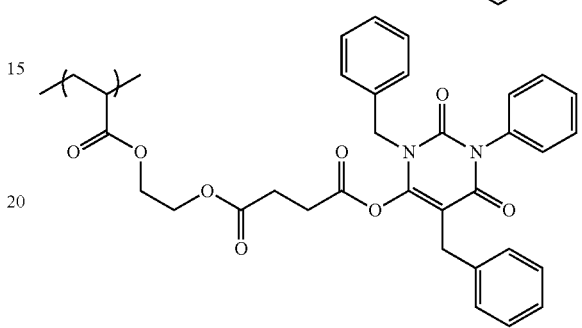

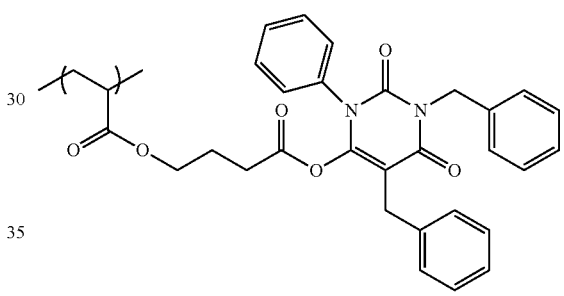

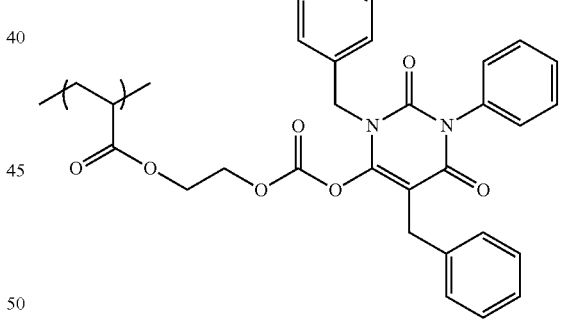

Additive A

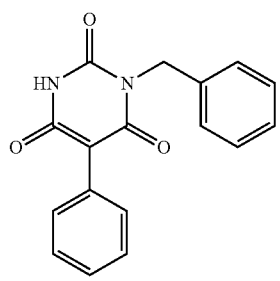

3. Evaluation of Durability

The durability test of the polarizing plate was carried out by preparing samples in which each of the prepared polarizing plates and a glass were stuck together with an adhesive, and by measuring the samples in the following manner.

In each of the prepared polarizing plate, two samples about 5 cm×5 cm) were prepared, in which the prepared polarizing plate was stuck on the glass such that the polarizing plate protective film would be on the air interface side.

The single-plate perpendicular transmittance was measured, by setting the polarizing plate protective film side of the film of this sample to direct toward a light source. The two samples were measured, and the average of the thus-measured values was used as a perpendicular transmittance of the polarizing plate. The perpendicular transmittance of the polarizing plate was measured in the range of from 380 nm to 780 nm using the automatic polarizing film measuring device VAP-7070, manufactured by JASCO Corporation. The value measured at 410 nm was adopted. With regard to the perpendicular transmittance, a measured value at the wavelength of 410 nm at which the degree of degradation becomes more evident than the other wavelength was adopted.

Further, after storing each sample for 336 hours under environment of 60° C. and relative humidity of 95% (after the durability test), the perpendicular transmittance at the wavelength of 410 nm was measured in the same manner as before the storage over time (before the durability test). An amount of change of the perpendicular transmittance before and after the durability test was calculated. This amount was evaluated as a polarizer durability of the polarizing plate in accordance with the following criteria.

It is noted that measurement of the perpendicular transmittance before and after the durability test was carried out respectively under environment of 25° C. and relative humidity of 60%.

Here, the amount of change of the perpendicular transmittance was calculated by the following calculation formula.

The change of the perpendicular transmittance (%)= [the perpendicular transmittance (%) after the durability test−the perpendicular transmittance before the durability test]

A+: The amount of change of the perpendicular transmittance before and after the durability test was less than 0.2%.

A: The amount of change of the perpendicular transmittance before and after durability test was 0.2% or more and less than 0.4%.

B: The amount of change of the perpendicular transmittance before and after the durability test was 0.4% or more and less than 1.0%.

C: The amount of change of the perpendicular transmittance before and after the durability test was 1.0% or more.

In the durability test, the degree of rank A or greater is desirable in practice.

The obtained results are shown in Table 1.

TABLE 1

| Polarizing plate No. | Polarizing plate protective film No. | Polymer or compound for comparison Kind | Mw of compound | Polarizer durability amount of change of perpendicular transmittance (%) 60° C., 95%, 336 hours | Remarks |
|---|---|---|---|---|---|
| H101 | 101 | P-201 | 15,000 | A+ | This invention |
| H102 | 102 | P-204 | 6,000 | A+ | This invention |
| H103 | 103 | P-210 | 8,000 | A+ | This invention |
| H104 | 104 | P-214 | 12,000 | A+ | This invention |
| H105 | 105 | P-215 | 15,000 | A+ | This invention |
| Hc11 | c11 | Additive A | 294 | B | Comparative example |
| Hc12 | c12 | None | — | C | Comparative example |

From Table 1, it has been found that if the polarizing plate protective film is prepared using the polarizing plate composition of the present invention containing the polymer of the present invention, durability of the polarizing plate (polarizer durability), especially durability in terms of a change over time (at hygrothermal condition) is improved, and the foregoing effect is not obtained by the conventional compounds.

Example 2

As described below, a polarizing plate was prepared by using a polarizing plate protective film prepared as single layer by the polarizing plate composition of lure present invention containing the polymer of the present invention to evaluate polarizer durability of the polarizer.

1. Preparation of Polarizing Plate No. H201

1) Preparation of Cellulose Acylate

A cellulose acylate having the total acetyl substitution degree (B) 2.87 and the polymerization degree 370, was prepared in the same manner as Example 1.

2) Preparation of Polarizing Plate Protective Film No. 201

The following components were poured into a mixing tank in the following composition ratio, and the components were dissolved while stirring to prepare the cellulose acetate solution (solution of the polarizing plate composition of the present invention) 201.

| Composition of cellulose acetate solution 201 | |
|---|---|
| Cellulose acetate with the total acetyl substitution degree (B) 2.87 and the polymerization degree 370 | 100.0 parts by mass |
| Additive E-1 | 8.0 parts by mass |
| Ultraviolet absorber (UV-1) | 3.0 parts by mass |
| Exemplified polymer P-204 | 4.0 parts by mass |
| Methylene chloride (the first solvent) | 402.0 parts by mass |
| Methanol (the second solvent) | 60.0 parts by mass |

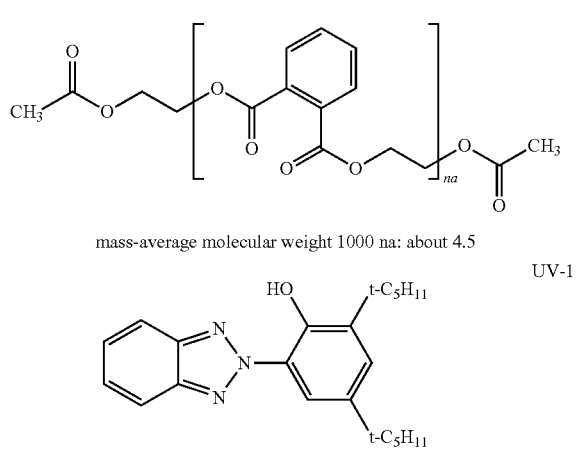

Additive E-1 mass-average molecular weight 1000 na: about 4.5

UV-1

After casting the cellulose acetate solution 201 using a band casting machine, followed by drying at 100° C. so as to have a residual solvent content of 40%, the film was peeled off. The film thus peeled-off was farther dried for 20 minutes at an ambient temperature of 140° C. Thus, the polarizing plate protective film No. 201 of the present invention formed of the polarizing plate composition of the present invention was prepared. The film thickness of the thus-obtained polarizing plate protective film (cellulose acylate No. 201 was 25 μm.

3) Preparation of Polarizing Plate No. H201

(a) Saponification Treatment of Polarizing Plate Protective Film

The polarizing plate protective film No. 201 was soaked in a 2.3 mol/L sodium hydroxide aqueous solution, at 55° C. for 3 minutes. The film was then washed in a water-washing bath at room temperature and neutralized with 0.05 mol/L, sulfuric acid at 30° C. The film was, again, washed in a water-washing bath at room temperature and further dried by warm air at 100° C.

(b) Preparation of Polarizing Plate

A polarizer was prepared by adsorbing iodine on a stretched polyvinyl alcohol film.

The saponification-treated polarizing plate protective film No. 201 was stocked to one side of the polarizer using a polyvinyl alcohol-based adhesive.

A commercially-available cellulose triacetate film (FUJI-TAC TD80UF, manufactured by Fujifilm Corporation was subjected to the same saponification treatment as described above. Together with a polyvinyl alcohol-based adhesive, the commercially-available cellulose triacetate film after the saponification treatment was stuck to the other side of the polarizer which opposite to the side to which the polarizing plate protective film No. 201 having been subjected to a saponification treatment has been stuck. On this occasion, arrangement was made such that a transmission axis of the polarizer, and the transverse direction of the thus-prepared polarizing plate protective film No. 201 or the commercially-available cellulose acylate film would become parallel.

Thus, the polarizing plate No. H201 of the present invention was produced.

2. Preparation of Polarizing Plates No. H202 to H208, Hc21 and Hc22

Polarizing plate protective films Nos. 202 to 208, Hc21 and Hc22 were prepared in the same manner as the polarizing plate protective film No. 101, except that, in the preparation of the polarizing plate No. H201, polymer P-204 was replaced with exemplified polymers or the like shown in the following Table 2, and further the film thickness was set as shown in Table 2 by using each cellulose acylate solution which was prepared by changing the additive to the following additive. Further, polarizing plates Nos. H202 to H208 of the present invention and polarizing plates for comparison Hc21 and Hc22 were prepared in the same manner as the polarizing plate. No. 11201, except that, in the preparation of the polarizing plate No. H201, the polarizing plate protective films Nos. 202 to 208, Hc21 and Hc22 were used in place of the polarizing plate protective film No. 201.

3. Preparation of Polarizing Plate No. 11209

1) Preparation of the Acrylic Resin Pellet

To a 30 L reaction vessel equipped with an agitator, a temperature sensor, condenser tube, and a nitrogen-introducing tube, 7000 g of methyl methacrylate (MMA) 1000 g of [2'-hydroxy-5'-(methacryloyloxyethyl) phenyl]benzotriazole, 2000 g of methyl 2-(hedroxymethyl) acrylate (MHMA) and 10000 g of toluene were added, and the temperature was raised to 105° C. while introducing nitrogen into the reaction vessel. Under reflux, 10.0 g of tertiary amylperoxyisononanoate (trade name: LUPASOL, manufactured by ARKEMA Yoshitomi Ltd.) was added thereto as an initiator and at the same time, by adding drop-wise a solution formed of 20.0 g of the initiator and 100 g of toluene over 4 hours, solution polymerization was allowed to proceed under reflux (about 105 to 110° C.). The reaction solution was further ripened for 4 hours (about 105 to 110° C.).

To the obtained polymer solution, 10 g of stearyl phosphate/distearyl phosphate mixture (trade name: Phoslex A-18, manufactured by Sakai Chemical Industry Co., Ltd.) was added, and a cyclocondensation reaction was allowed to proceed under reflux (about 90 to 110° C.) for 5 hours. Next, the thus-obtained polymer solution was introduced into a vent-type twin-screw extruder (Φ=29.75 mm, L/D=30) having 1 rear vent and 4 fore vents under the condition of the barrel temperature of 260° C., a rotation speed of 100 rpm, a decompression degree of 13.3 to 400 hPa (from 10 to 300 mmHg), at a processing rate of 2.0 kg/h in terms of the resin amount and subjected to cyclocondensation reaction and devolatilization in the extruder. By extrusion, a transparent lactone ring-containing acrylic resin pellet (Mw=200,000) was obtained.

The lactone cyclization rate of the obtained lactone ring-containing acrylic resin pellet was 97.0%.

The resin pellet (polarizing plate composition of the present invention) No. 209 was prepared by adding 4 parts by mass of exemplified polymer P-214 with respect to 100 parts by mass of the above acrylic resin pellet and by mixing them at 230° C. using a double wheels mixer.

2) Preparation of Polarizing Plate Protective Film No. 209

The obtained resin pellet No. 209 was dried at 800 Pa (6 Torr) and 100° C. for 12 hours, and then this pellet was extruded from a T die at die temperature of 290° C. using a single screw extruder, in this way, the 40 μm-thick polarizing plate protective film (acrylate film) No. 209 of the present invention, which is formed of the polarizing plate composition of the present invention, was prepared.

3) Preparation of Polarizing Plate No. H209

The thus-obtained polarizing plate protective film No. 209 and the polarizer obtained in the preparation of the polarizer plate No. H201 were stuck together with an ultraviolet cure resin. Together with a polyvinyl alcohol-based adhesive, the commercially-available cellulose triacetate film (FUJITAC TD80UF manufactured by FUJIFILM Corporation) after the saponification treatment was stuck to the other side of the polarizer which is opposite to the side to which the polarizing plate protective film No. 209 has been stuck.

On this occasion, arrangement was made such that a transmission axis of the polarizer, and the transverse direction of the thus-prepared polarizing plate protective film No. 209 or the commercially-available cellulose acylate film would become parallel.

Thus, the polarizing plate No. H209 of the present invention was produced.

The used polymers and additive are shown below.

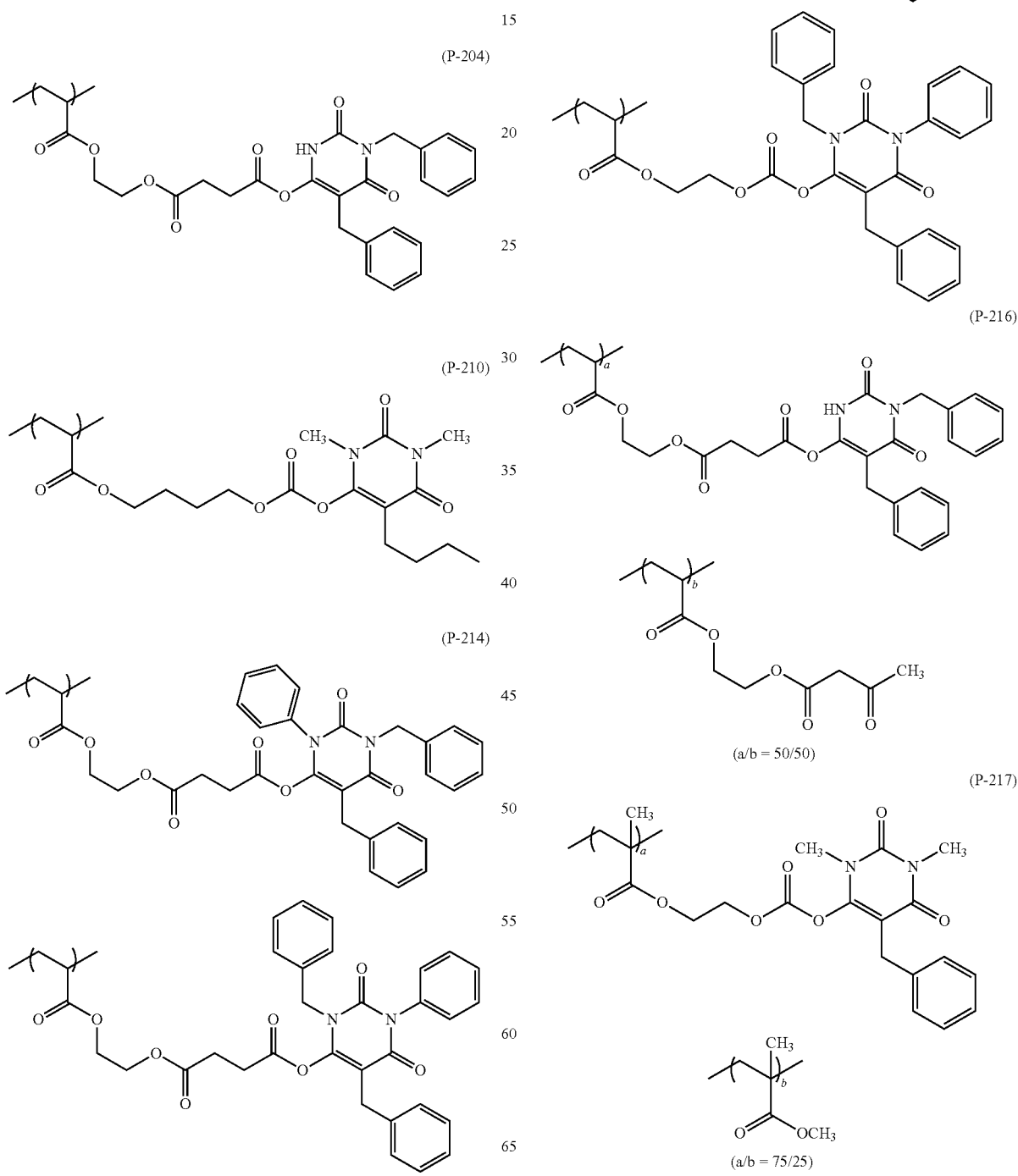

Additive A-3

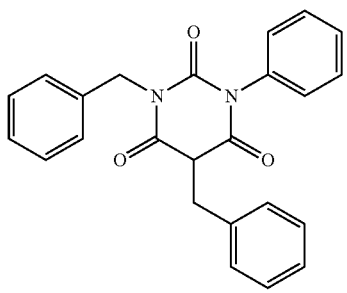

Additive A

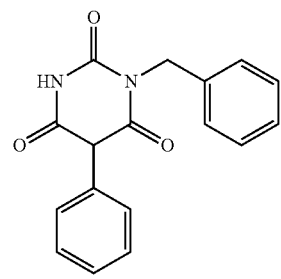

4. Evaluation of Durability

The durability of each of the polarizing plates thus-prepared as evaluated in the following manner.

An amount of change of the perpendicular transmittance before and after the durability test of the polarizer at the wavelength of 410 nm was measured in the same manner as the "evaluation of durability" in Example 1, except that the storage conditions (durability test conditions) was change from "under environment of 60° C., relative humidity of 95% and 336 hours" to "under environment of 60° C., relative humidity of 95% and 500 hours". By this amount of change, the durability of each of the polarizing plates was evaluated in accordance with the following criteria.

60° C., relative humidity of 95% and 336 hours

A+: The amount of change of the perpendicular transmittance before and after the durability test was less than 0.15%, A: The amount of change of the perpendicular transmittance before and after the durability test was 0.15% or more and less than 0.2%.

B: The amount of change of the perpendicular transmittance before and after the durability test was 0.2% or more and less than 0.4%.

C: The amount of change of the perpendicular transmittance before and after the durability test was 0.4% or more.

In the durability test, the degree of rank A or greater is desirable in practice.

5. Optical Film with the Hard Coat Layer

1) Preparation of Optical Film with the Hard Coat Layer

Components described in the following table were mixed, followed by filtration by a polypropylene filter having a pore diameter of 30 μm to prepare coating liquid (solution) for a hard coat layer.

| Composition of hard coat layer solution | |
|---|---|
| Monomer, pentaerythritol triacrylate/pentaerythritol tetraacrylate (mixing mass ratio 3/2)) | 53.5 parts by mass |
| UV (ultraviolet) polymerization initiator, Irgacure ™907 (manufactured by Ciba Specialty Chemicals Co. LTD.,) | 1.5 parts by mass |
| Ethyl acetate | 45 parts by mass |

The above coating liquid for a hard coat layer was coated onto the air-sided surface of each of the above-produced polarizing plate protective films by a microgravure coat at a conveying speed of 30 m/min. After drying at 60° C. for 150 seconds, the coated layer was cured by irradiating an ultraviolet thereon at an luminance of 400 mW/cm$^2$ and an irradiation dose of 150 mJ/cm$^2$ by using an air cooled metal halide lamp (manufactured by Eye Graphics Co., Ltd.) of 160 W/cm under nitrogen purge (an oxygen concentration of 0.5% or less) to form a hard coat layer (thickness 6 μm).

In this way, each of the polarizing plate protective films provided with the hard coat layer was prepared by forming a hard coat layer on the surface of each of the polarizing plate protective films.

2) Evaluation of Lightfast Adhesion

The lightfast adhesion was evaluated as described below.

First, the polarizing protective films having a hard coat layer thus manufactured were irradiated with light for 96 hours under the environment of 60° C. and 50% RH using a super xenon weather meter SX75 manufactured by Suga Test Instruments Co., Ltd.

Subsequently, the each polarizing protective film having a hardcoat layer was humidity-controlled under the condition of 25° C. and 60% RH for 2 hours. On the surface of a side having a hard coat layer, 11 horizontal cuts and 11 vertical cuts were made on a grid at each of 1 mm intervals using a cutter knife, with respect to 1 cm square of the polarizing plate protective film with the hard coat layer, whereby a total 100 square lattices of 1 mm×1 mm was incised. Further, a polyester adhesive tape (No. 31B) manufactured by Nitto Denko Corporation was attached on the surface thereof. After 30 minutes, the tape was rapidly peeled off in a vertical direction, and the number of peeled lattices was counted for evaluation based on three criteria below. The same adhesion evaluation tests were performed three times to obtain an average.

Criteria of Evaluation

A: Peeling was identified on 20 or less of 100 lattices

B: Peeling was identified on 21 to 30 of 100 lattices.

C: Peeling was identified on 31 or more of 100 lattices.

The obtained results are shown in Table 2.

TABLE 2

| Polarizing plate No. | Polarizing plate protective film No. | Film resin | Film thickness (μm) | Polymer Kind | Polymer Mw | Polymer Addition amount a) | Additive Kind | Additive Addition amount a) | Polarizer durability: amount of change of perpendicular transmittance (%) 60° C., 95%, 500 hours | Lightfast adhesion 96 hours | Remarks |
|---|---|---|---|---|---|---|---|---|---|---|---|
| H201 | 201 | Cellulose acylate | 25 | P-204 | 6,000 | 4 | — | — | A | A | Ex |
| H202 | 202 | Cellulose acylate | 25 | P-210 | 8,000 | 4 | — | — | A | A | Ex |
| H203 | 203 | Cellulose acylate | 25 | P-214 | 12,000 | 4 | | | A | A | Ex |
| H204 | 204 | Cellulose acylate | 25 | P-215 | 15,000 | 4 | — | — | A | A | Ex |
| H205 | 205 | Cellulose acylate | 25 | P-216 | 6,000 | 4 | — | — | A | A | Ex |
| H206 | 206 | Cellulose acylate | 40 | P-217 | 12,000 | 4 | — | — | A | A | Ex |
| H207 | 207 | Cellulose acylate | 25 | P-214 | 12,000 | 4 | A-3 | 2.0 | A+ | A | Ex |
| H208 | 208 | Cellulose acylate | 40 | P-214 | 12,000 | 4 | A-3 | 2.0 | A+ | A | Ex |
| H209 | 209 | Acrylic resin | 40 | P-214 | 12,000 | 4 | — | — | A+ | A | Ex |
| Hc21 | c21 | Cellulose acylate | 25 | None | — | — | — | — | C | A | C Ex |
| Hc22 | c22 | Cellulose acylate | 25 | None | — | — | A | 4 | A | C | C Ex |

Note:
a) Addition amount with respect to 100 parts by mass of the film resin
'Ex' means 'Example according to this invention', and 'C Ex' means 'Comparative Example'.

From Table 2, it has been found that by preparing a polarizing plate protective film formed of the polarizing plate composition of the present invention containing the polymer of the present invention, the durability of the polarizing plate, especially the durability in aging variation is improved. Further, it has been found that if a polarizing plate protective film is prepared by using the polarizing plate composition of the present invention containing the polymer of the present invention and the low-molecular additive represented by Formula (A) in combination, the durability of the polarizing plate can be improved to a higher level.

Further, the polarizing plate protective film formed of the polarizing plate composition of the present invention containing the polymer of the present invention is remarkably improved in terms of lightfast adhesion, compared to the conventional compound (additive A and this allows compatibility between the lightfast adhesion and the durability of the polarizing plate.

Example 3

In the following manner, polarizing plates were prepared by using polarizing plate protective films having a three-layered structure in which the composition for any of the layers was changed by using the polarizing plate composition of the present invention, and polarizer durability of the thus-prepared polarizing plates was evaluated.

1. Preparation of Polarizing Plate No. H301
1) Preparation of Polarizing Plate Protective Film No. 301
<Preparation of Dope 301 Liquid for the Support-Sided Surface Layer>
(Preparation of Cellulose Acylate Solution)

The following components were poured into a mixing tank in the following composition ratio, and the components were dissolved while stirring to prepare the cellulose acetate solution 1.

| Composition of cellulose acetate solution 1 | |
|---|---|
| Cellulose acetate with the total acetyl substitution degree (B) 2.87 and the polymerization degree 370 | 100.0 parts by mass |
| Additive E-1 | 8.0 parts by mass |
| Methylene chloride (the first solvent) | 402.0 parts by mass |
| Methanol (the second solvent) | 60.0 parts by mass |

(Preparation of Matting Agent Solution 1)

The following components were poured into a disperser in the following composition ratio, and the components were dissolved while stirring to prepare the matting agent solution 1.

| Composition of matting agent solution 1 | |
|---|---|
| Silica particles having an average particle size of 20 nm (AEROSIL R972, manufactured by Nippon Aerosil Co., Ltd) | 2.0 parts by mass |
| Methylene chloride (the first solvent) | 75.0 parts by mass |
| Methanol (the second solvent) | 12.7 parts by mass |
| Cellulose acylate solution 1 | 10.3 parts by mass |

(Preparation of the Polymer Solution 2)

The following components were poured into a mixing tank in the following composition ratio, and the components were dissolved while stirring and heating to prepare the polymer solution 2.

| Composition of the polymer solution 2 | |
|---|---|
| exemplified polymer P-214 | 20.0 parts by mass |
| Methylene chloride (the first solvent) | 67.2 parts by mass |
| Methanol (the second solvent) | 10.0 parts by mass |
| Cellulose acylate solution 1 | 12.8 parts by mass |

1.3 parts by mass of the matting agent solution 1, and 9.0 parts by mass of the polymer solution 2 were subjected to filtration, respectively, and mixed using an inline mixer, and 89.7 parts by mass of the cellulose acylate solution 1 were further added thereto, and mixed using the inline mixer, thereby for preparing a dope 301 liquid for the support-sided surface layer (the solution of the polarizing plate composition of the present invention).
<Preparation of Dope 302 Liquid for Base Layer>

The cellulose acylate solution 1 was used as the dope 302 liquid for base layer.
<Preparation of Dope 303 Liquid for the Air-Sided Surface Layer>

1.3 parts by mass of the matting agent solution 1, and 89.7 parts by mass of the cellulose acylate solution 1 were mixed using an inline mixer, thereby for preparing a dope 303 liquid for the air-sided surface layer.

(Casting)

In the following order, the above dope 301 liquid for the support-sided surface layer, the above dope 302 liquid for the base layer, and the above dope 303 liquid for the air-sided surface layer were laminated on the support by a casting method. The obtained web was peeled off from the band. The volatile matter remaining in the peeled film was 40% by mass with respect to the solid content of the film. Removing the peeled film from the grip, the polarizing plate protective film (cellulose acylate film) No. 301 of the present invention was prepared by drying it at 135° C. for 20 minutes so that the thickness of the base layer gets to 32 µm and the thickness of each of the support-sided surface layer and the air-sided surface layer gets to 4 µm. The composition and the film thickness of each layer were shown in the following Table 3.

2) Preparation of Polarizing Plate No. 301

(a) Saponification Treatment of Polarizing Plate Protective Film

The thus-prepared polarizing plate protective film No. 301 was immersed into a 2.3 mol/L, aqueous sodium hydroxide solution for 3 minutes at 55° C. Then, the film was washed in a water-washing bath at room temperature, followed by neutralization at 30° C. by using 0.05 mol/L sulfuric acid. The film was, again, washed in the water-washing bath at room temperature, followed by further drying with hot air at 100° C.

(b) Preparation of Polarizing Plate

A polarizer was prepared by adsorbing iodine on a stretched polyvinyl alcohol film.

The saponification-treated polarizing plate protective film No. 301 was stacked one side of the polarizer by the support-sided surface layer (support-sided surface) thereof using a polyvinyl alcohol-based adhesive. A commercially-available cellulose triacetate film (FUJITAC TD80UF, manufactured by Fujifilm Corporation) was subjected to the same saponification treatment as described above. Together with a polyvinyl alcohol-based adhesive, the commercially-available cellulose triacetate film after the saponification treatment was stuck to the other side of the polarizer which is opposite to the side to which the polarizing plate protective film No. 301 having been subjected to a saponification treatment has been stuck.

On this occasion, arrangement was made such that a transmission axis of the polarizer, and the transverse direction of the thus-prepared polarizing plate protective film No. 301 or the commercially-available cellulose acylate film would become parallel.

Thus, the polarizing plate No. H301 of the present invention was produced.

2. Preparation of Polarizing Plates No. H302 to H305 and Hc31

The polarizing plate protective films Nos. 302 to 305 and c31 were prepared in the same manner as the polarizing plate protective film No. 301, except that, in the preparation of the polarizing plate No. H301, the polymer P-204 was changed to the above-exemplified polymers shown in Table 3 and further the dope for the support-sided surface layer and the dope for the base layer, each of which were adjusted so that the addition amount of the polymer gets to the addition amount shown in Table 3, were used. Further, polarizing plates Nos. H302 to H305 of the present invention and polarizing plates for comparison Hc31 were prepared in the same manner as the polarizing plate No. H301, except that, in the preparation of the polarizing plate No. H301, the polarizing plate protective films Nos. 302 to 305 and c31 were used in place of the polarizing plate protective film No. 301.

3. Evaluation of Durability

The durability of each of the polarizing plates thus-prepared was evaluated in the following manner.

An amount of change of the perpendicular transmittance before and after the durability test of the polarizer at the wavelength of 410 nm was measured in the same manner as the "evaluation of durability" in Example 1, except that the storage conditions (durability test conditions) was change from "under environment of 60° C., relative humidity of 95% and 336 hours" to "under environment of 80° C., relative humidity of 90% and 72 hours". By this amount of change, the durability of each of the polarizing plates was evaluated in accordance with the following criteria.

It is noted that when a polarizing plate prepared on a glass was stuck, the polarizing plate was stuck so that a polarizing plate protective film is positioned in the air interface side.

80° C., relative humidity of 90% and 72 hours

A+: The amount of change of the perpendicular transmittance before and after the durability test was less than 0.2%, A: The amount of change of the perpendicular transmittance before and after the durability test was 0.2% or more and less than 0.3%.

B: The amount of change of the perpendicular transmittance before and after the durability test was 0.3% or more and less than 0.4%.

C: The amount of change of the perpendicular transmittance before and after the durability test was 0.4% or more.

In the durability test, the degree of rank B or greater is desirable in practice.

The obtained results are shown in Table 3.

TABLE 3

| | | | | | Layer of polarizing plate protective film | | | | | |
|---|---|---|---|---|---|---|---|---|---|---|
| | | | | | Support-sided surface layer | | Base layer | | Air-sided surface layer | |
| Polarizing plate No. | Polarizing plate protective film No. | Film resin | Polymer Kind | Mw | Addition amount [a] | Film thickness (µm) | Addition amount [a] | Film thickness (µm) | Addition amount [a] | Film thickness (µm) |
| H301 | 301 | Cellulose acylate | P-204 | 6,000 | 10 | 4.0 | 0 | 32.0 | 0 | 4.0 |
| H302 | 302 | Cellulose acylate | P-210 | 8,000 | 20 | 4.0 | 0 | 32.0 | 0 | 4.0 |
| H303 | 303 | Cellulose acylate | P-214 | 12,000 | 10 | 4.0 | 0 | 32.0 | 0 | 4.0 |
| H304 | 304 | Cellulose acylate | P-215 | 15,000 | 10 | 4.0 | 0 | 32.0 | 0 | 4.0 |
| H305 | 305 | Cellulose acylate | P-215 | 15,000 | 0 | 4.0 | 1.25 | 32.0 | 0 | 4.0 |
| Hc31 | c31 | Cellulose acylate | None | — | 0 | 4.0 | 0 | 32.0 | 0 | 4.0 |

TABLE 3-continued

| Polarizing plate No. | Surface which was stuck on the polarizer | Polarizer durability amount of change of the perpendicular transmittance (%) 80° C., 90%, 72 hours | Remarks |
|---|---|---|---|
| H301 | Support surface | A | This invention |
| H302 | Support surface | A+ | This invention |
| H303 | Support surface | A | This invention |
| H304 | Support surface | A | This invention |
| H305 | Support surface | B | This invention |
| Hc31 | Support surface | C | Comparative Example |

Note:
a) Addition amount with respect to 100 parts by mass of the film resin

From the results of the above Table 3, it was found that the polarizing plate having the polarizing plate protective film of the present ion prepared using the polarizing plate composition of the present invention is excellent in the polarizer durability under hygrothermal condition.

Example 4

In the following manner, polarizing plates in which polymers are incorporated in a polarizer (polarizer layer) were prepared to evaluate the polarizer durability.
1. Preparation of Polarizing Plates No. H401 to H408
1) Preparation of Polarizer A polyvinyl alcohol film (VF-PS7500 manufactured by Kraray Co., Ltd.; thickness: 75 μm) was used as an original film. To the polyvinyl alcohol film, each of the following steps was applied in the following order.
(Swelling Step)

As a processing liquid for a swelling bath, pure water was used. The above-described polyvinyl alcohol film was transported to the swelling bath and was soaked in pure water adjusted to 30° C. for 1 minute thereby swelling it and the swollen film was consequently stretched 2.2 times.
(Dyeing Step)

As a processing liquid for a dyeing bath, an iodine dyeing solution containing 0.045% by mass of iodine and 0.315% by mass of potassium iodide was used. The above-swollen polyvinyl alcohol film was transported to the iodine dyeing bath and while soaking it in the iodine dyeing solution adjusted to 30° C. for 30 seconds, the polyvinyl alcohol film was stretched and dyed so that the swollen length gets to 3.3 times of the original length.
(Crosslinking Step)

As a processing liquid for a crosslinking bath, a mixed aqueous solution (1) containing 3% by mass of boric acid and 3% by mass of potassium iodide was used. The above-processed polyvinyl alcohol film was transported to the crosslinking bath and while soaking it in the mixed aqueous solution (1) adjusted to 30° C. for 30 seconds, the polyvinyl alcohol film was stretched so that the swollen length gets to 3.6 times of the original length. By this step, a plurality of hydroxyl groups of the polyvinyl alcohol film was crosslinked through a boric acid.
(Stretching Step)

As a processing liquid for a stretching bath, a mixed aqueous solution (2) containing 4% by mass of boric acid and 5% by mass of potassium iodide was used. The above-processed polyvinyl alcohol film was transported to the stretching bath and while soaking it in the mixed aqueous solution (2) adjusted to 60° C. for 60 seconds, the polyvinyl alcohol film was stretched so that the swollen length gets to 6.0 times of the original length.

(Washing Step)

As a processing liquid for a washing bath, an aqueous solution containing 3% by mass of potassium iodide was used. The above-processed polyvinyl alcohol film was transported to the washing bath and soaked in the aqueous solution adjusted to 30° C. for 10 seconds.
(Drying Step)

Next, the above-processed polyvinyl alcohol film was drained and then was dried at a tautened state at 60° C. for 4 minutes in an oven to obtain a polarizer.
2) Sticking of the Polarizing Plate Protective A cellulose acylate film manufactured by FUJIFILM (trade name: FUJITAC TD80UF) was soaked in a 2.3 mol/L sodium hydroxide aqueous solution, at 55° C. for 3 minutes. The film was then washed in a water-washing bath at room temperature and neutralized with 0.05 mol/L; sulfuric acid at 30° C. The film was, again, washed in a water-washing bath at room temperature and further dried by warm air at 100° C. Thus, the surface of the cellulose acylate film was saponified.

Together with a polyvinyl alcohol-based adhesive, cellulose triacetate film after the saponification treatment was stuck to the one side of the polarizer as a polarizing plate protective film. On this occasion, arrangement was made such that a transmission axis of the polarizer, and the transverse direction of the commercially-available cellulose acylate film would become parallel.
2) Incorporation of Polymer into Polarizer Layer Each of the following polymers (P-101, P-106, P-112, P-114, P-204, P-211, P-219 and P-220) was dissolved in a solvent (any of MEK, methanol, or THF), and each of the polymer solutions (solutions of the polarizing plate composition of the present invention) adjusted so that the recurring unit of each polymer gets to the concentration of 0.17 mol/L was prepared. This polymer solution was coated by a bar coater so as to get to a coating amount of 26 ml/m$^2$ on the surface of a polarizer opposite to the side of the polarizer to which a polarizing plate protective film has been stuck, and was dried at 80° C. for 90 seconds.

In this way, each of the polarizing plates Nos. H401 to H408 of the present invention, in which each of the polymers was incorporated into and was contained in at least a surface or a superficial layer region including the surface of the polarizer layer, was prepared.
2. Preparation of Polarizing Plate No. Hc41

The polarizing plate No. Hc41 for comparison was prepared in the same manner as the polarizing plate No. H401, except that, in the preparation of the polarizing plate No. H401, the above step "2) incorporation of polymer into polarizer layer" (the coating of the polymer solution and the dry step) was not carried out.

101 102
(P-101)
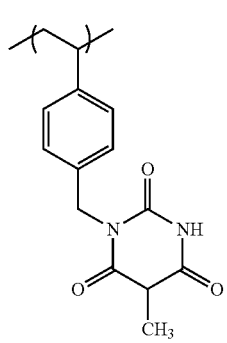
(P-106)
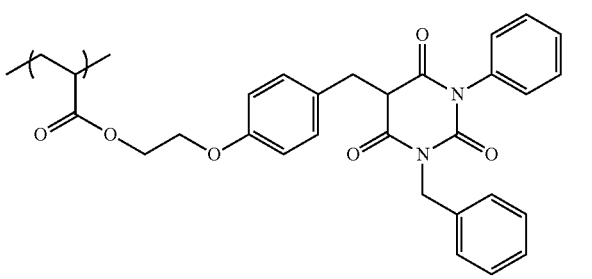
(P-112)
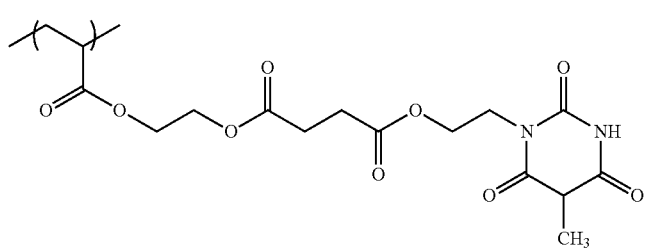
(P-114)
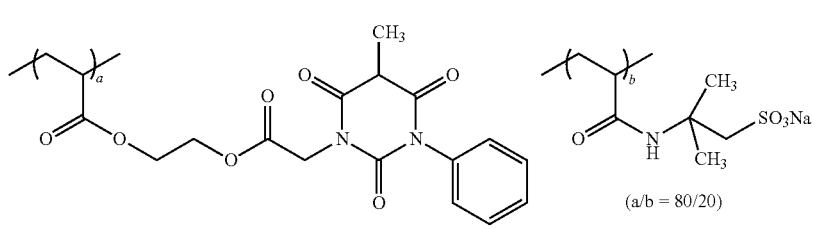
(a/b = 80/20)
(P-204)
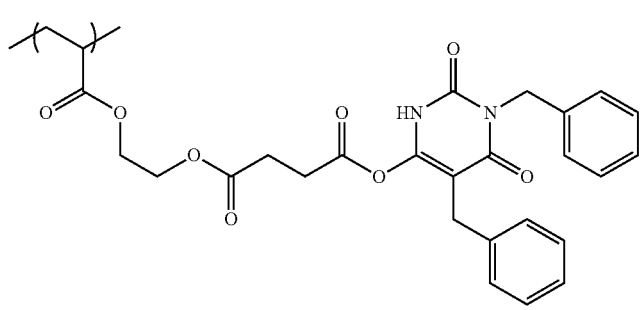
(P-211)
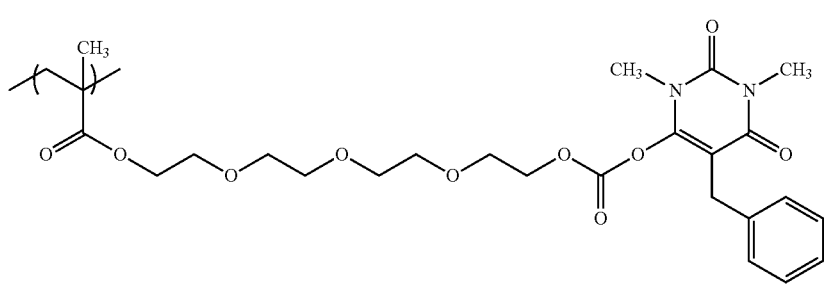

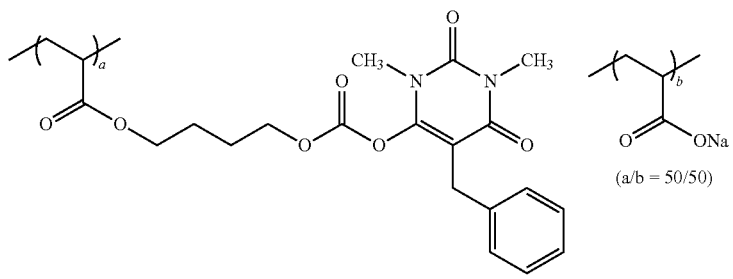
(P-219)

(a/b = 50/50)

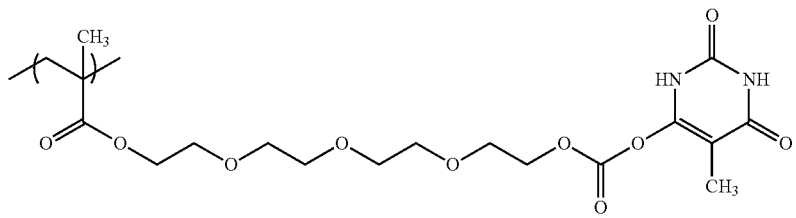
(P-220)

3. Evaluation of Durability

The durability of each of the polarizing plates thus-prepared was evaluated in the following manner.

By sticking the surface of each of the prepared polarizing plates Nos. H401 to H408, on which the polymer solution was coated and dried, to a glass plate through a pressure sensitive adhesive (SK-2057 manufactured by Soken Chemical & Engineering Co., Ltd.), polarizing plate samples (about 5 cm×5 cm) were prepared.

On the other hand, by sticking the surface of the polarizing plate No. Hc41 for comparison, on which the polymer solution was not coated (the surface on the side opposite to the surface to which the polarizing plate protective film was stuck), to a glass plate through the pressure sensitive adhesive in the same manner as the above, the polarizing plate sample for comparison was prepared.

Transmittance of each of the thus-prepared polarizing plate samples was measured 10 times in the range of 380 to 780 nm using the above-described automatic polarizing film measurement device VAP-7070. An average value of the obtained 10-measured values was calculated as a transmittance at the wavelength of 410 nm (perpendicular transmittance (before durability test)) in the same manner as Example 1.

Then, after storing each of the polarizing plate samples for 500 hours under environment of 60° C. and relative humidity of 90%, an average value of the obtained 10-measured values was calculated as a perpendicular transmittance (after durability test) at the wavelength of 410 nm in the same manner as the above.

It is noted that measurement of the perpendicular transmittance before and, after the durability test was carried out respectively under environment of 25° C. and relative humidity of 60%.

An amount of change of the perpendicular transmittance before and after the durability test was measured by the formula shown in Example 1. This amount was evaluated as a durability of the polarizing plate.

It has been found that each of the polarizing plates Nos. H401 to H408 of the present invention exhibits less amount of change of the perpendicular transmittance at the wavelength of 410 nm, compared to the polarizing plate No. Hc41 for comparison, which does not have the polymer of the present invention incorporated, and therefore the each of the polarizing plates Nos. H401 to H408 of the present invention has excellent polarizer durability.

From the results of Examples 1 to 4, it has been found that the use of the polarizing plate composition of the present invention allows preparation of the polarizing plate which exhibits such excellent performances as shown in the above. The use of this polarizing plate allows preparation of the liquid crystal display having excellent performances.

REFERENCE SIGNS LIST 21A, 21B Polarizing plate
22 Color filter substrate
23 Liquid crystal layer (liquid crystal sell)
24 Array substrate
25 Light-guide plate
26 Light source
31a, 31a', 31b Polarizing plate protective film
311a Polarizing plate protective film
311b Hard coat layer
32 Polarizer
R Polarization direction

The invention claimed is:
1. A composition for a polarizing plate comprising:
a polymer having a partial structure represented by the following ring structure α or β in the molecule:

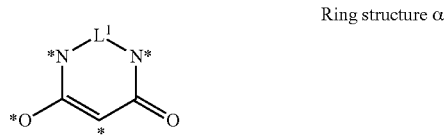

Ring structure α

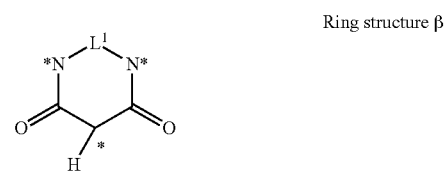

Ring structure β wherein $L^1$ represents a single bond, —C(=O)—, —C(=S)—, an alkylene group, or an arylene group; and wherein the symbol * designates a boning hand, or a site to which a hydrogen atom, a substituent, or a linking group binds;

a resin, wherein the resin is a cellulose acylate or a polyvinyl alcohol-based resin;

wherein the content of the polymer is from 0.01 to 40 parts by mass with respect to 100 parts by mass of the resin, and wherein the mass-average molecular weight of the polymer is from 2,000 to 100,000.

2. The composition for a polarizing plate according to claim 1, wherein the polymer has a partial structure represented by the following Formula (1) or (2) at a main chain or a side chain of the recurring unit thereof:

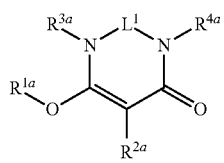

Formula (1)

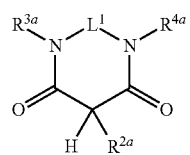

Formula (2)

wherein $L^1$ represents a single bond, —C(=O)—, —C(=S)—, an alkylene group, or an arylene group; $R^{1a}$ represents a methylene group substituted with a hetero atom, an ethylene group substituted with an electron-withdrawing group, an acyl group, an carbamoyl group in which at least one of two hydrogen atoms on the nitrogen atom is substituted with a group independently selected from an alkyl group, a cycloalkyl group, or an aryl group, an alkoxycarbonyl group, an aryloxycarbonyl group, a silyl group, or a sulfonyl group having an alkyl group or an aryl group; $R^{2a}$ represents an alkyl group, an alkenyl group, a cycloalkyl group, a cycloalkenyl group, an aryl group, a nitro group, a formyl group, a heterocyclic group, or a halogen atom; $R^{3a}$ and $R^{4a}$ each independently represent a hydrogen atom, an alkyl group, an alkenyl group, a cycloalkyl group, a cycloalkenyl group, an aryl group, or a heterocyclic group; and each group of $R^{1a}$, $R^{2a}$, $R^{3a}$ and $R^{4a}$ may further have a substituent; and it is noted, however, that in Formula (1), at least one of $R^{1a}$ to $R^{4a}$ while in Formula (2), at least one of $R^{2a}$ to $R^{4a}$ is incorporated into the main chain or the side chain in the the form of a boning hand.

3. The composition for a polarizing plate according to claim 1, wherein the polymer is a poly(meth)acrylate, a substituted polystyrene, a polyvinylacylate, a polyester, a polycarbonate, a polymaleimide, or a polyurethane, each of which may be a homopolymer or a copolymer.

4. The composition for a polarizing plate according to claim 1, wherein the polymer has a recurring unit represented by any of the following Formulae (Pa) to (Ph):

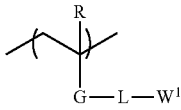

Formula (Pa)

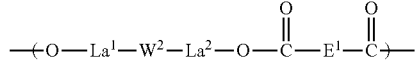

Formula (Pb)

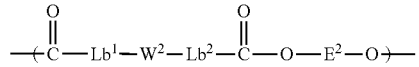

Formula (Pc)

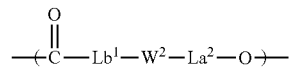

Formula (Pd)

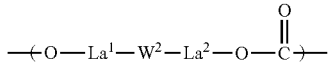

Formula (Pe)

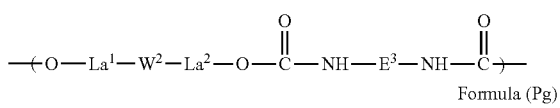

Formula (Pf)

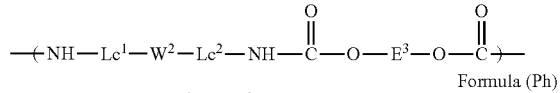

Formula (Pg)

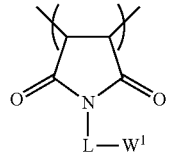

Formula (Ph)

wherein, in Formulae (Pa) to (Ph), $W^1$ represents an univalent group in the partial structure represented by the ring structure α or β; $W^2$ represents a divalent group in the partial structure represented by the ring structure α or β; R represents a hydrogen atom or a methyl group; G represents —O—C(=O)—*, —O—C(=O)—O—*, —C(=O)—O—*, —C(=O)—*, or a phenylene group; here, the boning hand in the side of the symbol * binds to L; L, $La^1$, $La^2$, $Lb^1$, $Lb^2$, $Lc^1$ and $Lc^2$ each independently represent a single bond or a divalent linking group; and $E^1$ to $E^3$ each independently represent a divalent linking group.

5. The composition for a polarizing plate according to claim 4, wherein $W^1$ represents an univalent group in the partial structure represented by the ring structure α or β; and $W^2$ represents a divalent group in the partial structure represented by the ring structure β.

6. The composition for a polarizing plate according to claim 1, wherein the the polymer has a recurring unit represented by the following Formula (Pa1):

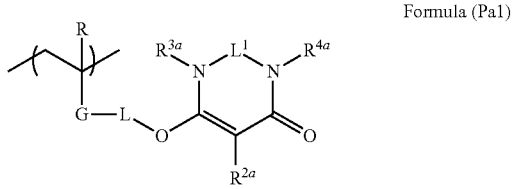

Formula (Pa1)

wherein, in formula (Pa1), R, G and L have the same meaning as the R, G and L of Formula (Pa); Moreover, $L^1$, $R^{2a}$, $R^{3a}$ and $R^{4a}$ have the same meaning as the $L^1$, $R^{2a}$, $R^{3a}$ and $R^{4a}$ of Formula (1).

7. The composition for a polarizing plate according to claim 4, wherein L represents *-Ld-[C(=O)]n- or *-Ld-[O—C(=O)]n-; Ld represents a single bond or a divalent linking group; n represents 0 or 1; and the boning hand in the side of the symbol * binds to G or a nitrogen atom.

8. The composition for a polarizing plate according to claim 1, containing a polyvinyl alcohol-based resin, or an acylated or ketalated polyvinyl alcohol, and a dichroic dye.

9. A polarizing plate protective film formed by the composition for a polarizing plate according to claim 1.

10. A cellulose acylate film comprising:
    a cellulose acylate and a polymer having a partial structure represented by the following ring structure α or β in the molecule:

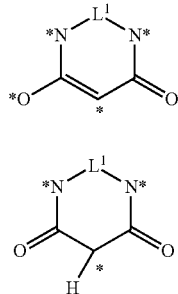

Ring structure α

Ring structure β wherein $L^1$ represents a single bond, —C(=O)—, —C(=S)—, an alkylene group, or an arylene group; and wherein the symbol * designates a boning hand, or a site to which a hydrogen atom, a substituent, or a linking group binds, and wherein the mass-average molecular weight of the polymer is from 2,000 to 100,000.

11. The cellulose acylate film according to claim 10, wherein the cellulose acylate film contains a laminate film having at least 2 layers, and in the case of 2 layers, either only one of the layers contains the polymer and in the case of at least 3 layers, at least one of the outer-most surface layers contains the polymer.

12. A polarizer formed by a composition for a polarizing plate according to claim 1.

13. A polarizing plate having the polarizing plate protective film according to claim 9.

14. A polarizing plate having a polarizer according to claim 12.

15. A display having a polarizing plate according to claim 13.

16. The composition for a polarizing plate according to claim 6, wherein L represents *-Ld-[C(=O)]n- or *-Ld-[O—C(=O)]n-; Ld represents a single bond or a divalent linking group; n represents 0 or 1; and the boning hand in the side of the symbol * binds to G or a nitrogen atom.

17. A polarizing plate having the cellulose acylate film according to claim 10.

18. A cellulose acylate film containing a cellulose acylate and a polymer having a partial structure represented by the following ring structure α or β in the molecule:

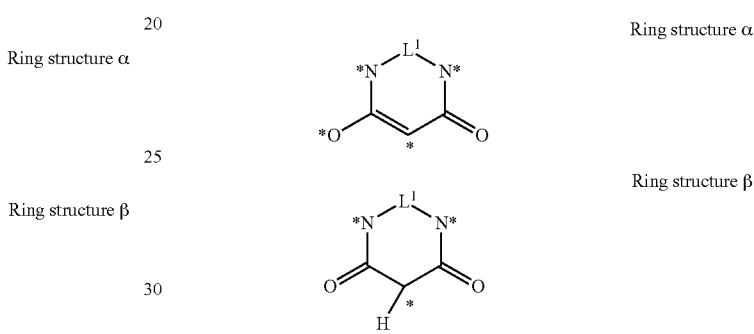

Ring structure α

Ring structure β wherein $L^1$ represents a single bond, —C(=O)—, —C(=S)—, an alkylene group, or an arylene group; and wherein the symbol * designates a boning hand, or a site to which a hydrogen atom, a substituent, or a linking group binds, wherein the cellulose acylate film further contains a resin, and the content of the polymer is from 0.01 to 40 parts by mass with respect to 100 parts by mass of the resin, and wherein the mass-average molecular weight of the polymer is from 2,000 to 100,000.

19. A polarizing plate having the cellulose acylate film according to claim 18.

* * * * *